(12) United States Patent
Beechuk et al.

(10) Patent No.: US 9,823,813 B2
(45) Date of Patent: Nov. 21, 2017

(54) APPARATUS AND METHODS FOR PERFORMING AN ACTION ON A DATABASE RECORD

(71) Applicant: salesforce.com, inc., San Francisco, CA (US)

(72) Inventors: Scott D. Beechuk, San Francisco, CA (US); Steven Tamm, San Francisco, CA (US); Orjan Kjellberg, Walnut Creek, CA (US); Arvind Krishnan, San Francisco, CA (US); Benjamin Snyder, Oakland, CA (US); Luke A. Ball, Berkeley, CA (US); Shannon Hale, San Francisco, CA (US); Khanh Kim P. Nguyen, Berkeley, CA (US); William Gradin, San Francisco, CA (US); Anna Bonner Mieritz, Moss Beach, CA (US); Beril Guvendik Maples, Oakland, CA (US); Gregg Johnson, Orinda, CA (US); Andrew Waite, Novato, CA (US); Jean Elie Bovet, Los Angeles, CA (US); Scott Peter Perket, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 422 days.

(21) Appl. No.: 14/537,656

(22) Filed: Nov. 10, 2014

(65) Prior Publication Data

US 2015/0143248 A1    May 21, 2015

Related U.S. Application Data

(63) Continuation-in-part of application No. 13/943,657, filed on Jul. 16, 2013, now Pat. No. 9,063,632.

(Continued)

(51) Int. Cl.
*G06F 3/00* (2006.01)
*G06F 3/0482* (2013.01)
(Continued)

(52) U.S. Cl.
CPC .......... *G06F 3/0482* (2013.01); *G06F 3/0481* (2013.01); *G06Q 30/00* (2013.01); *H04L 67/10* (2013.01); *H04L 67/1002* (2013.01)

(58) Field of Classification Search
CPC ...... G06F 3/0482; G06F 3/0481; G06Q 30/00
See application file for complete search history.

(56) References Cited

U.S. PATENT DOCUMENTS 5,577,188 A    11/1996  Zhu
5,608,872 A    3/1997   Schwartz et al.
(Continued)

FOREIGN PATENT DOCUMENTS

JP       2007-183849 A     7/2007
WO       2014144796        9/2014
WO       WO 2014/144796    9/2014

OTHER PUBLICATIONS

U.S. Office Action dated Nov. 21, 2013 issued in U.S. Appl. No. 13/943,657.
(Continued)

*Primary Examiner* — Nicholas Augustine
(74) *Attorney, Agent, or Firm* — Weaver Austin Villeneuve & Sampson LLP

(57) ABSTRACT

Disclosed are methods, apparatus, systems, and computer program products for performing an action on a database record in an on-demand database service. What actions are presented to a user interface of a mobile device can depend on attributes of the database record, such as metadata stored in association with the database record. Selection of one of the actions can cause the mobile device to integrate data (Continued)

from hardware components, databases, and applications using mobile device. The data identified from the mobile device can be automatically associated with various data fields of the action. The selected action can be performed on the database record using the data in the data fields.

20 Claims, 53 Drawing Sheets

Related U.S. Application Data

(60) Provisional application No. 61/915,649, filed on Dec. 13, 2013, provisional application No. 61/852,089, filed on Mar. 15, 2013.

(51) Int. Cl.
*H04L 29/08* (2006.01)
*G06F 3/0481* (2013.01)
*G06Q 30/00* (2012.01)
*G06F 3/01* (2006.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,269,369 B1 | 7/2001 | Robertson |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,001,010 B2 | 8/2011 | Ho et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,069,166 B2 | 11/2011 | Alvarado |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,364,969 B2 | 1/2013 | King |
| 8,381,133 B2 * | 2/2013 | Iwema .......... G06F 3/0488 715/817 |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,549,047 B2 | 10/2013 | Beechuk et al. |
| 8,560,554 B2 | 10/2013 | Gradin et al. |
| 8,560,575 B2 | 10/2013 | Gradin et al. |
| 8,566,301 B2 | 10/2013 | Rueben et al. |

(56) References Cited

U.S. PATENT DOCUMENTS

| | | | |
|---|---|---|---|
| 8,646,103 B2 | 2/2014 | Jakobson et al. | |
| 8,713,530 B2 | 4/2014 | Waite et al. | |
| 8,732,150 B2 | 5/2014 | Gradin et al. | |
| 8,892,573 B2 | 11/2014 | Gradin et al. | |
| 8,996,987 B2* | 3/2015 | Rivera | G06F 3/0481 345/548 |
| 9,063,632 B2 | 6/2015 | Beechuk et al. | |
| 9,529,488 B2 | 12/2016 | Beechuk et al. | |
| 9,544,307 B2 | 1/2017 | Engelking | |
| 2001/0044791 A1 | 11/2001 | Richter et al. | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0249911 A1 | 12/2004 | Alkhatib et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0197846 A1 | 9/2005 | Pezaris et al. | |
| 2005/0278647 A1* | 12/2005 | Leavitt | G06F 3/04817 715/765 |
| 2006/0173985 A1 | 8/2006 | Moore | |
| 2007/0176898 A1* | 8/2007 | Suh | G06F 1/1616 345/158 |
| 2007/0239507 A1 | 10/2007 | Madhogarhia | |
| 2008/0036743 A1* | 2/2008 | Westerman | G06F 3/038 345/173 |
| 2008/0052371 A1 | 2/2008 | Partovi et al. | |
| 2008/0249972 A1 | 10/2008 | Dillon | |
| 2009/0063415 A1 | 3/2009 | Chatfield et al. | |
| 2009/0069912 A1 | 3/2009 | Stefik | |
| 2009/0100342 A1 | 4/2009 | Jakobson | |
| 2009/0144741 A1* | 6/2009 | Tsuda | G06F 9/5027 718/104 |
| 2009/0177744 A1 | 7/2009 | Marlow et al. | |
| 2009/0254838 A1 | 10/2009 | Rao et al. | |
| 2009/0282121 A1 | 11/2009 | Robertson et al. | |
| 2009/0292786 A1 | 11/2009 | McCabe et al. | |
| 2010/0076937 A1 | 3/2010 | Abdelnur et al. | |
| 2010/0306824 A1 | 12/2010 | Gurney et al. | |
| 2011/0106808 A1 | 5/2011 | Hersans et al. | |
| 2011/0154268 A1* | 6/2011 | Trent, Jr. | G06F 3/04883 715/863 |
| 2011/0178866 A1 | 7/2011 | Levine et al. | |
| 2011/0202668 A1 | 8/2011 | Tarrago et al. | |
| 2011/0214086 A1 | 9/2011 | Narayanan et al. | |
| 2011/0218958 A1 | 9/2011 | Warshavsky et al. | |
| 2011/0247051 A1 | 10/2011 | Bulumulla et al. | |
| 2011/0252346 A1* | 10/2011 | Chaudhri | G06F 3/04817 715/765 |
| 2011/0270748 A1 | 11/2011 | Graham, III et al. | |
| 2011/0276535 A1 | 11/2011 | Pin et al. | |
| 2011/0276601 A1 | 11/2011 | Pin et al. | |
| 2011/0276875 A1 | 11/2011 | McCabe et al. | |
| 2011/0283181 A1 | 11/2011 | Waite et al. | |
| 2011/0289140 A1 | 11/2011 | Pletter et al. | |
| 2011/0289141 A1 | 11/2011 | Pletter et al. | |
| 2011/0289425 A1 | 11/2011 | Pletter et al. | |
| 2011/0289476 A1 | 11/2011 | Pletter et al. | |
| 2011/0289479 A1 | 11/2011 | Pletter et al. | |
| 2011/0314371 A1 | 12/2011 | Peterson et al. | |
| 2012/0013540 A1* | 1/2012 | Hogan | G06F 3/04883 345/173 |
| 2012/0027256 A1 | 2/2012 | Kiyohara et al. | |
| 2012/0042218 A1 | 2/2012 | Cinarkaya et al. | |
| 2012/0078727 A1 | 3/2012 | Lee | |
| 2012/0078953 A1 | 3/2012 | Araya | |
| 2012/0084151 A1 | 4/2012 | Kozak et al. | |
| 2012/0084348 A1 | 4/2012 | Lee et al. | |
| 2012/0084349 A1 | 4/2012 | Lee et al. | |
| 2012/0086544 A1 | 4/2012 | Kemp | |
| 2012/0089610 A1 | 4/2012 | Agrawal et al. | |
| 2012/0096041 A1 | 4/2012 | Rao et al. | |
| 2012/0102114 A1 | 4/2012 | Dunn et al. | |
| 2012/0102402 A1 | 4/2012 | Kwong | |
| 2012/0130973 A1 | 5/2012 | Tamm et al. | |
| 2012/0136905 A1* | 5/2012 | Pullara | G06F 17/30994 707/803 |
| 2012/0209586 A1 | 8/2012 | Mieritz et al. | |
| 2012/0210377 A1 | 8/2012 | Wong et al. | |
| 2012/0223951 A1 | 9/2012 | Dunn et al. | |
| 2012/0226803 A1 | 9/2012 | Bharadwaj | |
| 2012/0233137 A1 | 9/2012 | Jakobson et al. | |
| 2012/0278725 A1* | 11/2012 | Gordon | H04N 21/2665 715/738 |
| 2012/0290407 A1 | 11/2012 | Hubbard et al. | |
| 2012/0330644 A1 | 12/2012 | Giraudy et al. | |
| 2012/0331053 A1 | 12/2012 | Dunn | |
| 2013/0007148 A1 | 1/2013 | Olsen | |
| 2013/0018960 A1 | 1/2013 | Knysz et al. | |
| 2013/0019289 A1 | 1/2013 | Gonser et al. | |
| 2013/0024454 A1 | 1/2013 | Dunn | |
| 2013/0024788 A1 | 1/2013 | Olsen et al. | |
| 2013/0031487 A1 | 1/2013 | Olsen et al. | |
| 2013/0054517 A1 | 2/2013 | Beechuk et al. | |
| 2013/0067391 A1* | 3/2013 | Pittappilly | G06F 3/0488 715/784 |
| 2013/0151231 A1 | 6/2013 | Giraudy et al. | |
| 2013/0212497 A1 | 8/2013 | Zelenko et al. | |
| 2013/0218845 A1 | 8/2013 | Kleppner et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2013/0254397 A1 | 9/2013 | Lai et al. | |
| 2013/0318589 A1 | 11/2013 | Ford et al. | |
| 2013/0326597 A1 | 12/2013 | Matsushita et al. | |
| 2013/0346362 A1 | 12/2013 | Beechuk et al. | |
| 2014/0013246 A1 | 1/2014 | Beechuk et al. | |
| 2014/0013247 A1 | 1/2014 | Beechuk et al. | |
| 2014/0032597 A1 | 1/2014 | Ellis et al. | |
| 2014/0032713 A1 | 1/2014 | Phan et al. | |
| 2014/0033076 A1 | 1/2014 | Al-alami et al. | |
| 2014/0041038 A1 | 2/2014 | Lessin et al. | |
| 2014/0047560 A1 | 2/2014 | Meyer et al. | |
| 2014/0075286 A1* | 3/2014 | Harada | G06F 3/04886 715/234 |
| 2014/0101149 A1 | 4/2014 | Winters et al. | |
| 2014/0122592 A1 | 5/2014 | Houston et al. | |

(56) References Cited

U.S. PATENT DOCUMENTS

| | | | |
|---|---|---|---|
| 2014/0122622 A1 | 5/2014 | Castera et al. |
| 2014/0222814 A1 | 8/2014 | Gradin et al. |
| 2014/0250491 A1 | 9/2014 | Fleischman et al. |
| 2014/0280134 A1 | 9/2014 | Horen et al. |
| 2014/0280329 A1 | 9/2014 | Beechuk et al. |
| 2014/0280577 A1 | 9/2014 | Beechuk et al. |
| 2014/0282100 A1 | 9/2014 | Beechuk et al. |
| 2014/0282101 A1 | 9/2014 | Beechuk et al. |
| 2014/0299662 A1 | 10/2014 | Harrison |
| 2014/0304618 A1 | 10/2014 | Carriero et al. |
| 2014/0307863 A1 | 10/2014 | Snyder et al. |
| 2014/0310608 A1 | 10/2014 | Snyder et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0019575 A1 | 1/2015 | Dayon et al. |
| 2015/0020010 A1 | 1/2015 | Hale et al. |
| 2015/0032688 A1 | 1/2015 | Dayon et al. |
| 2015/0095162 A1 | 4/2015 | Jakobson et al. |
| 2015/0121299 A1 | 4/2015 | Synder et al. |
| 2015/0135300 A1 | 5/2015 | Ford |
| 2015/0142596 A1 | 5/2015 | Jakobson et al. |
| 2015/0163206 A1 | 6/2015 | McCarthy et al. |
| 2015/0172321 A1 | 6/2015 | Kirti et al. |
| 2015/0172563 A1 | 6/2015 | Jakobson et al. |
| 2016/0127358 A1 | 5/2016 | Engelking |
| 2017/0068646 A1 | 3/2017 | Beechuk et al. |

OTHER PUBLICATIONS

U.S. Final Office Action dated Jun. 26, 2014 issued in U.S. Appl. No. 13/943,657.
U.S. Notice of Allowance dated Dec. 16, 2014 issued in U.S. Appl. No. 13/943,657.
PCT International Search Report and Written Opinion dated Aug. 28, 2014 issued in PCT/US2014/029355.
"Create, change, or delete an OLE object," (2014) [retrieved on Nov. 12, 2014 at http://office.microsoft.com/en-us/powerpoint-help/create-change-or-delete-an-ole-object-HA010199192.aspx], *Microsoft*, 13 pages.
Dale Technologies, LLC., (Copyright 2011) "vMail™ for Salesforce® Users Guide", pp. 9-11 and 17, vMailSalesforceUsersGuide_v2.1 [1].pdf, 29 pp.
Fulton, Scott M. (Aug. 31, 2011) "Live From Dreamforce '11—Benioff Says You Can Now Store Salesforce Data Locally", [Retrieved from the Internet on Nov. 17, 2013 at http://readwrite.com/2011/08/31/ livefrom-dreamforce-11---sale.pdf, 22 pp.
U.S. Appl. No. 14/336,988, filed Jul. 21, 2014, Dayon et al.
U.S. Appl. No. 14/469,354, filed Aug. 26, 2014, Snyder et al.
U.S. Appl. No. 14/317,362, filed Jun. 27, 2014, Dayon et al.
U.S. Appl. No. 14/327,416, filed Jul. 9, 2014, Hale et al.
"Google Plus Users", Google+Ripples, Oct. 31, 2011 [retrieved on Feb. 21, 2012 from Internet at http://www.googleplusers.com/google-ripples.html], 3 pages.
U.S. Notice of Allowance dated Mar. 27, 2015 issued in U.S. Appl. No. 13/943,657.
U.S. Office Action dated Mar. 27, 2015 issued in U.S. Appl. No. 13/943,629.
U.S. Office Action dated Feb. 1, 2016 issued in U.S. Appl. No. 14/137,202.
U.S. Final Office Action dated Aug. 11, 2016 issued in U.S. Appl. No. 14/137,202.
U.S. Office Action dated Feb. 16, 2016 issued in U.S. Appl. No. 13/943,636.
U.S. Notice of Allowance dated Jun. 30, 2016 issued in U.S. Appl. No. 13/943,636.
U.S. Notice of Allowance dated Aug. 16, 2016 issued in U.S. Appl. No. 13/943,636.
U.S. Office Action dated Aug. 7, 2015 issued in U.S. Appl. No. 13/943,640.
U.S. Final Office Action dated Mar. 21, 2016 issued in U.S. Appl. No. 13/943,640.
U.S. Office Action dated Feb. 1, 2016 issued in U.S. Appl. No. 14/527,465.
U.S. Final Office Action dated Jun. 8, 2016 issued in U.S. Appl. No. 14/527,465.
U.S. Notice of Allowance dated Sep. 6, 2016 issued in U.S. Appl. No. 14/527,465.
PCT International Preliminary Report on Patentability and Written Opinion dated Sep. 24, 2015 issued in PCT/US2014/029355.
European Extended Search Report dated Jul. 13, 2016 issued in Application No. EP 14 76 5571.
Japanese First Office Action dated Nov. 15, 2016 issued in Application No. JP 2016-503070.
Katsuhiro Ogawa, Special No. 3, Learning know-how from on-site developers, crucial points on Facebook App., Nikkei Sofware, Nikkei Business Publications, Inc., Jan. 24, 2012, 15(3):62-71, ISSN1347-4685 [Japanese, no English translation].
Miei Ogawa, Linkup, The world's easiest guide for creating and managing Facebook page, Gijutsu-Hyohron Co., Ltd., Feb. 1, 2013, pp. 1-143, ISBN978-4-7741-5409-1 [Japanese, no English translation].
U.S. Appl. No. 15/373,317, filed Dec. 8, 2016, Engelking.

\* cited by examiner

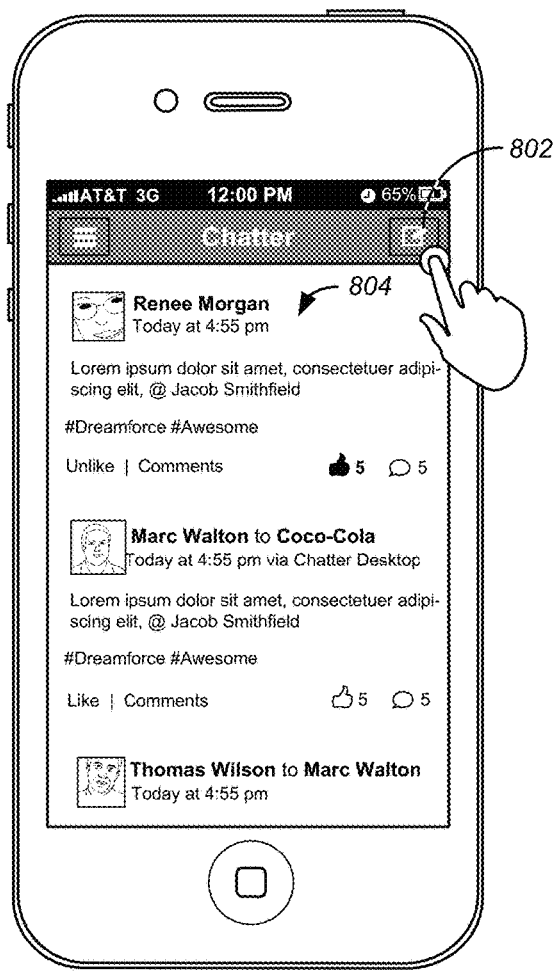
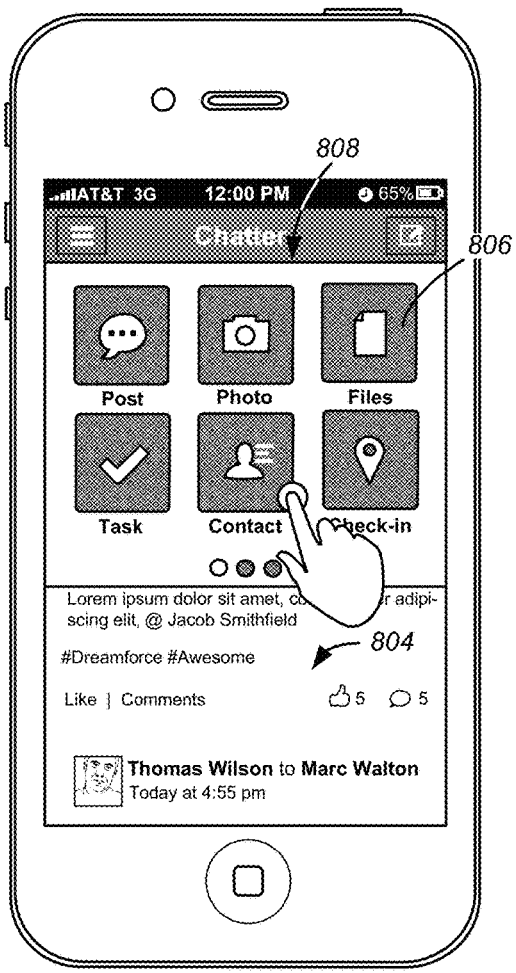
FIGURE 8A                    FIGURE 8B

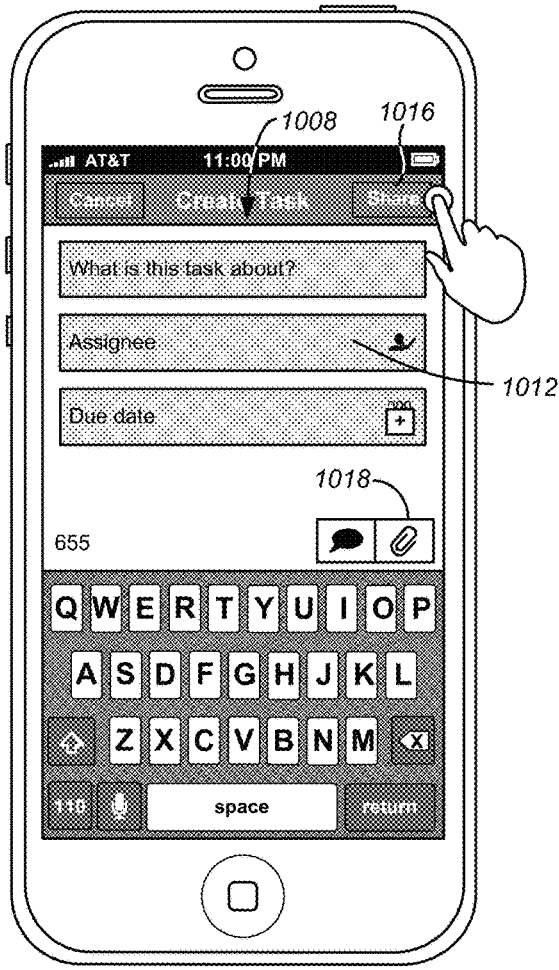
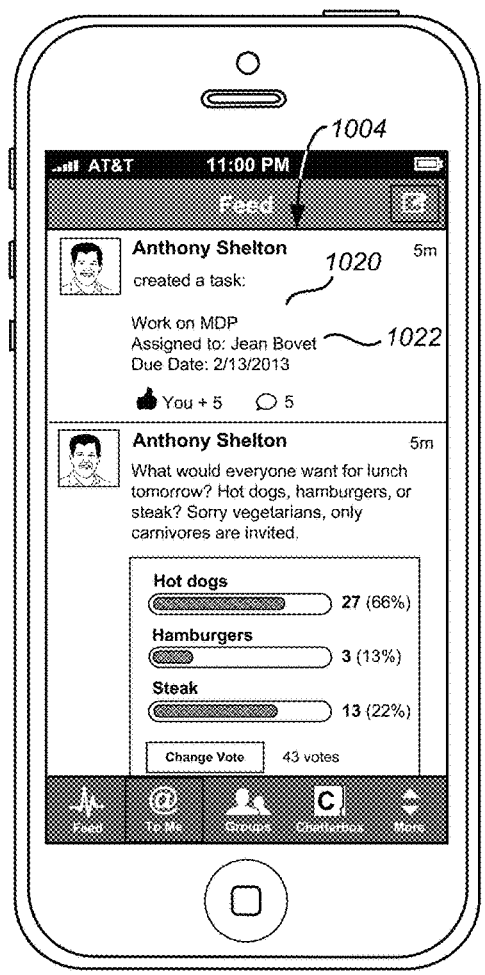
FIGURE 10A     FIGURE 10B

Home  Chatter  Campaigns  Leads  Accounts  Contacts  Opportunities  Contracts  Cases  Solutions  Products  Reports  Documents 3 Corncob Lane  
Cowpatch, TN 12345  
US  
(415) 555-1212  
cbroadus15@salesforce.com ★ Title Farmer  Created Date 10/9/2012 4:12 PM Mr. JimBob Lead — 1516

Interesting guy, but speaks a little funny.

Rating Hot  
Load Status Open  
Annual Reven... USD 10,000.00

Convert Lead  
    ↙ 1502

- Create a Task
- Create a Case
- Convert Lead — 1506
- Write Lead Note
- View Lead Details Service Agent — 1518a  [🔍]  Account  [🔍]

Opportunity Name          Convert Status  
                          Qualified ▼  ☐ Do not create new opportunity Task Information — 1518b Subject  [📋]            Due Date  11/6/2012

Description

Status        Priority  
In Progress ▼  Normal ▼        [ Convert Lead ] — 1510

FEED FILTERS

All Updates  
Text Posts

All Updates for this Lead  ↙ 1504                          ✓ Following ✖

Show All (1)
                                                           Followers Service Agent created a task.  
Send JimBob a welcome gift.  
Assigned to: Service Agent Due Date: 11/15/2012  
View Task  
Comment - Like - October 10, 2012 at 6:02 PM Service Agent  
JimBob is in town next week, let's be sure to schedule a meeting with him.  
Comment - Like - October 10, 2012 at 6:02 PM Sort by: Post Date ▼

| Home | Chatter | Campaigns | Leads | Accounts | Contacts | Opportunities | Service Contracts | Contracts | Cases | Solutions | Products | Rep |

The Landmark @ One Marke..
San Francisco, CA 94105

Contract Number 00000002    Service Contract Owner Service Agent    Status Expired
service contract — 1716    Price Book Enterprise
*No Description*    Total Price USD 200.00

— 1706

Add a Product

Product
[ BeechukView 2000 [BV2000] ]

— 1702

Write Service Contract Note

View Service Contract Details

[ Quantity ]

[ Sales Price ]

— 1704

+ Follow

Followers
No followers.

Add — 1710

— 1718

FEED FILTERS

All Updates

Text Posts

All Updates for this ServiceContract    Sort by: Post Date ▾

Service Agent created a Contract Line Item
BeechukView 2000
Comment · Like · Today at 8:58 AM

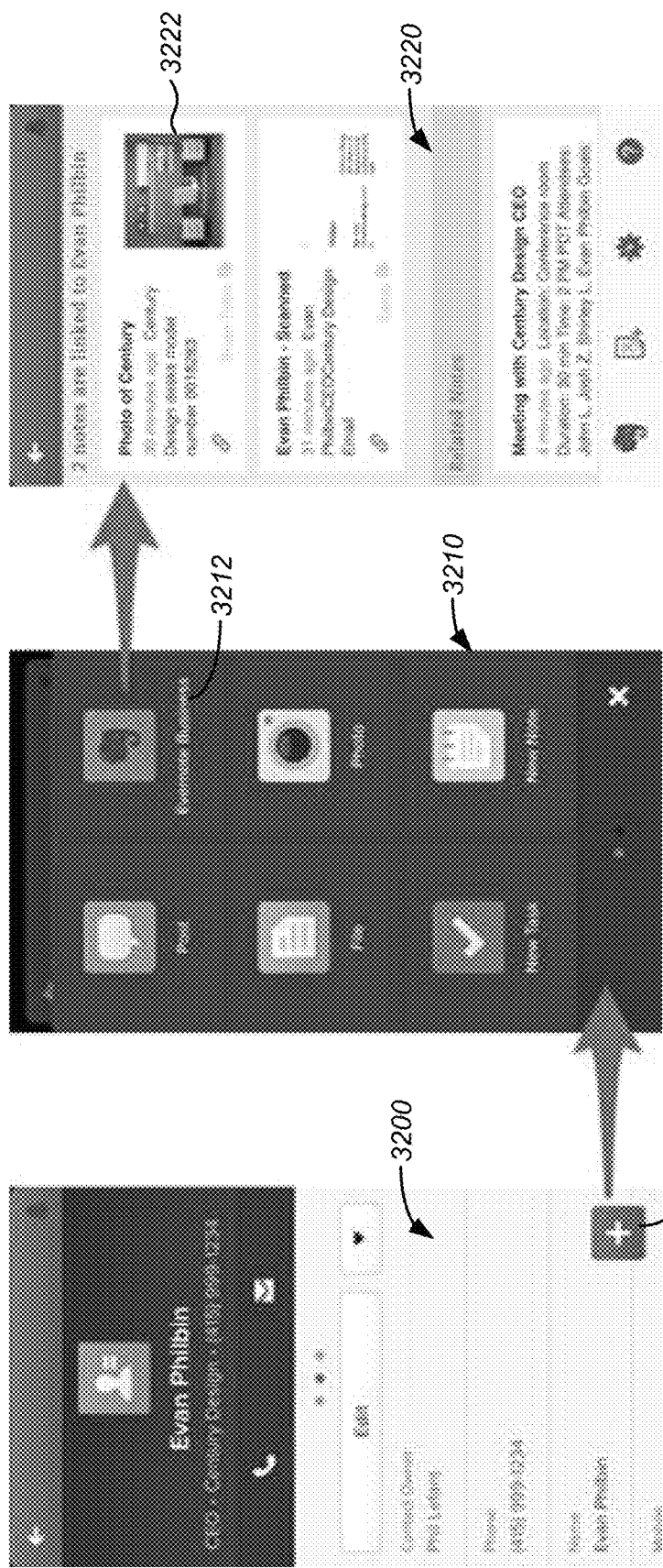

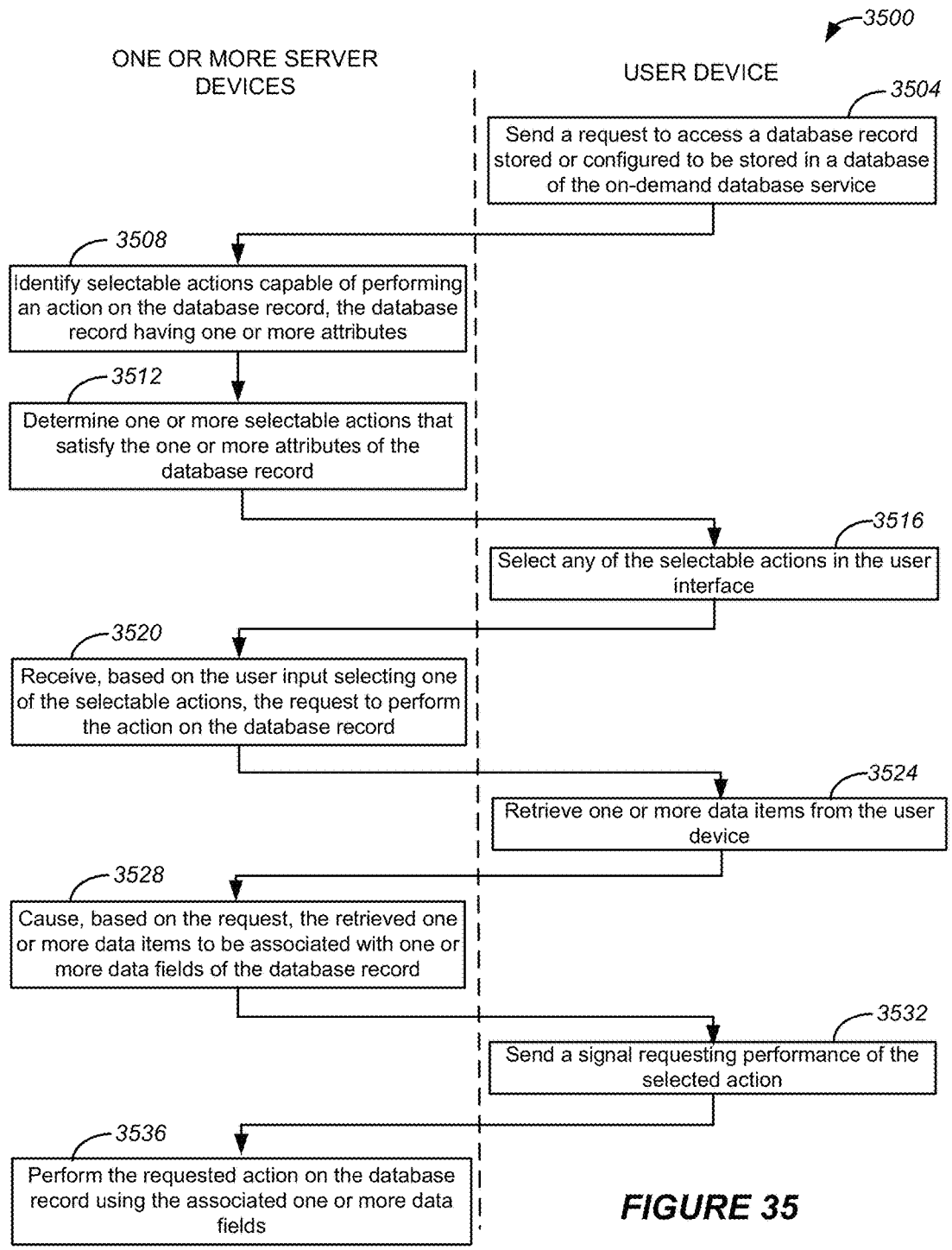

APPARATUS AND METHODS FOR PERFORMING AN ACTION ON A DATABASE RECORD

PRIORITY DATA

This patent document claims priority to commonly assigned: U.S. Provisional Patent Application No. 61/915,649, titled "Systems and Methods for Interacting with Records Via a Publisher and an Information Feed", by Beechuk et al., filed on Dec. 13, 2013, which is hereby incorporated by reference in its entirety and for all purposes, and is a continuation-in-part of U.S. patent application Ser. No. 13/943,657, titled "Systems and Methods for Interacting with Records Via a Publisher and an Information Feed", by Beechuk et al., filed on Jul. 16, 2013, which is hereby incorporated by reference in its entirety and for all purposes, and which claims priority to commonly assigned U.S. Provisional Patent Application No. 61/852,089, titled "Multi-Dimensional Publisher", by Beechuk et al., filed on Mar. 15, 2013, which is hereby incorporated by reference in its entirety and for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This patent document relates generally to providing on-demand services in an online social network using a database system and, more specifically, to techniques for performing actions on a database record in an online social network.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

Database resources can be provided in a cloud computing context. However, using conventional database management techniques, it is difficult to know about the activity of other users of a database system in the cloud or other network. For example, the actions of a particular user, such as a salesperson, on a database resource may be important to the user's boss. The user can create a report about what the user has done and send it to the boss, but such reports may be inefficient, not timely, and incomplete. Also, it may be difficult to identify other users who might benefit from the information in the report.

BRIEF DESCRIPTION OF THE DRAWINGS

The included drawings are for illustrative purposes and serve only to provide examples of possible structures and operations for the disclosed inventive systems, apparatus, devices, and methods for performing an action on a database record. These drawings in no way limit any changes in form and detail that may be made by one skilled in the art without departing from the spirit and scope of the disclosed implementations.

FIGS. 8A-8D show an example of a user interface with a publisher and an information feed for mobile device applications, according to some implementations.

FIGS. 10A-10B show an example of a user interface with a publisher and a feed item in an information feed for mobile device applications, according to some implementations.

FIG. 11 shows an example of a record with a user interface including a publisher and an information feed, according to some implementations.

FIG. 14 shows an example of the record in FIG. 13 with a user interface including the information feed with a feed item presenting updated data from a publisher and a link to a child record, according to some implementations.

FIG. 15 shows an example of a record with a user interface including a publisher, a custom action, and an information feed, according to some implementations.

FIG. 16 shows an example of a converted record of the record in FIG. 15, with a user interface including a publisher, a custom action, and an information feed, according to some implementations.

FIG. 17 shows an example of a child record of the converted record in FIG. 16, with a user interface including a publisher, a custom action, and an information feed, according to some implementations.

FIG. 18 shows an example of a record with a user interface displaying a feed item in an information feed of a parent record, according to some implementations.

FIG. 19A shows an example of a record with a user interface displaying the information feed for an account page, according to some implementations.

FIG. 19B shows an example of a record with a user interface displaying the record details for the account page in FIG. 19A, according to some implementations.

FIG. 19C shows an example of a record with a user interface displaying the record relationship information for the account page in FIG. 19A, according to some implementations.

FIG. 20A shows an example of a contacts record with a record feed including a feed item presenting updated data from a publisher, according to some implementations.

FIG. 20B shows an example of a user profile with a news feed including a feed item cross-referenced from the feed item in FIG. 20A with a link to the contacts record, according to some implementations.

FIG. 20C shows an example of another user profile with a news feed including a feed item cross-referenced from the feed item in FIG. 20A with a link to the contacts record, according to some implementations.

FIG. 21 shows an example of a user interface including a custom action definition area for creating the custom action with a Visualforce page.

FIG. 25A shows an example of a user interface with a publisher exposing content from an application hosted on a third-party platform, according to some implementations.

FIG. 25B shows an example of a user interface with a feed item displaying data based on a user input regarding content from the application hosted on the third-party platform in FIG. 25A, according to some implementations.

FIG. 25C shows an example of a user interface with a feed item displaying approval controls based on a user input regarding content from the application hosted on the third-party platform in FIG. 25A, according to some implementations.

FIGS. 32A-32C show an example of a series of steps for linking Evernote content to a database record, according to some implementations.

FIG. 35 shows an example of a system timing diagram of operations performed between a user device and one or more servers for performing an action on a database record, performed in accordance with some implementations.

DETAILED DESCRIPTION

Figure 1A:
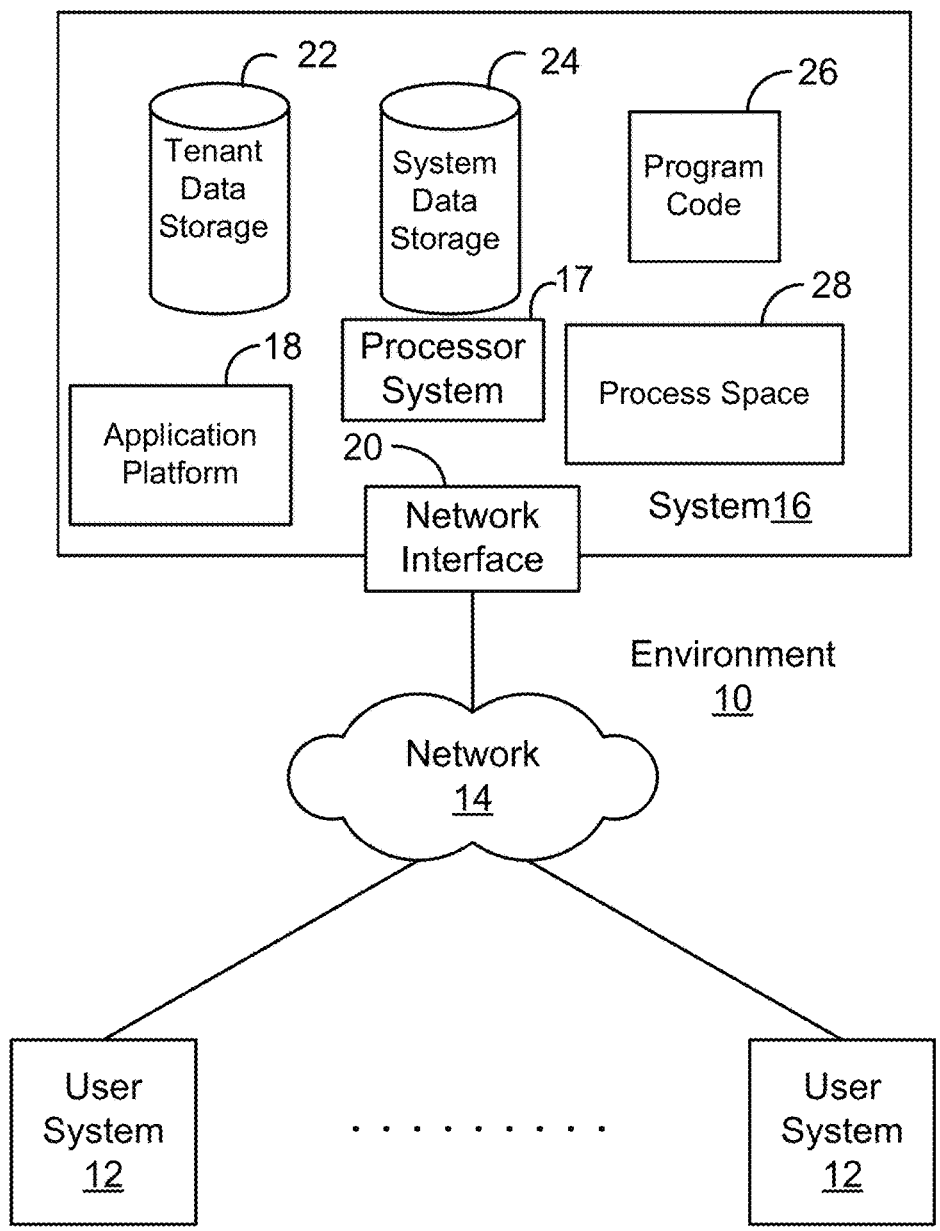
FIG. 1A shows a block diagram of an example of an environment 10 in which an on-demand database service can be used in accordance with some implementations.

Examples of systems, apparatus, devices, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different methods, apparatus, systems, devices, and computer-readable storage media for performing an action on a database record. The database record may be stored in a database and associated with an on-demand database service. In some implementations, the on-demand database service can include an enterprise social networking system. One example of an enterprise social networking system is Chatter®, provided by salesforce.com, inc. of San Francisco, Calif. Online social networks are increasingly becoming a common way to facilitate communication among people and groups of people, any of whom can be recognized as users of a social networking system. Some online social networks can be implemented in various settings, including organizations, e.g., enterprises such as companies or business partnerships, academic institutions, or groups within such an organization. For instance, Chatter® can be used by employee users in a division of a business organization to share data, communicate, and collaborate with each other for various purposes.

In some online social networks, users can access one or more information feeds, which include information updates presented as items or entries in the feed. Such a feed item can include a single information update or a collection of individual information updates. A feed item can include various types of data including character-based data, audio data, image data and/or video data. An information feed can be displayed in a graphical user interface (GUI) on a display device such as the display of a computing device as described below. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, an online social network may allow a user to follow data objects in the form of records such as cases, accounts, or opportunities, in addition to following individual users and groups of users. The "following" of a record stored in a database, as described in greater detail below, allows a user to track the progress of that record. Updates to the record, also referred to herein as changes to the record, are one type of information update that can occur and be noted on an information feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be user-submitted messages or can otherwise be generated in response to user actions or in response to events. Examples of messages include: posts, comments, indications of a user's personal preferences such as "likes" and "dislikes", updates to a user's status, uploaded files, and hyperlinks to social network data or other network data such as various documents and/or web pages on the Internet. Posts can include alphanumeric or other character-based user inputs such as words, phrases, statements, questions, emotional expressions, and/or symbols. Comments generally refer to responses to posts, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed, also referred to herein as the user's "wall," which is one example of an information feed displayed on the user's profile page.

In some implementations, an information feed may be specific to a group of users of an online social network. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to an information feed for a particular user, group, object, or other construct within an online social network, an email notification or other type of network communication may be transmitted to all users following the user, group, or object in addition to the inclusion of the data as a feed item in one or more feeds, such as a user's profile feed, a news feed, or a record feed. In some online social networks, the occurrence of such a notification is limited to the first instance of a published input, which may form part of a larger conversation. For instance, a notification may be transmitted for an initial post, but not for comments on the post. In some other implementations, a separate notification is transmitted for each such information update.

Some implementations of the disclosed systems, apparatus, methods, and computer readable storage media are configured to interact with records or applications across a single user interface in an online social network. The single user interface provides a unified user interface including a publisher and an information feed. The publisher can include one or more publisher actions configured to interact with a record or application. In some implementations, the record can be a customer relationship management (CRM) object, such as a lead, a case, an account, an opportunity, a task, a contact, a campaign, a contract, an event, a custom object, and a Visualforce page. In some implementations, the application can be an application hosted on a third-party platform.

Some of the publisher actions can be custom actions configured to interact with a data object or application. The custom action may be defined in accordance with custom action instructions declaratively or programmatically. The custom action instructions may define the data object and the interaction to be performed with the data object. The custom action instructions may also define attributes of the custom action, including data fields associated with the data object, validation rules associated with the one or more data fields, the page layout of the custom action in the publisher, and the action layout of the one or more data fields in the publisher. In some instances, the custom action instructions may be defined using a customization tool, such as Visualforce. This allows a user or organization to make customized user interfaces to meet their business needs.

The publisher is configured to publish information to the information feed. In some instances, a feed item is created upon performing an interaction with the record or application, and the feed item may include one or more actionable selections. The one or more actionable selections may provide a reference to the record or application. Selection of one of the actionable selections may cause the publisher to be operable to receive additional information and/or perform additional operations on the record or application. Having such actionable selections in the feed item enables a user to efficiently perform actions on the record or application without having to navigate and switch among different user interfaces. For example, a user can interact with multiple records without leaving a common user interface. This can be useful in efficiently advancing CRM as well as non-CRM lifecycles through the publisher and information feed.

The feed item may be presented for inclusion in an information feed, such as a parent record of the child record being acted upon. However, the feed item can be propagated and cross-referenced for display not only in the record feed of the parent record, but in other related feeds. Identification of such related feeds can occur by, for example, a user defining values in a payload or a system administrator hard-coding the values. Any interactions performed on a cross-referenced feed item are also presented on every other cross-referenced feed item so that a single conversation thread is preserved. This can allow users or organizations to view and interact with the same feed item from multiple page layouts.

Not only can the publisher interact with data objects, the publisher may also be configured to interact with applications. Such applications may be hosted natively in the on-demand service environment or hosted on a third-party platform. Custom actions may be defined to interact with the application via an API. Regardless of whether the application is hosted natively or on a third-party platform, the API can enable integration of the application into the on-demand service environment. Interactions with the application can be updated to an information feed. Such updates may occur without refreshing the user interface.

Mobile devices may have different form factors (e.g., small screen), so efficient presentation of information in the user interface of a mobile device can improve user experience and workflow. On mobile devices, users typically perform focused tasks and switching interfaces can be burdensome. When publisher actions are implemented on mobile devices, selection of publisher actions and entering of data in data fields for the publisher actions can be cumbersome and time-consuming. Rather than manually entering data into various data fields for a selected publisher action, data can be retrieved using the mobile device and automatically associated with the various data fields. Moreover, what publisher actions are presented to user can depend on a context in which the user is navigating or operating. Instead of presenting the user with an excessive number of publisher actions to choose from, the publisher actions can be specific to attributes of a database record that the user is working on.

By way of an example, a company may have mobile technicians performing repairs on electronic devices on-site. If the mobile technician needs certain repair parts, he/she can select one or more actions on a mobile device for locating a warehouse with the parts and placing an order for the parts. From the mobile device, the mobile technician may be working on a case for performing a repair for a customer. The mobile technician can load an action for locating a warehouse within a 20-mile radius using the mobile technician's geolocation. The mobile technician may select the warehouse and create a quick order for ordering the repair parts. When the action is pulled up in the user interface of the mobile device, some data fields may be preloaded with information using various components of the mobile device, such as GPS coordinates from the mobile device's GPS sensor. Some data fields may be preloaded with information using third-party applications, such as an invoice total from a Canvas application. Thus, the mobile technician may quickly locate and order a repair part using an object-specific action that integrates data from the mobile technician's mobile device.

In another example, an employee of a company may want to set up a conference call with multiple contacts on an account from his/her mobile device. The employee can be working on the account and may select an action for setting up a conference call with various contacts on the account. Upon selecting the action, contact information may be pulled from the employee's address book stored on his/her mobile device. Thus, the employee can efficiently set up a conference call from the account page using an object-specific action that can preload contact information from the employee's mobile device.

As more and more users and organizations move toward more collaborative sharing models to communicate and conduct business, there is a desire to better expose, enhance, and utilize information. Conventionally, accessing information and interacting with information in an online social network can involve navigating and switching among several different applications and interfaces. This can be cumbersome, time-consuming, and unproductive.

As noted above, some of the implementations described herein are directed at mechanisms to provide a unified user interface that enables a user to interact with a data object or application in an online social network. Such interactions can include, for example, a request to create the data object, a request to delete the data object, a request to update the data object, a request to convert the data object, a request to download data from the data object, a request to upload data to the data object, a request to attach a file to the data object, a request to view information associated with the data object, and a request to otherwise perform an operation having a reference to the data object. A unified user interface may include an information feed and a publisher with a custom action, where the custom action is configured to perform one of the aforementioned interactions with the data object or application. Such interactions may occur via an API and published to an information feed in the form of a feed item. The feed item may be cross-referenced in other related feeds to provide a single conversation thread, and the feed item may have actionable selections to perform further operations on the data object. As such, the publisher and the feed item become the main interface to interact with and view relevant information without the need to switch among different applications and interfaces.

These and other implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

A "user profile" or "user's profile" is generally configured to store and maintain data about a given user of the database system. The data can include general information, such as name, title, phone number, a photo, a biographical summary, and a status, e.g., text describing what the user is currently doing. As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "information feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different information feeds. A second user following a first user and a record can receive the feed items associated with the first user and the record for display in the second user's news feed, which is another type of information feed. In some implementations, the feed items from any number of followed users and records can be combined into a single information feed of a particular user.

As examples, a feed item can be a message, such as a user-generated post of text data, and a feed tracked update to a record or profile, such as a change to a field of the record. Feed tracked updates are described in greater detail below. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group. In one implementation, there is only one status for a record.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Messages and feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and messages, such as posts, comments, likes, etc., can define group conversations and change over time.

An "entity feed" or "record feed" generally refers to a feed of feed items about a particular record in the database, such as feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" is a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

I. General Overview

Systems, apparatus, and methods are provided for implementing enterprise level social and business information networking. Such implementations can provide more efficient use of a database system. For instance, a user of a database system may not easily know when important information in the database has changed, e.g., about a project or client. Implementations can provide feed tracked updates about such changes and other events, thereby keeping users informed.

By way of example, a user can update a record, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed right to the manager's feed page or other page.

Next, mechanisms and methods for providing systems implementing enterprise level social and business information networking will be described with reference to several implementations. First, an overview of an example of a database system is described, and then examples of tracking events for a record, actions of a user, and messages about a user or record are described. Various implementations about the data structure of feeds, customizing feeds, user selection of records and users to follow, generating feeds, and displaying feeds are also described.

II. System Overview

FIG. 1A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 1A (and in more detail in FIG. 1B) user systems 12 might interact via a network 14 with an on-demand database service, which is implemented in the example of FIG. 1A as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 1A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 1B:
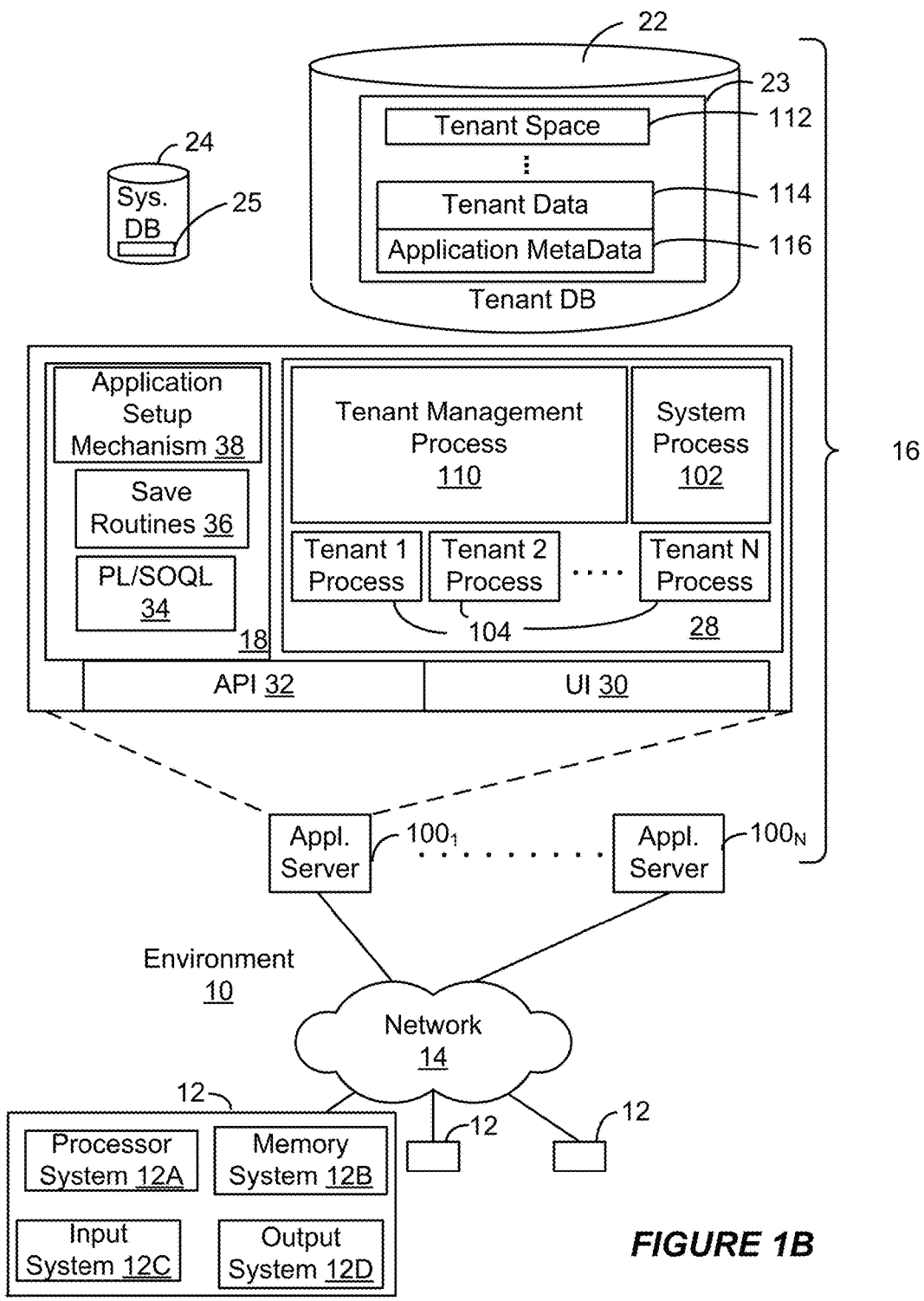
FIG. 1B shows a block diagram of an example of some implementations of elements of FIG. 1A and various possible interconnections between these elements.

One arrangement for elements of system 16 is shown in FIGS. 1A and 1B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline back-ups or other redundancies, etc., and might include a distributed database or storage network and associated processing intelligence.

FIG. 1B shows a block diagram of an example of some implementations of elements of FIG. 1A and various possible interconnections between these elements. That is, FIG. 1B also illustrates environment 10. However, in FIG. 1B elements of system 16 and various interconnections in some implementations are further illustrated. FIG. 1B shows that user system 12 may include processor system 12A, memory system 12B, input system 12C, and output system 12D. FIG. 1B shows network 14 and system 16. FIG. 1B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers 100 1-100N, system process space 102, tenant process spaces 104, tenant management process space 110, tenant storage space 112, user storage 114, and application metadata 116. In other implementations, environment 10 may not have the same elements as those listed above and/or may have other elements instead of, or in addition to, those listed above.

User system 12, network 14, system 16, tenant data storage 22, and system data storage 24 were discussed above in FIG. 1A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 1B, system 16 may include a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100 may be configured to communicate with tenant data storage 22 and the tenant data 23 therein, and system data storage 24 and the system data 25 therein to serve requests of user systems 12. The tenant data 23 might be divided into individual tenant storage spaces 112, which can be either a physical arrangement and/or a logical arrangement of data. Within each tenant storage space 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage space 112. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server 100 1 might be coupled via the network 14 (e.g., the Internet), another application server 100N-1 might be coupled via a direct network link, and another application server 100N might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain implementations, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one implementation, therefore, an interface system implementing a load balancing function (e.g., an F5 Big-IP load balancer) is communicably coupled between the application servers 100 and the user systems 12 to distribute requests to the application servers 100. In one implementation, the load balancer uses a least connections algorithm to route user requests to the application servers 100. Other examples of load balancing algorithms, such as round robin and observed response time, also can be used. For example, in certain implementations, three consecutive requests from the same user could hit three different application servers 100, and three requests from different users could hit the same application server 100. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 100 to request and update system-level and tenant-level data from system 16 that may involve sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
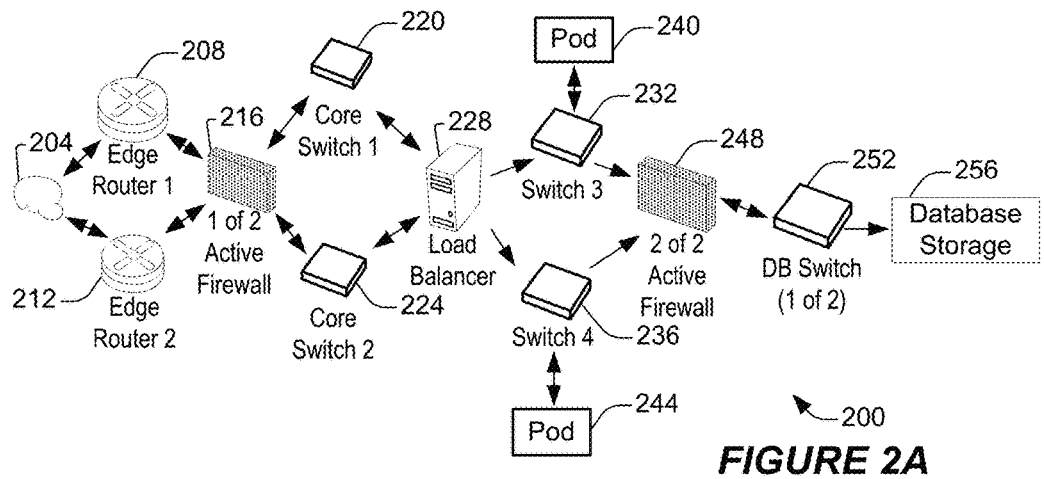
FIG. 2A shows a system diagram illustrating an example of architectural components of an on-demand database service environment 200 according to some implementations.

FIG. 2A shows a system diagram illustrating an example of architectural components of an on-demand database service environment 200 according to some implementations. A client machine located in the cloud 204, generally referring to one or more networks in combination, as described herein, may communicate with the on-demand database service environment via one or more edge routers 208 and 212. A client machine can be any of the examples of user systems 12 described above. The edge routers may communicate with one or more core switches 220 and 224 via firewall 216. The core switches may communicate with a load balancer 228, which may distribute server load over different pods, such as the pods 240 and 244. The pods 240 and 244, which may each include one or more servers and/or other computing resources, may perform data processing and other operations used to provide on-demand services. Communication with the pods may be conducted via pod switches 232 and 236. Components of the on-demand database service environment may communicate with a database storage 256 via a database firewall 248 and a database switch 252.

Figure 2B:
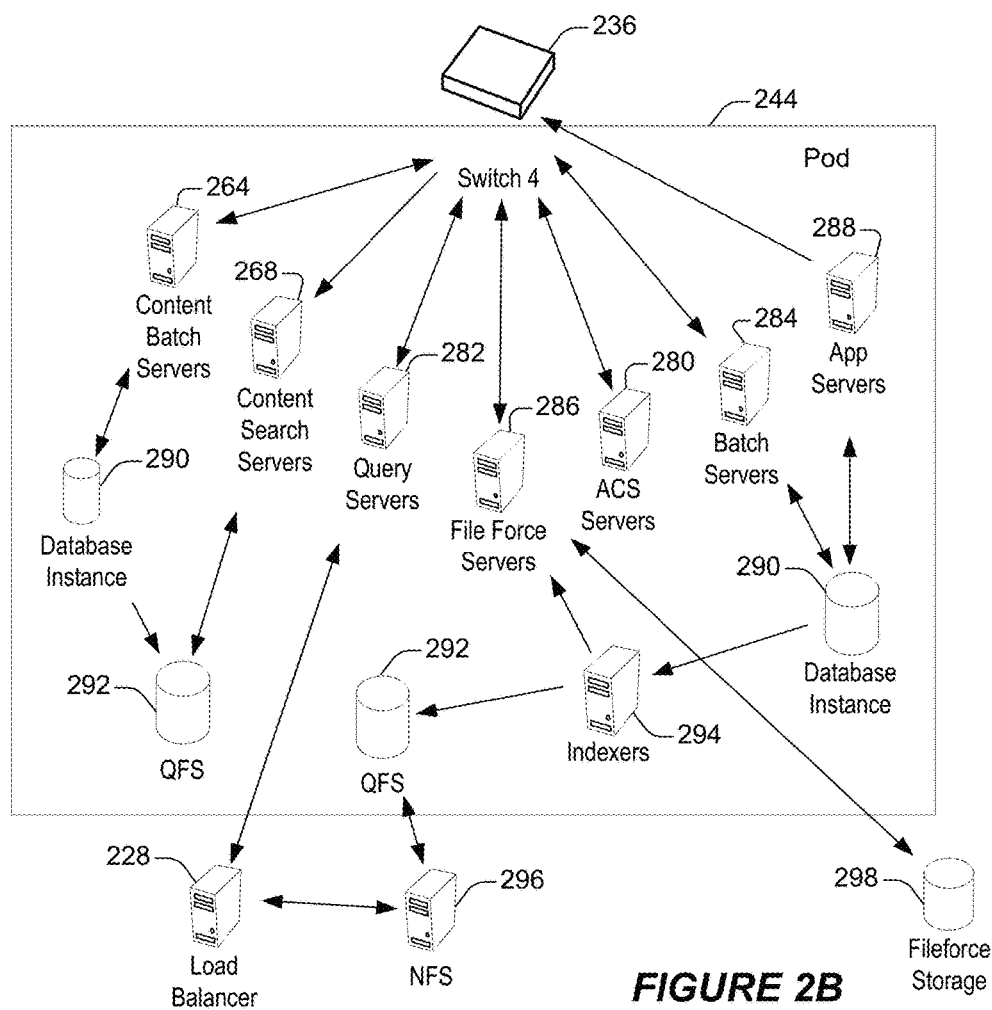
FIG. 2B shows a system diagram further illustrating an example of architectural components of an on-demand database service environment according to some implementations.

As shown in FIGS. 2A and 2B, accessing an on-demand database service environment may involve communications transmitted among a variety of different hardware and/or software components. Further, the on-demand database service environment 200 is a simplified representation of an actual on-demand database service environment. For example, while only one or two devices of each type are shown in FIGS. 2A and 2B, some implementations of an on-demand database service environment may include anywhere from one to many devices of each type. Also, the on-demand database service environment need not include each device shown in FIGS. 2A and 2B, or may include additional devices not shown in FIGS. 2A and 2B.

Moreover, one or more of the devices in the on-demand database service environment 200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 204 is intended to refer to a data network or plurality of data networks, often including the Internet. Client machines located in the cloud 204 may communicate with the on-demand database service environment to access services provided by the on-demand database service environment. For example, client machines may access the on-demand database service environment to retrieve, store, edit, and/or process information.

In some implementations, the edge routers 208 and 212 route packets between the cloud 204 and other components of the on-demand database service environment 200. The edge routers 208 and 212 may employ the Border Gateway Protocol (BGP). The BGP is the core routing protocol of the Internet. The edge routers 208 and 212 may maintain a table of IP networks or 'prefixes', which designate network reachability among autonomous systems on the Internet.

In one or more implementations, the firewall 216 may protect the inner components of the on-demand database service environment 200 from Internet traffic. The firewall 216 may block, permit, or deny access to the inner components of the on-demand database service environment 200 based upon a set of rules and other criteria. The firewall 216 may act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 may be configured as network bridges that quickly route data between different components within the on-demand database service environment. In some implementations, the use of two or more core switches 220 and 224 may provide redundancy and/or reduced latency.

In some implementations, the pods 240 and 244 may perform the core data processing and service functions provided by the on-demand database service environment. Each pod may include various types of hardware and/or software computing resources. An example of the pod architecture is discussed in greater detail with reference to FIG. 2B.

In some implementations, communication between the pods 240 and 244 may be conducted via the pod switches 232 and 236. The pod switches 232 and 236 may facilitate communication between the pods 240 and 244 and client machines located in the cloud 204, for example via core switches 220 and 224. Also, the pod switches 232 and 236 may facilitate communication between the pods 240 and 244 and the database storage 256.

In some implementations, the load balancer 228 may distribute workload between the pods 240 and 244. Balancing the on-demand service requests between the pods may assist in improving the use of resources, increasing throughput, reducing response times, and/or reducing overhead. The load balancer 228 may include multilayer switches to analyze and forward traffic.

In some implementations, access to the database storage 256 may be guarded by a database firewall 248. The database firewall 248 may act as a computer application firewall operating at the database application layer of a protocol stack. The database firewall 248 may protect the database storage 256 from application attacks such as structure query language (SQL) injection, database rootkits, and unauthorized information disclosure.

In some implementations, the database firewall 248 may include a host using one or more forms of reverse proxy services to proxy traffic before passing it to a gateway router. The database firewall 248 may inspect the contents of database traffic and block certain content or database requests. The database firewall 248 may work on the SQL application level atop the TCP/IP stack, managing applications' connection to the database or SQL management interfaces as well as intercepting and enforcing packets traveling to or from a database network or application interface.

In some implementations, communication with the database storage 256 may be conducted via the database switch 252. The multi-tenant database storage 256 may include more than one hardware and/or software components for handling database queries. Accordingly, the database switch 252 may direct database queries transmitted by other components of the on-demand database service environment (e.g., the pods 240 and 244) to the correct components within the database storage 256.

In some implementations, the database storage 256 is an on-demand database system shared by many different organizations. The on-demand database system may employ a multi-tenant approach, a virtualized approach, or any other type of database approach. An on-demand database system is discussed in greater detail with reference to FIGS. 1A and 1B.

FIG. 2B shows a system diagram further illustrating an example of architectural components of an on-demand database service environment according to some implementations. The pod 244 may be used to render services to a user of the on-demand database service environment 200. In some implementations, each pod may include a variety of servers and/or other systems. The pod 244 includes one or more content batch servers 264, content search servers 268, query servers 282, file force servers 286, access control system (ACS) servers 280, batch servers 284, and app servers 288. Also, the pod 244 includes database instances 290, quick file systems (QFS) 292, and indexers 294. In one or more implementations, some or all communication between the servers in the pod 244 may be transmitted via the switch 236.

In some implementations, the app servers 288 may include a hardware and/or software framework dedicated to the execution of procedures (e.g., programs, routines, scripts) for supporting the construction of applications provided by the on-demand database service environment 200 via the pod 244. In some implementations, the hardware and/or software framework of an app server 288 is configured to execute operations of the services described herein, including performance of the blocks of methods described with reference to FIGS. 3-35 In alternative implementations, two or more app servers 288 may be included and cooperate to perform such methods, or one or more other servers described herein can be configured to perform the disclosed methods.

The content batch servers 264 may handle requests internal to the pod. These requests may be long-running and/or not tied to a particular customer. For example, the content batch servers 264 may handle requests related to log mining, cleanup work, and maintenance tasks.

The content search servers 268 may provide query and indexer functions. For example, the functions provided by the content search servers 268 may allow users to search through content stored in the on-demand database service environment.

The file force servers 286 may manage requests for information stored in the Fileforce storage 298. The Fileforce storage 298 may store information such as documents, images, and basic large objects (BLOBs). By managing requests for information using the file force servers 286, the image footprint on the database may be reduced.

The query servers 282 may be used to retrieve information from one or more file systems. For example, the query system 282 may receive requests for information from the app servers 288 and then transmit information queries to the NFS 296 located outside the pod.

The pod 244 may share a database instance 290 configured as a multi-tenant environment in which different organizations share access to the same database. Additionally, services rendered by the pod 244 may call upon various hardware and/or software resources. In some implementations, the ACS servers 280 may control access to data, hardware resources, or software resources.

In some implementations, the batch servers 284 may process batch jobs, which are used to run tasks at specified times. Thus, the batch servers 284 may transmit instructions to other servers, such as the app servers 288, to trigger the batch jobs.

In some implementations, the QFS 292 may be an open source file system available from Sun Microsystems® of Santa Clara, Calif. The QFS may serve as a rapid-access file system for storing and accessing information available within the pod 244. The QFS 292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 268 and/or indexers 294 to identify, retrieve, move, and/or update data stored in the network file systems 296 and/or other storage systems.

In some implementations, one or more query servers 282 may communicate with the NFS 296 to retrieve and/or update information stored outside of the pod 244. The NFS 296 may allow servers located in the pod 244 to access information to access files over a network in a manner similar to how local storage is accessed.

In some implementations, queries from the query servers 222 may be transmitted to the NFS 296 via the load balancer 228, which may distribute resource requests over various resources available in the on-demand database service environment. The NFS 296 may also communicate with the QFS 292 to update the information stored on the NFS 296 and/or to provide information to the QFS 292 for use by servers located within the pod 244.

In some implementations, the pod may include one or more database instances 290. The database instance 290 may transmit information to the QFS 292. When information is transmitted to the QFS, it may be available for use by servers within the pod 244 without using an additional database call.

In some implementations, database information may be transmitted to the indexer 294. Indexer 294 may provide an index of information available in the database 290 and/or QFS 292. The index information may be provided to file force servers 286 and/or the QFS 292.

III. Interacting with Multiple Records Via a Publisher and an Information Feed

Figure 3:
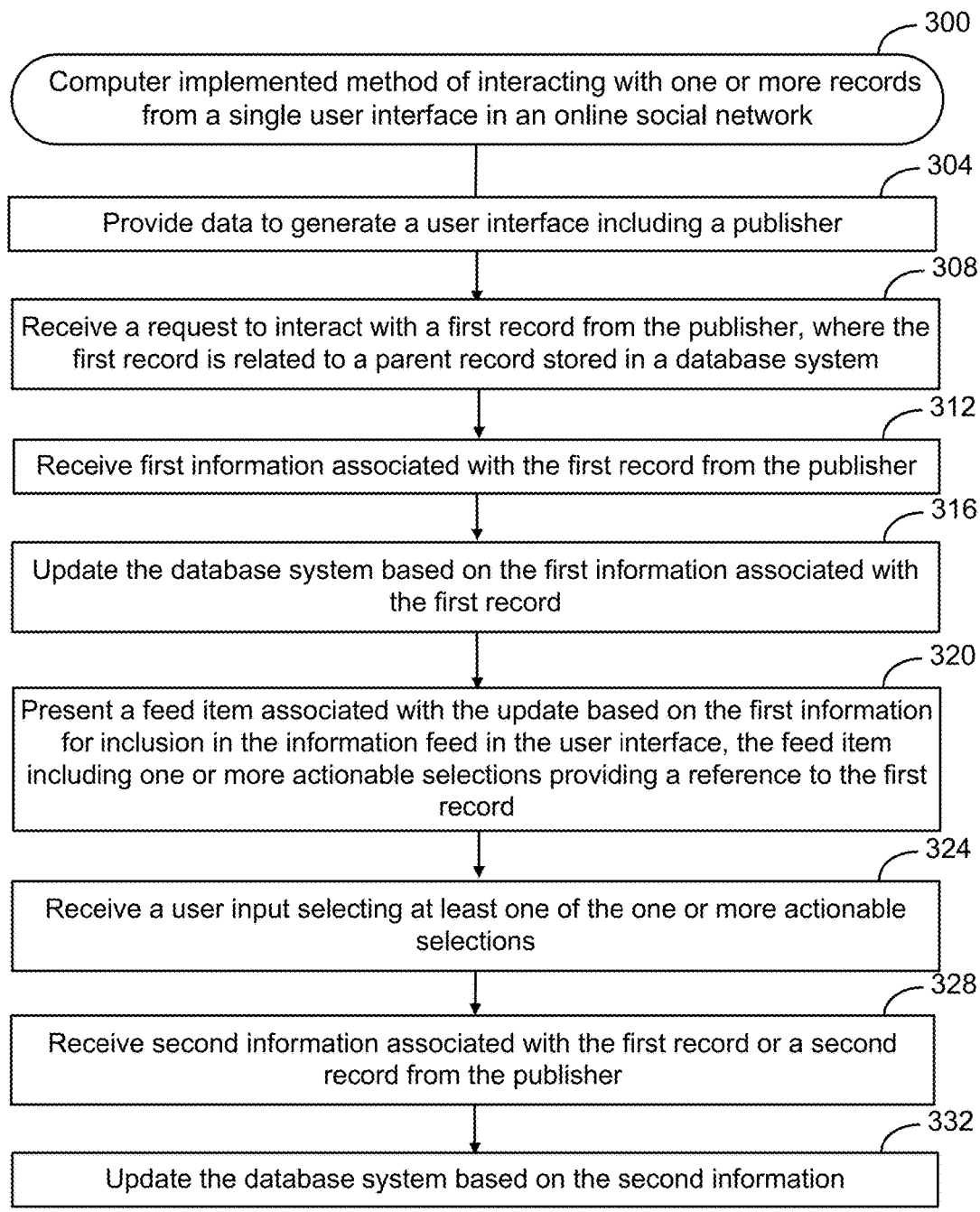
FIG. 3 shows a flowchart of an example of a computer implemented method 300 for interacting with one or more records from a single user interface in an online social network, performed in accordance with some implementations.

FIG. 3 shows a flowchart of an example of a computer-implemented method 300 for interacting with one or more records from a single user interface in an online social network, performed in accordance with some implementations. FIG. 3 may be described with reference to FIGS. 6-17. At block 304, a computing device or any number of computing devices cooperating to perform the method 300 may provide data to generate a user interface including a publisher. The publisher may be configured to publish information to an information feed. In some implementations, the user interface may simultaneously display the information feed with the publisher. The user interface may be part of a page layout for a user, record, or other entity in the online social network.

Figure 6:
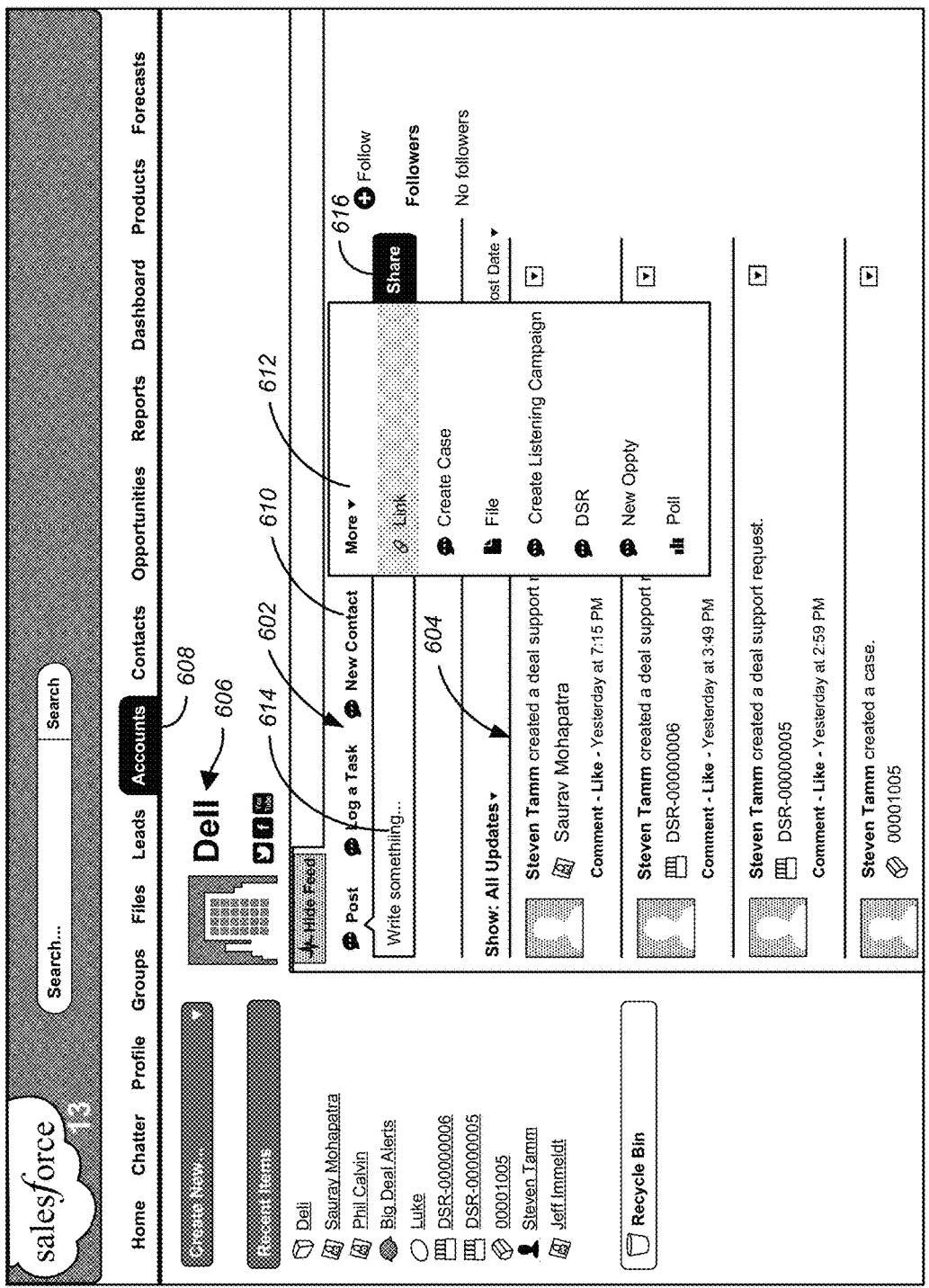
FIG. 6 shows an example of a record with a user interface including a publisher and an information feed, according to some implementations.

FIG. 6 shows an example of a record with a user interface including a publisher 602 and an information feed 604, according to some implementations. In FIG. 6, an accounts page 606 for Dell is in the form of a graphical user interface (GUI) as displayed on a display device. A user may navigate to the accounts page 606 by selecting a tab 608 from among a plurality of tabs in the user interface. A request to interact with a record may be generated in response to a user selecting a button, link, tab, or menu selection in the publisher 602. In some implementations, the record may be related to a parent record that is associated with the accounts page 606. The publisher may include one or more publisher actions 610 to allow a user to make a request to interact with the record. Examples of such publisher actions 610 as displayed in the publisher 602 include "Post", "Log a Task", and "New Contact". As illustrated in the example in FIG. 6, selecting "More" initiates a drop-down menu 612 to allow a user to select from more publisher actions 610 to interact with a record. Such additional publisher actions 610 include "Link", "Create Case", "File", "Create Listening Campaign", "DSR", "New Oppty", and "Poll". In addition, the publisher 602 in the accounts page 606 includes a text box 614 for entry of a message. The publisher 602 also includes a share button 616 to transmit data from the publisher 602, including the message in the text box 612, to one or more computing devices and stored in one or more database systems. Some of the data may be presented in a feed item in the information feed 604 in response to the transmission of data from the publisher 602.

Figure 7:
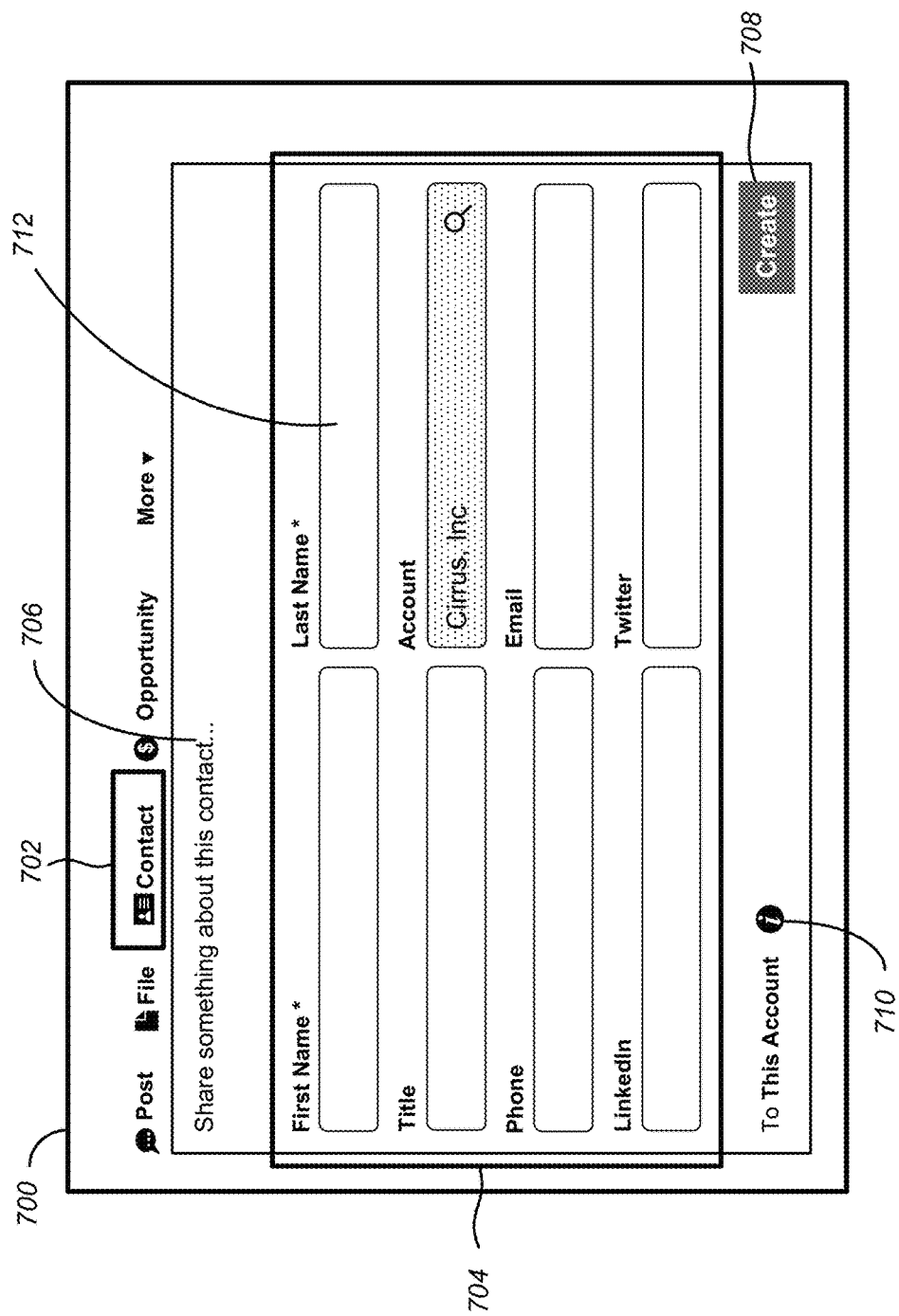
FIG. 7 shows an example of a publisher, according to some implementations.

FIG. 7 shows an example of a publisher 700, according to some implementations. The publisher 700 is an interface that allows a user to publish information that will be published into a feed. The publisher 700 may provide an interface displaying any one of a variety of designs or layouts, which can be programmed according to different preferences or requirements. For example, the interface of the publisher 700 may vary depending on whether the publisher 700 is being displayed on a web page, on a mobile device, on an automobile display, etc. Regardless of the design or layout of the interface, the publisher 700 can communicate with the same application programming interface (API) to perform the basic functionality of the publisher 700 of publishing information into a feed.

An example of an interface for the publisher 700 is shown in FIG. 7. The publisher 700 may include a plurality of publisher actions 702, a publisher space 704, a message body 706, a publishing button 708, and a share dropdown menu 710. Each of the publisher actions 702 may be in the form of GUI buttons, links, tabs, channels, or menu items. Publisher actions 702 may be enabled by the API for the publisher 700. Moreover, publisher actions 702 may be configured to perform a create or update operation for or with reference to a record.

Selection of one of the publisher actions 702 may cause the publisher space 704 to display data associated with the publisher action 702. By way of example, the publisher space 704 can include a form having a plurality of data fields 712 for creating a new contact, as illustrated in FIG. 7. In another example, the publisher space 704 may include content from one or more data sources, such as a web page. In still another example, the publisher space 704 may expose data from an application hosted on a third-party platform, such as Heroku™.

Data provided in the publisher space 704 may be published into an information feed. In FIG. 7, the plurality of data fields 712 allows a user to input information related to the creation of a new contact. Some of the data fields 712 may be greyed out with default values provided. Some of the data fields 712 may be starred to indicate that they are required fields. Such information in the data fields 712 may be published along with a message provided in the message body 706. The message can include any alpha-numeric or other character-based user inputs such as words, phrases, statements, questions, emotional expressions, and/or symbols. Selection of the publishing button 708 publishes the information provided in the data fields 712 and the message body 706 to appropriate information feeds. What entities the user wishes to share such information with can be provided by selection of entities from the share dropdown menu 710.

FIGS. 8A-8D show an example of a user interface with a publisher 808 and an information feed 804 for mobile device applications, according to some implementations. An API enables the publisher 808 to interface with a database system for any number of applications, including mobile device applications. In some implementations, an entity may develop the API for the publisher 808 so that any customer, partner, organization, or other user can write applications that utilize the API.

Figure 8C:
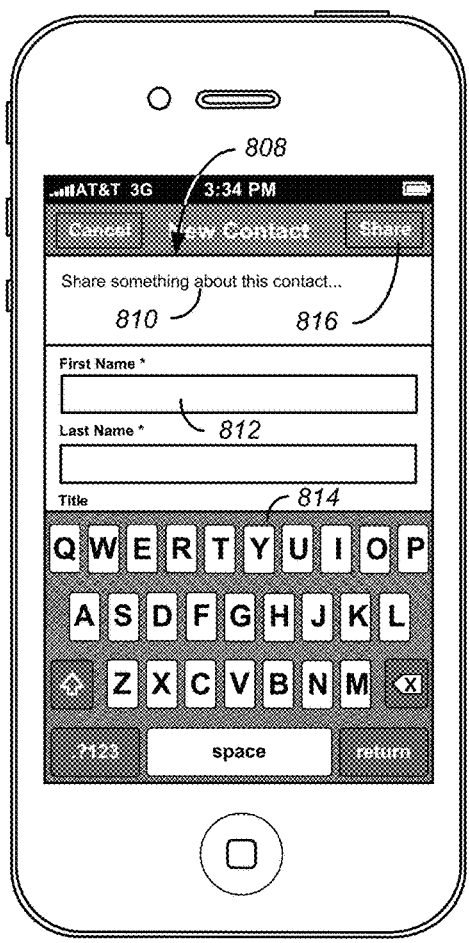
Figure 8D:
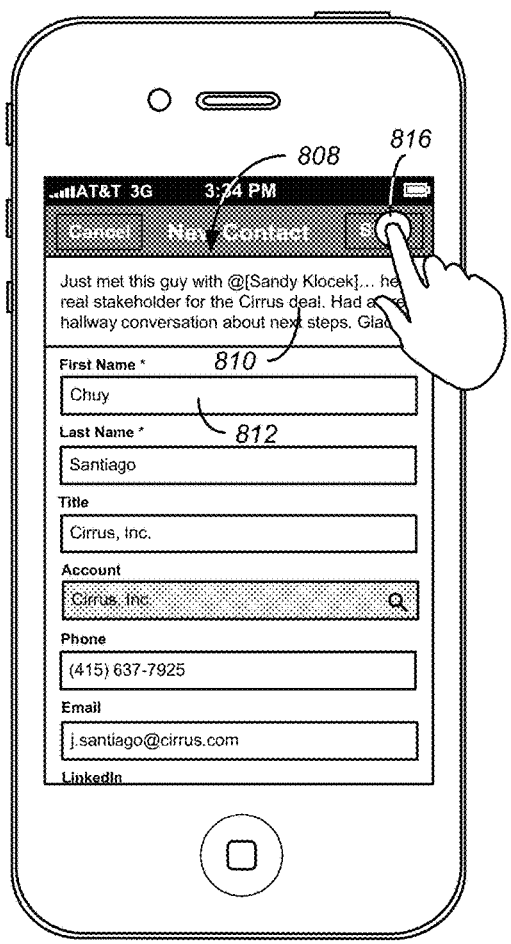

In FIG. 8A, a user interface for a mobile device may include a publisher button 802 and an information feed 804. The publisher button 802 enables a user to access a publisher 808 shown in FIG. 8B. The publisher 808 may cover over a portion of the information feed 804 in the user interface of the mobile device. The user may select from among a plurality of publisher actions 806 in the publisher 808. Publisher actions 806 include "Post", "Photo", "Files", "Task", "Contact", and "Check-In". Selection of a publisher action 806 may cause the publisher to display content and/or data fields associated with the publisher action 806. As shown in FIG. 8C, selection of the contact publisher action 806 causes the publisher 808 to display a text box 810 for posting a message and a plurality of data fields 812 for creating a new contact. In some implementations of mobile device applications, selection of the publisher action 806 causes the user interface to display a keyboard 814. After populating the data fields 812 and text box 810 with information, a user may select the share button 816 to publish the information to one or more appropriate feeds.

Figure 9:
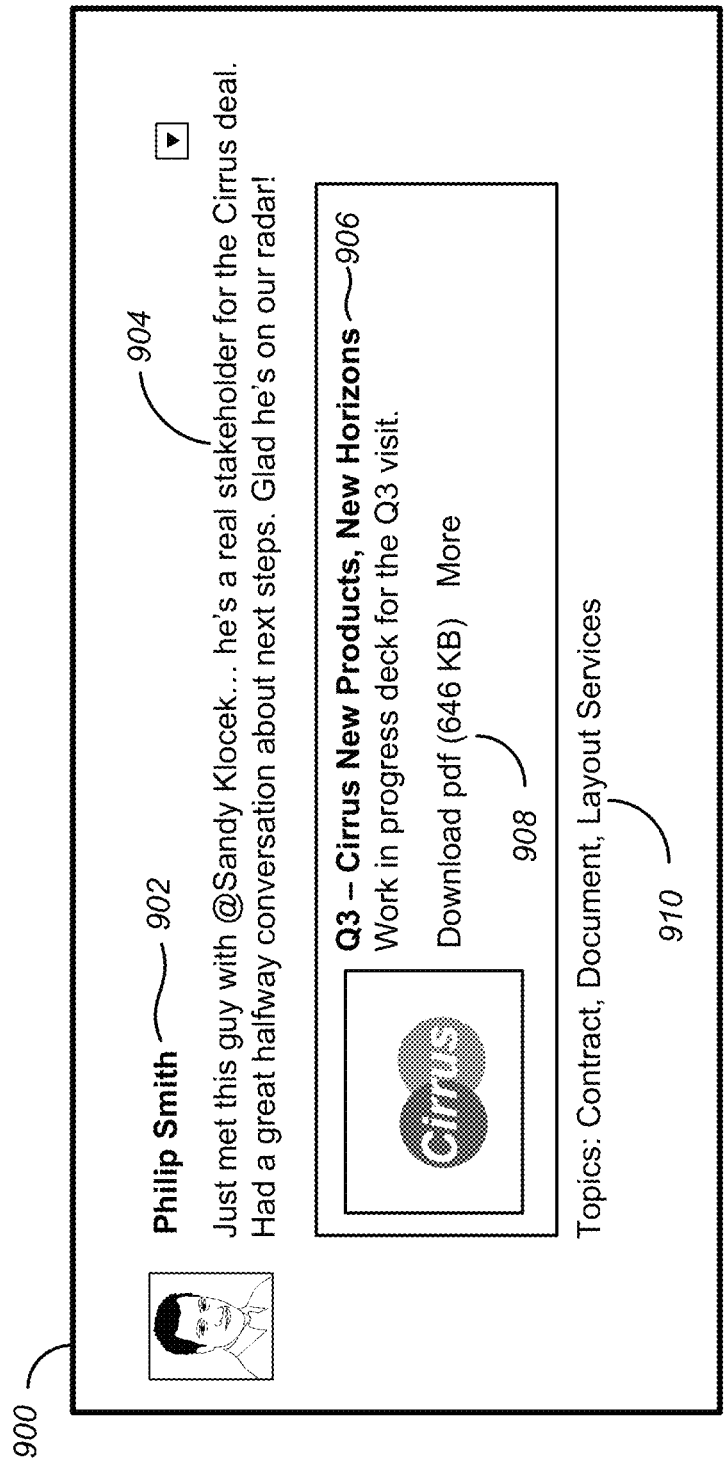
FIG. 9 shows an example of a feed item, according to some implementations.

A publisher may be configured to publish information to one or more information feeds by creating a visual feedback element, such as a feed item. FIG. 9 shows an example of a feed item 900, according to some implementations. The feed item 900 may include data submitted from a publisher. The feed item 900 may appear as part of an information feed in a user interface. Here, the feed item 900 includes the identity of the entity 902 updating or creating the record, a message 904 accompanying data from the publisher, the name of the record 906 being updated or created, an attachment 908, and topics 910. Other data from the publisher may also be presented in the feed item 900. In some implementations, the name of the record 906 may be an actionable selection or link that causes the user interface to display a page layout for the record. What information is displayed in the feed item 900 may depend on contextual factors, such the profile of the entity viewing the feed item 900 and the page layout on which the feed item 900 is displayed.

FIGS. 10A-10B show an example of a user interface with a publisher 1008 and a feed item 1020 in an information feed 1004 for mobile device applications, according to some implementations. Similar to the publisher 808 described in FIGS. 8A-8D, the publisher 1008 allows a user to input information into data fields 1012 and publish such information to an information feed 1004 using the share button 1016. The publisher 1008 may include additional publisher buttons 1018, such as an attachment button and a message post button to accompany the published information. In FIG. 10B, a feed item 1020 containing at least some of the information from the publisher 1008 may be presented in the information feed 1004. Here, field data 1022 is provided in the feed item 1020 for a task provided from the data fields 1012 in the publisher 1008.

Returning to FIG. 3, at block 308, a request to interact with a first record is received from the publisher at the one or more computing devices cooperating to perform the method 300. The first record is related to a parent record stored in the database system. The request at block 308 may be received from an entity via the publisher, such as a user who has a user profile in the online social network, via the user's smartphone, desktop, laptop, tablet, or other mobile computing device. In other instances, the request may be received from a group, an organization, or a record in the online social network.

In some implementations, the method 300 may further include determining that the entity has permission to interact with the first record. Conventionally, CRM systems limit the interaction with records to system administrators and owners of the records. As such, other users or groups cannot directly interact with a record without the assistance or permission of an owner or system administrator. Depending on the access permissions of an entity, limitations may be imposed on the types of records that the entity can interact with, and the page layouts that the entity is able to view for a specific type of record.

Determining whether an entity has permission to interact with the first record can at least include identifying one or more entity attributes of a profile of the entity. Attributes of the profile of an entity can include, for example, an entity's role or definition, an entity's relationship information, an entity's preferences, an entity's usage patterns, and other metadata associated with an entity's profile. For example, an entity's role can indicate membership to a team that collaborates on a certain account record, and permission to interact with a record can be determined if the entity is a collaborator to that account record. In another example, an entity's role can indicate a job title in an organizational hierarchy. Depending on where the entity stands in the organizational hierarchy, the entity may or may not have permission to interact with a certain record.

Additionally, determining whether an entity has permission to interact with the first record can at least include identifying one or more record attributes of the first record. Attributes of the first record can indicate the type of record, such as whether the record is a lead, a case, an account, an opportunity, a task, an event, a contact, or a custom object. Attributes of the first record can also provide other metadata about the record. For example, a type of record can be a case, and the case can also be a technical issue case (e.g., bug) or an order processing case (e.g., deal) for an account. One entity may be permitted to interact with the technical issue case but not the order processing case, and vice versa.

Moreover, determining whether an entity has permission to interact with the first record can at least include comparing the one or more entity attributes with the one or more record attributes. For example, if an entity is identified as Vice President of Sales, then he can access and interact with all cases for an account. If an entity is identified as a Sales Associate, then he can access and interact with limited types of cases for an account, such as cases involving a particular product, for example.

In some implementations, even if an entity has permission to interact with the first record, the types of interactions can be limited. Such limitations can be established, for example, by a system administrator, an owner of the first record, or an organization's security/permissions policy, among others. In some implementations, an entity may be restricted to perform only certain actions for interacting with the first record. Thus, a publisher in the user interface may disable, hide, or otherwise not display at least some publisher actions from the entity. For example, one entity may be able to view, update, and create opportunities related to an account, and another entity may be able to only view and update opportunities related to the same account. In some implementations, an entity may be restricted to view only certain types of information or options for interacting with a record. For example, one entity may be able to update all the terms for a contract, and a different entity may be able to update only certain terms for the same contract. In another example, one entity may be able to view public and private information related to an account, and a different entity may be able to only view publicly available information related to the same account.

In some implementations, the request to interact with a first record may include a request to create a record, a request to delete a record, a request to update a record, a request to convert a record, a request to attach a file to a record, a request to download data from a record, a request to upload data to a record, a request to view information associated with a record, and a request to otherwise perform an operation having a reference to the record. For example, such operations can include but is not limited to drafting an email, approving or rejecting a workflow approval, writing a note, creating a poll, logging a call, logging a task, logging a bug, creating an event, sending an email, submitting an email for approval, posting to a portal, posting to a social network, adding a link, adding a "Thanks", etc. In some implementations, the first record may be a customer relationship management (CRM) object. A CRM object can include but is not limited to a lead, a case, an account, an opportunity, a task, a contact, a campaign, a contract, an event, a custom object, and a Visualforce page. The request to interact with the first record may be generated in response to a user selecting a publisher or custom action in the user interface.

The request to interact with the first record may be a request to interact with a child record related to a parent record stored in a database system. Here, the parent-child relationship refers to a hierarchical relationship among records in a database system. For example, an opportunity can be a child in relation to an account, while the account is the parent. In another example, a task can be a child in relation to a lead, while the lead is the parent.

Figure 11:
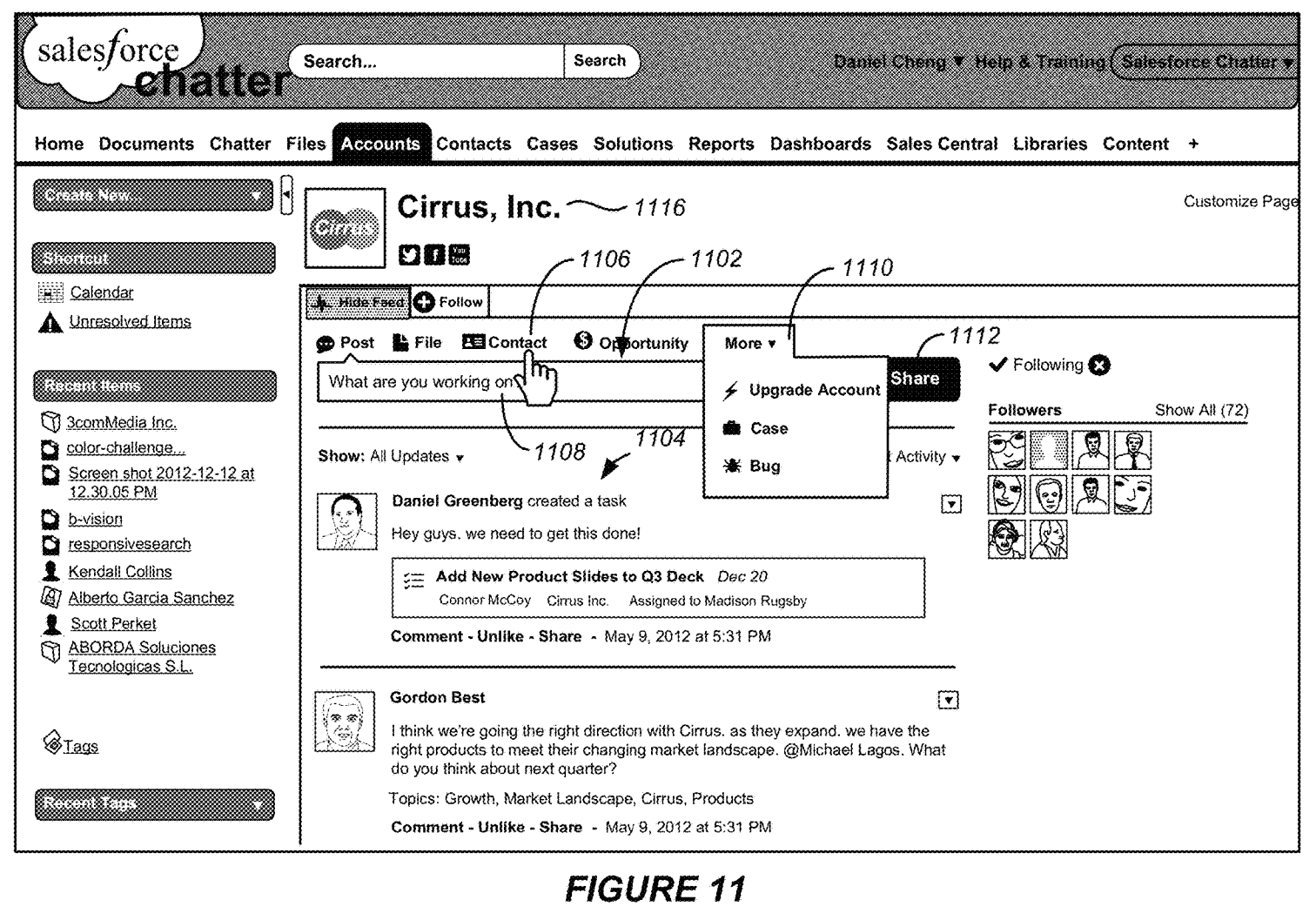

FIG. 11 shows an example of a record with a user interface including a publisher 1102 and an information feed 1104, according to some implementations. The publisher 1102 includes a plurality of publisher actions 1106, a text box 1108 for a message, a dropdown menu 1110 for displaying additional publisher actions 1106, and a share button 1112. The publisher 1102 may include at least one custom action from among the plurality of publisher actions 1106. The custom action may be an action enabled by the API for the publisher 1102. In some implementations, the custom action may be customized by an entity utilizing the API. Additional details regarding the customization of the custom action is provided in Section IX below.

In FIG. 11, an accounts page 1116 for Cirrus, Inc. includes the publisher 1102 with the plurality of publisher actions 1106. In some implementations, the same publisher 1102 may appear in other pages for different records and entities. In some instances, the publisher actions 1106 may even be the same. A user may navigate through multiple pages for different records and entities displaying a single or similar user interface.

Here, a user may initiate a request to interact with a record by selecting the publisher action 1106 "Contact" to initiate creation of a new contact. The new contact is a child record in relation to the account, and the account is the parent record. It is understood that any of the publisher actions 1106 may be selected to communicate with an API and initiate a request to interact with a record.

Returning to FIG. 3, at block 312, first information associated with the first record is received from the publisher at the one or more computing devices. The first record may be stored or configured to be stored in a database system. The first information may be provided by the entity (e.g., user) requesting to interact with the first record at block 308. The first information may be communicated to one or more computing devices performing the method 300, for instance, as a signal network 14 in FIGS. 1A and 1B. In some implementations, the entity may provide field data in one or more data fields associated with a selected publisher action. For example, an event record may include field data such as date and time of the event, the names of invitees, and the venue. In another example, a task may include field data such as the name of the task, name or names of the assignee to the task, and a due date.

Figure 12:
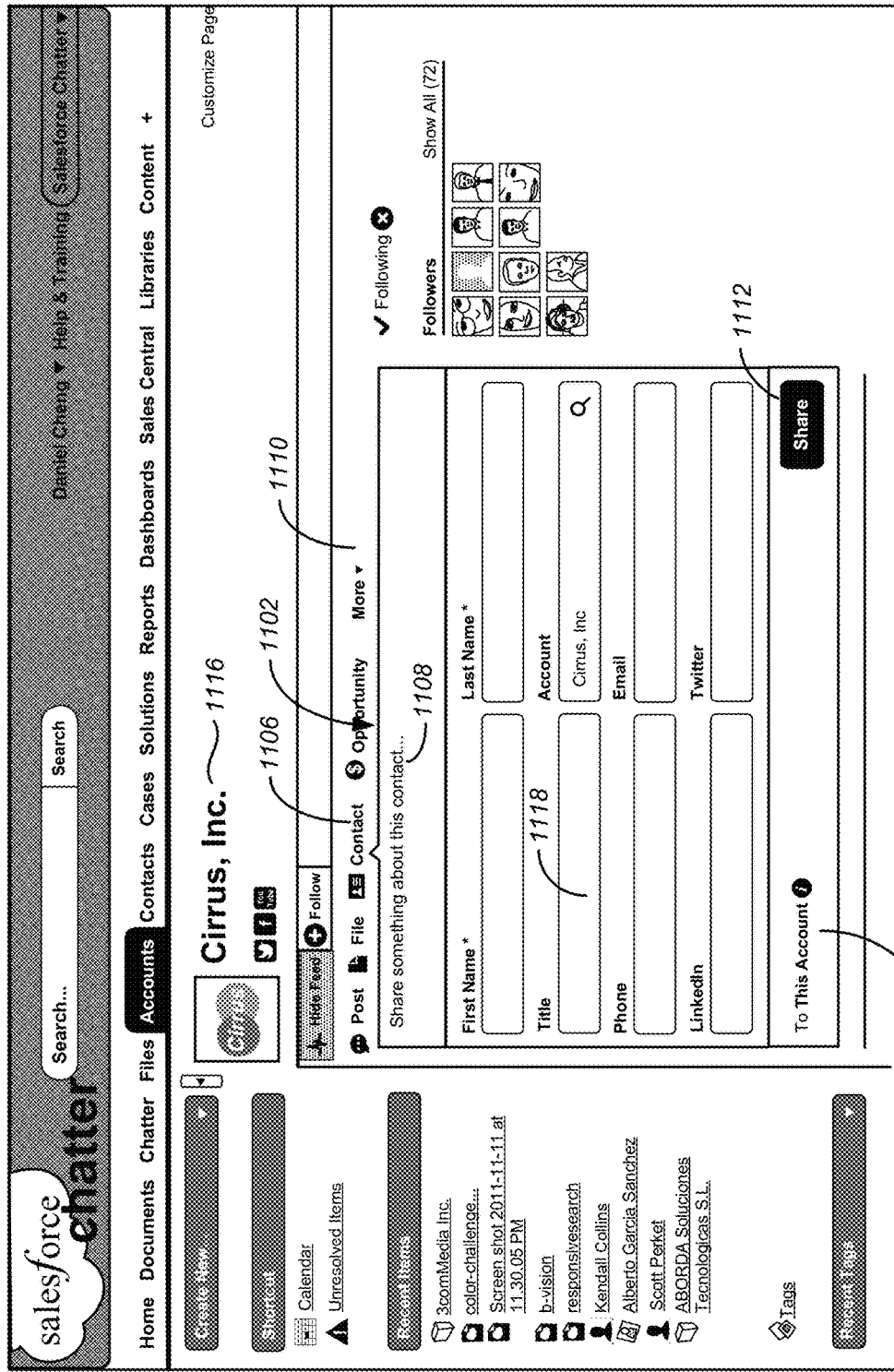
FIG. 12 shows an example of the record in FIG. 11 with a user interface displaying a plurality of empty data fields upon selection of a publisher action, according to some implementations.

FIG. 12 shows an example of the record in FIG. 11 with a user interface displaying a plurality of empty data fields 1118 upon selection of a publisher action 1106, according to some implementations. As illustrated in FIG. 12, selection of the publisher action 1106 for creating a new contact causes the publisher 1102 to display data fields 1118, including First Name, Last Name, Title, Account, Phone, Email, LinkedIn, and Twitter. Some data fields 1118 for the creation of the new contact may be populated with default values, or even restricted with predefined values designated by a system administrator in accordance with a security clearance/permissions model. For example, the Account data field is restricted to establish a record relationship for the new contact with the parent record, namely the Cirrus, Inc. account. The publisher 1102 further displays a share dropdown menu 1120 for sharing the publisher information with one or more selected entities as well as a share button 1112 to publish the publisher information to one or more information feeds of at least the selected entities.

Figure 13:
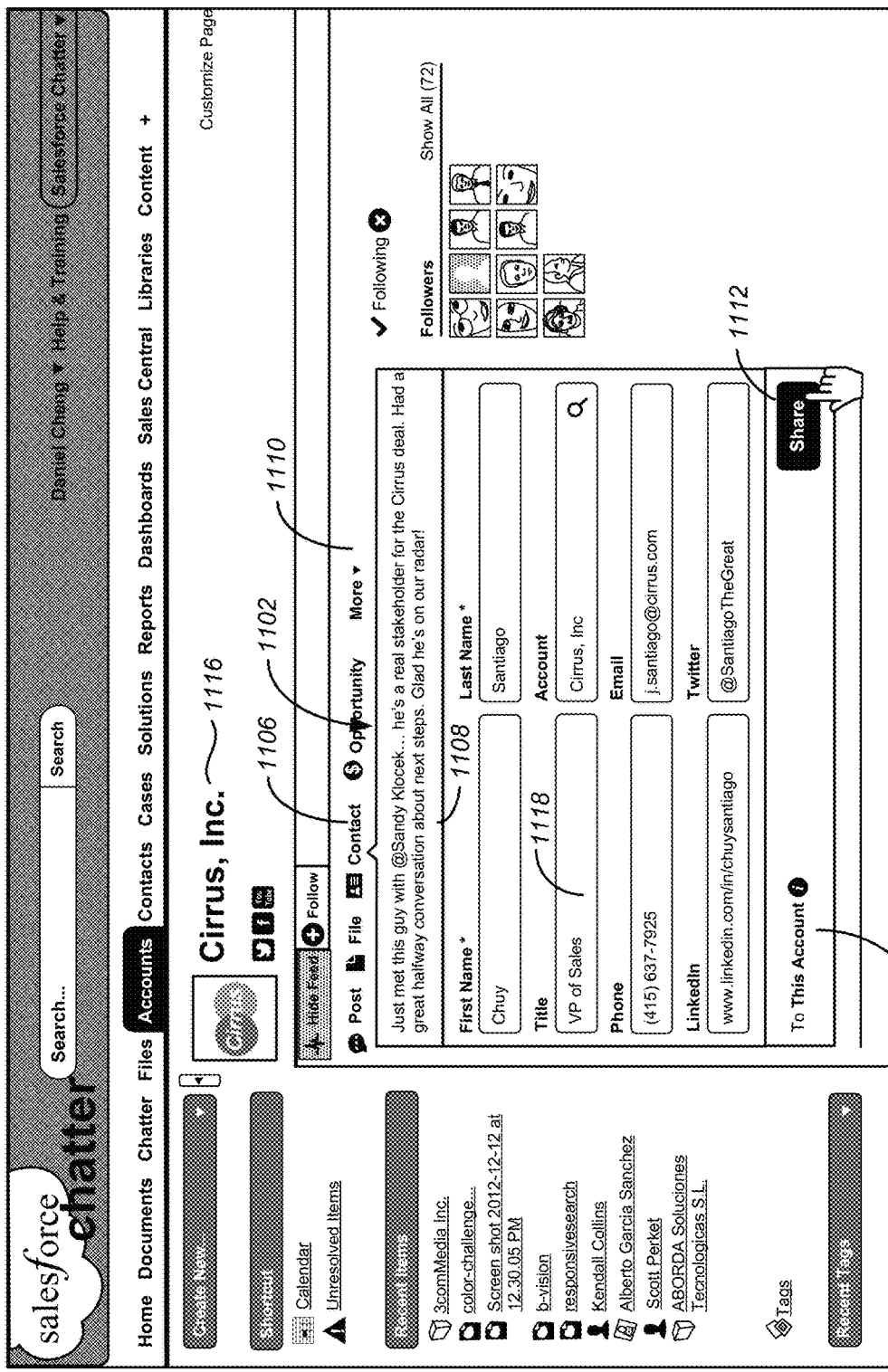
FIG. 13 shows an example of the record in FIG. 12 with a user interface displaying a plurality of filled data fields upon receiving user input, according to some implementations.

FIG. 13 shows an example of the record in FIG. 12 with a user interface displaying a plurality of filled data fields 1118 upon receiving user input, according to some implementations. A user may input values into each of the data fields 1118. In some implementations, the values in each of the data fields 1118 may be machine- or system-generated. The values in each of the data fields 1118 may be retrieved from database services such as Data.com® or Database.com™. The values in each of the data fields 1118 are used to perform the requested interaction with a record, namely to create a child record. Further, the values in each of the data fields 1118 provide information to be stored in a database system. A user may also include a message in the text box 1108, such as a comment, which may describe additional contextual information about the new contact. This can include why the contact is useful or significant. In this way, a user can use a publisher 1102 to simultaneously create a contact record and generate a comment to accompany the creation of the contact record. The message in the text box 1108 and the information in the data fields 1118 may be submitted via the publisher 1102 by selecting the share button 1112.

Returning to FIG. 3, at block 316, the database system is updated based on the first information associated with the first record. Updates to the first record may include creation of the record, deletion of the record, editing data associated with the record, logging an action to the record, conversion of the record, attachment of a file to the record, downloading data from the record, uploading data to the record, viewing of information associated with the record, and otherwise performing an operation having a reference to the record. In other words, the first information associated with the first record at block 316 is used to perform the requested interaction at block 308. Upon receiving the first information, the one or more computing devices can create or update a row representing the first record in the database system. For example, in logging an action to the record, an update may be performed after an email is sent and then logged to the record, or after a post is submitted to an online social network like Twitter® or Facebook® and then logged to the record. In effect, the publisher can perform actions that have behaviors outside of the network domain of the record. Nevertheless, such actions are logged to the record.

At block 320, a feed item associated with the update is presented for inclusion in an information feed in the user interface. The feed item includes one or more actionable selections providing a reference to the first record. The reference to the actionable selection can be a display component such as a menu, link, or graphical button. In some implementations, the reference to the first record can open a page in the user interface for the first record. In this way, a user can navigate to the first record directly from the feed item. It is not necessary for a user to navigate between records by navigating between different user interfaces.

In some implementations, the reference to the first record can perform further actions with respect to the first record. In addition to opening the first record, such actions may include but is not limited to creating a second record, deleting the first record, updating the first record, converting the first record, attaching a file to the first record, downloading data from the first record, uploading data to the first record, viewing information associated with the first record, and otherwise performing an operation having reference to the first record. More specifically, examples of actions may include creating a task, updating a task, creating an opportunity, updating an opportunity, creating a contact, updating a contact, creating a case, updating a case, creating an account, updating an account, creating an event, updating an event, logging a call, logging a task, logging a bug, approving a workflow approval, rejecting a workflow approval, creating an email, writing a note, creating a poll, closing a case, completing a task, closing a bug, sending an email, submitting an email for approval, posting to a portal, posting to a social network, adding a link, and adding a "Thanks" Thus, actions may be performed directly from the feed item upon the first record without navigating to another page.

The one or more actionable selections may reference the publisher to provide more data fields that enables a user to further interact with the first record. In some implementations, selecting the one or more actionable selections may cause the publisher to be operable to receive second information. The second information may be used to perform one of the operations on the first record. Or, the second information may be used to interact with the second record. The second record may have a parent-child relationship with the first record. In some implementations, the second record is a child of the first record. In this way, providing a reference to perform further actions from the feed item allows a user to perform actions directly within the information feed itself.

Figure 14:
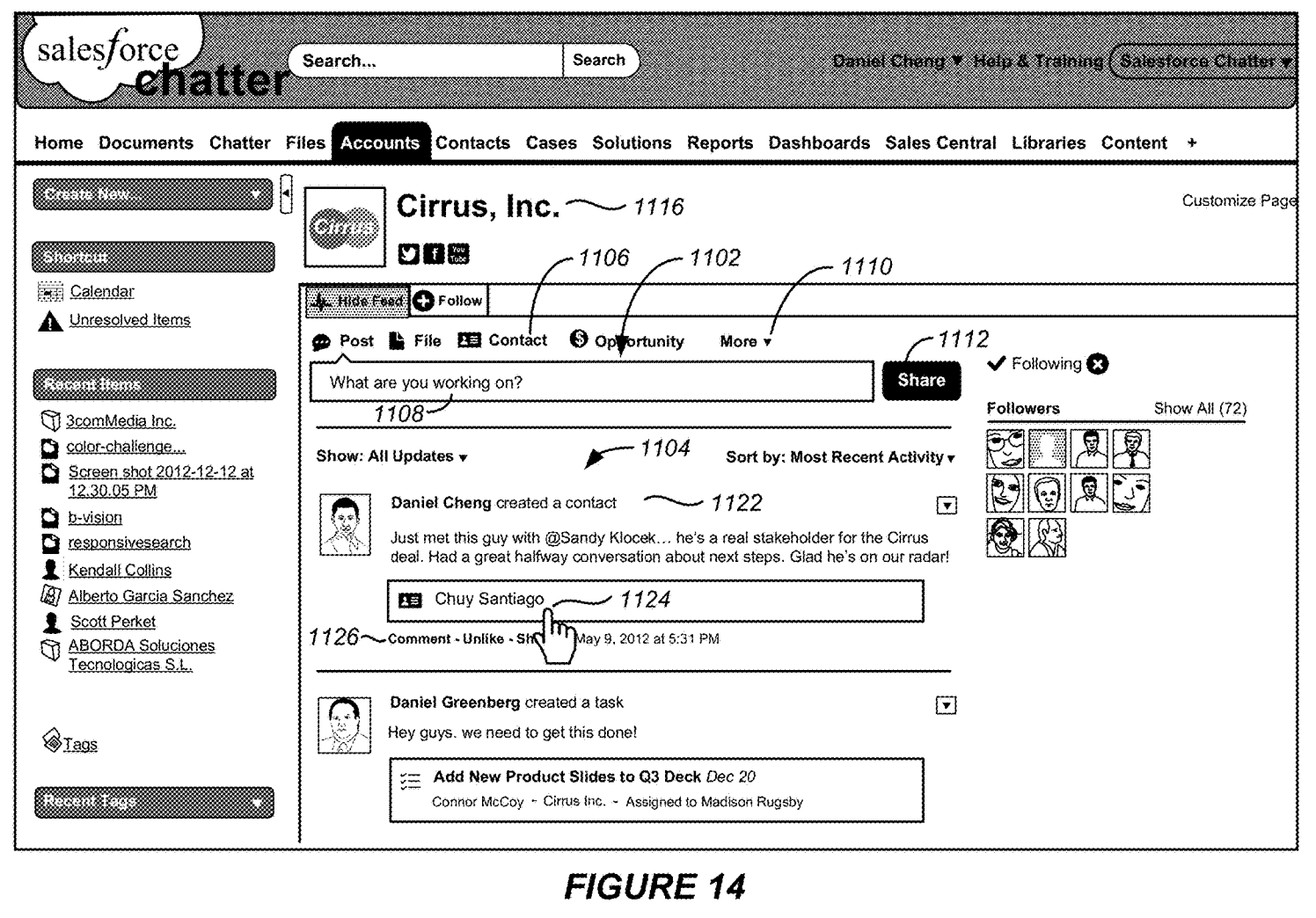

FIG. 14 shows an example of the record in FIG. 13 with a user interface including the information feed 1104 with a feed item 1122 presenting updated data from the publisher 1102 and a link 1124 to a child record, according to some implementations. The feed item 1122 is presented at the top of the information feed 1104 for the parent record. The feed item 1122 can include information regarding the interaction on the record that was performed. The feed item 1122 in FIG. 14 as displayed in the information feed 1104 of the accounts page 1116 indicates that the user "Daniel Cheng created a contact". In some instances, the feed item 1122 can include additional data provided in data fields 1118 in the publisher 1102. However, not all data provided in the data fields 1118 are necessarily contained in the feed item 1122. How such data is rendered in the feed item 1122 may depend on contextual factors, such as the profile of the user viewing the feed item 1122 and the page layout in which the feed item 1122 is displayed. The feed item 1122 also includes an actionable selection or link 1124 to the created or updated record. In FIG. 14, the newly created contacts record is displayed as a link 1124 "Chug Santiago". A user may also perform various actions on the feed item 1122, including posting a comment to the feed item 1122, liking or disliking the feed item 1122, or sharing the feed item 1122. Such actions may affect the same feed item 1122 as presented in other related feeds.

A user may select the link 1124 to advance from the account record for Cirrus, Inc. to the contact record for Chuy Santiago. This allows a user to efficiently navigate to another record directly from the information feed 1104.

Returning to FIG. 3, at block 324, a user input is received selecting the one or more actionable selections. The one or more actionable selections may be a menu, graphical button, or link configured to provide a reference to the first record. The reference to the first record may perform an action with respect to the first record, such as opening the first record in the user interface, creating a second record from the first record, updating the first record, deleting the first record, converting the first record, attaching a file to the first record, downloading data from the first record, uploading data to the first record, viewing information associated with the first record, or otherwise performing an operation having a reference to the first record. For example, the actionable selection can be a reply button to respond to an email. In another example, the actionable selection can be an approve button to respond to a workflow approval request. In some implementations, the reference to the first record may cause the publisher to be operable to receive second information associated with a second record.

At block 328, second information associated with the first record or a second record is received from the publisher at the one or more computing devices. The second record may be a child record of the first record or of the parent record. The second record may be stored or configured to be stored in the database system. In some implementations, the second record may be a CRM object, such as a lead, a case, an account, an opportunity, a task, a contact, a campaign, a contract, an event, a custom object, and a Visualforce page. In some implementations, the second information may be provided in one or more data fields associated with the first record or the second record. The values in the one or more data fields may be user-defined or system-generated. In some implementations, values may be retrieved from a database service such as Data.com® or Database.com™.

At block 332, the database system is updated based on the second information. Updates to the first record or second record may be made via the publisher without leaving the user interface, which can include the publisher and the information feed. Thus, multiple interactions may be performed with one or more records from a single user interface.

In FIG. 3, in one example, an app server 288 in the on-demand service environment 200 of FIGS. 2A and 2B includes one or more processors configured to perform part or all of blocks 304-332. In other instances, additional servers cooperate with app server 288 to perform the blocks. When first information, for example, is received at block 312, such information can be received by a server over a data network from a user operating a user system 12 as shown in FIGS. 1A and 1B. In other instances, such data is received from a proxy server on behalf of a user or other data source. Various implementations of method 300 are possible, such that any of the servers described above with reference to FIG. 2B or other computing devices disclosed herein can be configured to receive and process user inputs and information updates in accordance with method 300.

In some implementations, interactions with multiple records through a common user interface can be exemplified in the method 300 of FIG. 3. Such interactions can advance a CRM or non-CRM lifecycle while operating in the context of a publisher and an information feed. An example of a CRM lifecycle can be shown in FIGS. 11-14, as discussed earlier herein. Another example of a CRM lifecycle can be shown in FIGS. 15-17.

Figure 16:
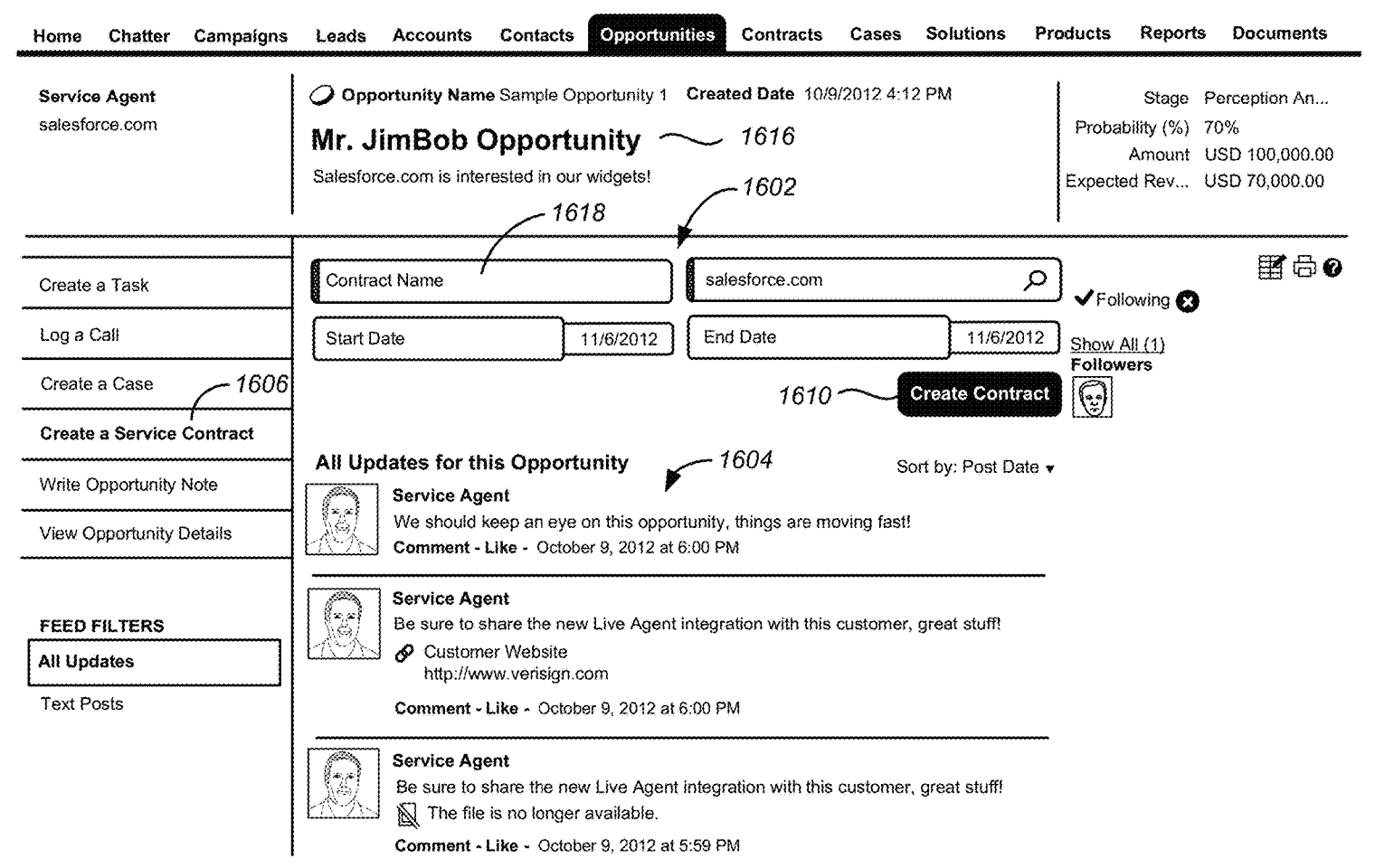

FIGS. 15-17 illustrate an example of stages of advancing a CRM lifecycle from a single user interface, which includes a publisher and information feed. FIG. 15 shows an example of a lead record with a user interface including a publisher 1502 and an information feed 1504, according to some implementations. For example, a service agent who met or knows a Mr. JimBob as a potential customer may access the Mr. JimBob Lead page 1516, as shown in FIG. 15. Determination of the permissions for the service agent to access the Mr. JimBob Lead can be based on the service agent's profile. Appropriate publisher actions and information may be retrieved from a database system and displayed on the Mr. JimBob Lead page 1516 according to the service agent's profile. As discussed earlier herein, some information and/or actions may not be available for certain users. As shown in FIG. 15, a plurality of publisher actions 1506 in the publisher 1502 is displayed on the left side bar as channels to perform an action on the Mr. JimBob Lead. Publisher actions 1506 include "Create a Task", "Crease a Case", "Convert Lead", "Write Lead Note", and "View Lead Details".

The service agent may select any one of the publisher actions 1506 to cause the publisher 1502 to display data fields 1518 associated with the selected publisher action 1506. In some implementations, selection of the publisher action 1506 may cause the publisher 1502 to display an application or content from a data source. In FIG. 15, some of the data fields 1518 are text boxes configured to receive character-based values, one of the data fields 1518 is a checkbox, and some of the data fields 1518 are dropdown menus. The service agent may input values into some of the data fields 1518 in the publisher 1502. In some of the data fields 1518, the service agent may perform a search query and/or utilize an auto-complete function to input values. In some implementations, default values may be provided in some of the data fields 1518.

The service agent may publish information entered into the data fields 1518 by selecting the Convert Lead button 1510. The information from the publisher 1502 may be submitted to a database system. The Mr. JimBob Lead is deleted and a Mr. JimBob Opportunity is created, where the Mr. JimBob Opportunity is stored in the database system. In some implementations, another record may be simultaneously interacted upon with the creation of the Mr. JimBob Opportunity. In this instance, a task is simultaneously created with the conversion of the Mr. JimBob Lead to the Mr. JimBob Opportunity. A feed item (not shown) is created for presentation in the information feed 1504. The feed item may provide functionality in the user interface to navigate to the Mr. JimBob Opportunity page or perform other actions with reference to the Mr. JimBob Opportunity from the information feed 1504. The navigation and/or actions can be performed without leaving the user interface. In other words, the service agent or another entity need not navigate through separate user interfaces to perform actions on one or more records. The feed item may be published in multiple related feeds through cross-referencing, which is discussed in more detail in Section XIII below.

FIG. 16 shows an example of an opportunity record converted from the lead record in FIG. 15, with a user interface including a publisher 1602 an information feed 1604, according to some implementations. The lead record is removed from the database system and replaced with the opportunity record. To navigate to the Mr. JimBob Opportunity page 1616, the service agent may select an actionable selection in a feed item. From there, appropriate publisher actions and information may be retrieved from a database system and displayed in the Mr. JimBob Opportunity page 1616 according to the service agent's profile. As shown in FIG. 16, a plurality of publisher actions 1606 in the publisher 1602 is displayed on the left side bar as channels to perform an action on the Mr. JimBob Opportunity. Publisher actions 1606 include "Create a Task", "Log a Call", "Create a Case", "Create a Service Contract", "Write Opportunity Note", and "View Opportunity Details". The service agent may select any one of the publisher actions 1606 to cause the publisher 1602 to display data fields 1618 associated with the selected publisher action 1606.

In FIG. 16, the service agent has selected the publisher action 1606 for creating a service contract, with data fields

1618 for the contract name, start date, and end date. The service agent may input values into each of the data fields 1618 in the publisher 1602.

The service agent may publish information entered into the data fields 1618 by selecting the Create Contract button 1610. The information from the publisher 1602 may be submitted to a database system. A service contract record is created and stored in the database system. This may be represented by a row in a table in the database system. The service contract record is related to the Mr. JimBob Opportunity as a child record to a parent record. A feed item (not shown) is created for inclusion in the information feed 1604. The feed item may include functionality in the user interface to navigate to the service contract record or perform other actions with reference the service contract record from the information feed 1604. The navigation or actions can be performed without leaving the user interface.

FIG. 17 shows an example of the service contract record of the parent record in FIG. 16, with a user interface including a publisher 1702 and an information feed 1704, according to some implementations. To navigate to the service contract page 1716, the service agent may select an actionable selection in a feed item. From there, appropriate publisher actions and information may be retrieved from a database system and displayed in the service contract page 1716 according to the service agent's profile. As shown in FIG. 17, a plurality of publisher actions 1706 in the publisher 1702 is displayed on the left side bar as channels to perform an action on the service contract record. Publisher actions 1706 include "Add a Product", "Write Service Contract Note", and "View Service Contract Details". The service agent may select any one of the publisher actions 1706 to cause the publisher 1702 to display data fields 1718 associated with the selected publisher action 1706.

In FIG. 17, the service agent has selected the publisher action 1706 for adding a product, with data fields 1718 for the product, quantity, and sales price. The service agent may input values into each of the data fields 1718 in the publisher 1702.

The service agent may publish information entered into the data fields 1718 by selecting the Add button 1710. The information from the publisher 1702 may be submitted to a database system. A contract line item for a product is created and stored in the database system. This may be represented by a row in a table in the database system. The contract line item for the product is related to the service contract record as a child record to a parent record. A feed item (not shown) is created for presentation in the information feed 1704. The feed item may include functionality in the user interface to navigate to the contract line item or perform other actions with reference the contract line item from the information feed 1704. The navigation or actions can be performed without leaving the user interface.

A user can navigate and advance through a CRM lifecycle in a single and standardized user interface, as illustrated in FIGS. 15-17. Thus, a user does not need to navigate and learn multiple user interfaces to interact with each of the records through the CRM lifecycle. As records are created and/or updated, the user can immediately navigate and perform actions on the newly created or updated records through the information feed and the publisher. In other words, everything can be done through the information feed and the publisher in a CRM lifecycle.

In some implementations, the publisher and the information feed may also be utilized as a common user interface to advance a non-CRM lifecycle. By way of example, a financial services agent may receive a call from a customer regarding an investment. The financial services agent can input the customer information to access the customer's investment record. From the customer's investment record page, a user interface can include a publisher and an information feed. The financial services agent can add, remove, or update an investment in the customer's investment record via the publisher. A feed item is presented in the information feed of the customer's investment record with one or more actionable selections to the investment. The investment can include, for example, an IRA, a Roth IRA, or mortgage, among others. The financial services agent can access the investment through the feed item and continue to advance the non-CRM lifecycle.

In another example, a health insurance agent may receive a call from a customer regarding his or her insurance coverage. The health insurance agent may input the customer information to access the customer's health insurance plan. From the customer's health insurance plan page, a user interface can include a publisher and an information feed. In some implementations, a custom object may be provided with the user interface to represent the health insurance plan, coverage, product, limits, and coverage figures. Depending on the coverage that the customer is interested in, the health insurance agent can add, remove, or update the customer's health insurance plan via the publisher. This can include adding or removing products in the health insurance plan. This can also include updating limits and coverage figures. A feed item is presented in the information feed of the customer's health insurance plan with one or more actionable selections to the product or coverage. The health insurance agent can access the product or coverage through the feed item and continue to advance the non-CRM lifecycle.

In another example, a user may want to file an expense report under an account. The user may access the account record, where the user interface of the account record includes a publisher and an information feed. In some implementations, the publisher may expose a third-party application, such as Concur®, for expense reporting. In some implementations, the publisher may include a custom action, such as "File New Expense Report". The user may file the expense report via the publisher and publish the information into the information feed as a feed item. The feed item may include one or more actionable selections to link to the newly created expense report. The user may access the expense report through the feed item to advance the non-CRM lifecycle.

Figure 4:
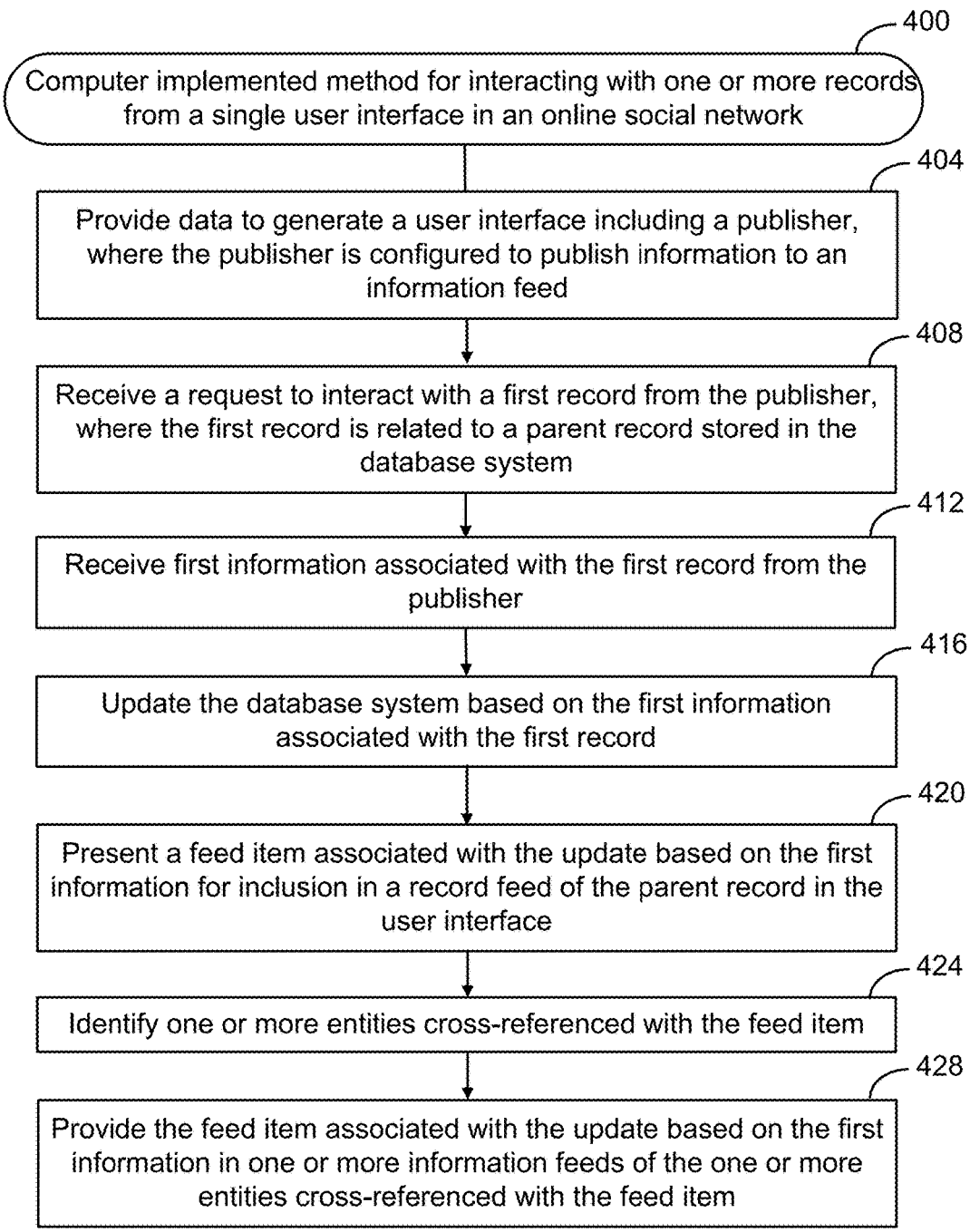
FIG. 4 shows a flowchart of an example of a computer implemented method 400 for interacting with one or more records from a single user interface in an online social network, performed in accordance with some implementations.

FIG. 4 shows a flowchart of an example of a computer implemented method 400 for interacting with one or more records from a single user interface in an online social network, performed in accordance with some implementations. FIG. 4 may be described with reference to FIGS. 18, 19A-19C and 20A-20C. At block 404, data is provided to generate a user interface including a publisher, as generally described above at block 304 of the method 300. At block 408, a request to interact with a first record is received from the publisher, as generally described above at block 308 of the method 300. The first record may be related to a parent record stored in a database system. At block 412, first information associated with the first record is received from the publisher, as generally described above at block 312 of the method 300. At block 416, the database system is updated based on the first information associated with the first record, as generally described above at block 316 of the method 300.

At block 420, a feed item associated with the update based on the first information is presented for inclusion in an information feed of the parent record in the user interface. The feed item may provide a visual feedback element representing the first information from the publisher in the information feed of the parent record. While the feed item may be presented for inclusion in a number of different feeds, as will be discussed in more detail below, the feed item may be at least presented for inclusion in the information feed of the parent record. In some implementations, the feed item may include one or more actionable selections providing a reference to the first record. As a result, a user can navigate to the first record directly from the feed item. In some implementations, the reference to the first record can perform further actions with respect to the first record. Such actions may include creating a second record, deleting the first record, updating the first record, converting the first record, attaching a file to the first record, downloading data from the first record, uploading data to the first record, viewing information associated with the first record, and otherwise performing an operation having reference to the first record (e.g., logging a call, creating an email, approving or rejecting a workflow approval, etc.). In some instances, selecting the one or more actionable selections may cause the publisher to be operable to receive second information.

Figure 18:
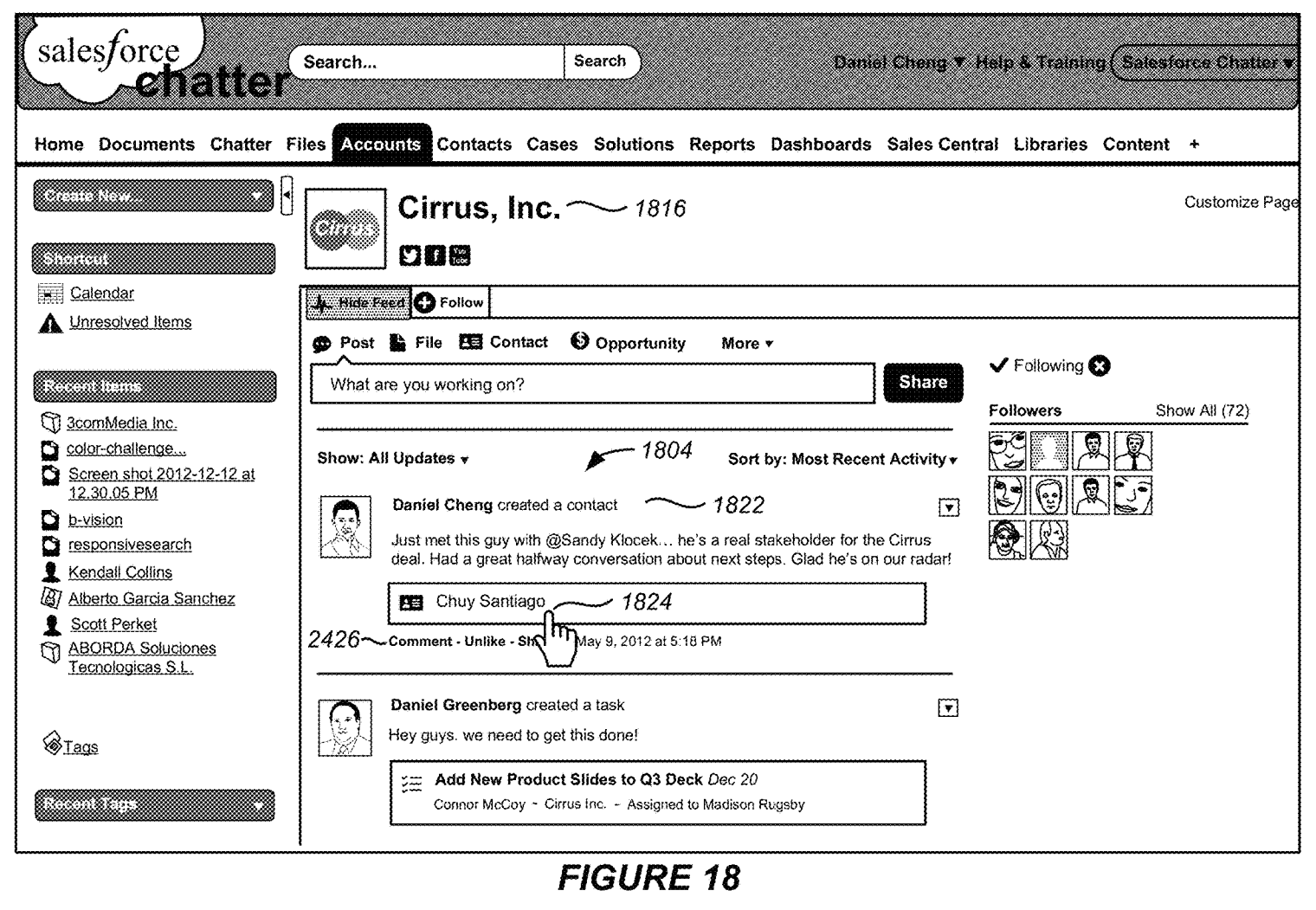

In FIG. 18, a feed item 1822 is presented for inclusion in an information feed 1804 for a parent record as shown in the accounts page 1816. After a user Daniel Cheng creates a new contact (child record), the feed item 1822 is published at the top of the information feed 1804 for the account (parent record). The feed item 1822 includes an actionable selection or link 1824 to the newly created contact "Chuy Santiago". A user may also perform various actions on the feed item 1822, including posting a comment on the feed item 1822, liking or disliking the feed item 1822, or sharing the feed item 1822. Such actions may affect the same feed item 1822 as presented in other related feeds. A user may select the link 1824 to advance from the account record for Cirrus, Inc. to the contact record for Chuy Santiago.

Returning to FIG. 4, at block 424, one or more entities cross-referenced with the feed item are identified. Cross-referencing of feed items can be achieved in a number of ways. Identification of cross-referenced entities can be obtained from cross-referencing data. In some implementations, such cross-referencing data may be received from an API. The number of cross-referenced entities may be limitless, and each of the cross-referenced entities may be defined by a payload in the API. For example, a user may define the cross-referencing data in the payload of the API. In some implementations, the API is utilized by the publisher to provide the payload and the cross-referencing data.

In some implementations, after receiving the request to interact with the first record, the publisher may be caused to display one or more data fields of the first record, the one or more data fields configured to receive the first information associated with the first record. At least one of the one or more data fields is configured to receive cross-referencing data defining the one or more entities to cross-reference with the feed item. The cross-referenced entities can include users, groups, organizations, and records. In some implementations, the cross-referencing data may be user-defined, such as defined by user input values in a payload.

In some other implementations, the cross-referencing data may be machine- or system-defined. In other words, identification of the cross-referenced entities may be hard-coded. For example, a system administrator or owner of the parent record can establish default values for the cross-referencing data. In some instances, the cross-referenced entities can include the first record and the parent record of the first record. In some instances, the cross-referenced entities can include the first record, the parent record of the first record, a child record of the first record, a user subscribing to the first record, the user interacting with the first record, and a user following the user interacting with the first record. It is understood that any number of combinations of the aforementioned entities may be cross-referenced with the feed item.

Identification of cross-referenced entities can be based at least in part on record relationship information, where the record relationship information can be retrieved from the database system. Record relationship information may indicate that a child record is related to one parent record or to multiple parent records. For example, record relationship information may indicate that a deal record is related to multiple account records in the database system. In some instances, the record relationship information may indicate that the child record is a parent record to further child records.

Record relationship information of the first record can help determine at least one of the one or more entities to be cross-referenced with the feed item. As the feed item is presented for inclusion in the information feed of the parent record of the first record, the feed item can be cross-referenced with other entities related to the parent record or the first record. What entities are related to the parent record and/or the first record can be provided by the record relationship information. For example, feed item can be cross-referenced with multiple parent records of the first record.

At block 428, the feed item associated with the update is provided in one or more information feeds of the one or more entities cross-referenced with the feed item. Where the feed item is propagated can be based on cross-referencing data or record relationship information. The same feed item as displayed in the information feed of the parent record may be propagated and displayed across multiple users, groups, organizations, and records. As a result, a single conversation thread may be published multiple times in the information feeds of different users, groups, organizations, and records. Cross-referencing of a feed item across multiple users, groups, organizations, and records may be preferred over copying or re-posting the feed item in different places. By copying or re-posting the feed item in different places, actions taken on an original feed item are not typically published in a copy of the original feed item or a re-posting of the original feed item. This can lead to several different conversation threads on the original feed item and copies of the feed original feed item. By propagating the same feed item across multiple entities with cross-referencing, other users can interact with or otherwise perform an action on the feed item without having to navigate across multiple user interfaces. For example, collaborators for a particular record can interact with the feed item from their news feed, the record feed of the parent record, or the record feed of the first record if the feed item is cross-referenced with such entities.

By way of example, a user can create a new task. In creating the new task, the user can associate the task with an opportunity and with a case. In addition, the user can associate the task with 10 contacts. Upon creating the task by a publisher, information regarding the task is published to a feed item. The feed item is cross-referenced with the opportunity, the case, and each of the 10 contacts so that the feed item is propagated in the information feeds of each of those entities.

Typically, a feed item is published within the information feed of the parent record, as discussed earlier herein. However, the feed item may be propagated and published in other information feeds of cross-referenced or related entities. By way of example, if a user is creating a contact (i.e., child record) from an account (i.e., parent record) page, then the feed item can be propagated in at least the accounts record feed. In some implementations, the feed item can also propagated in the record feed of the newly created contact. In some implementations, the feed item can also be propagated in other records feeds of multiple parent records of the newly created contact. In some implementations, the feed item can also be propagated in the news feed of users subscribed to the parent record or the child record.

Figure 19A:
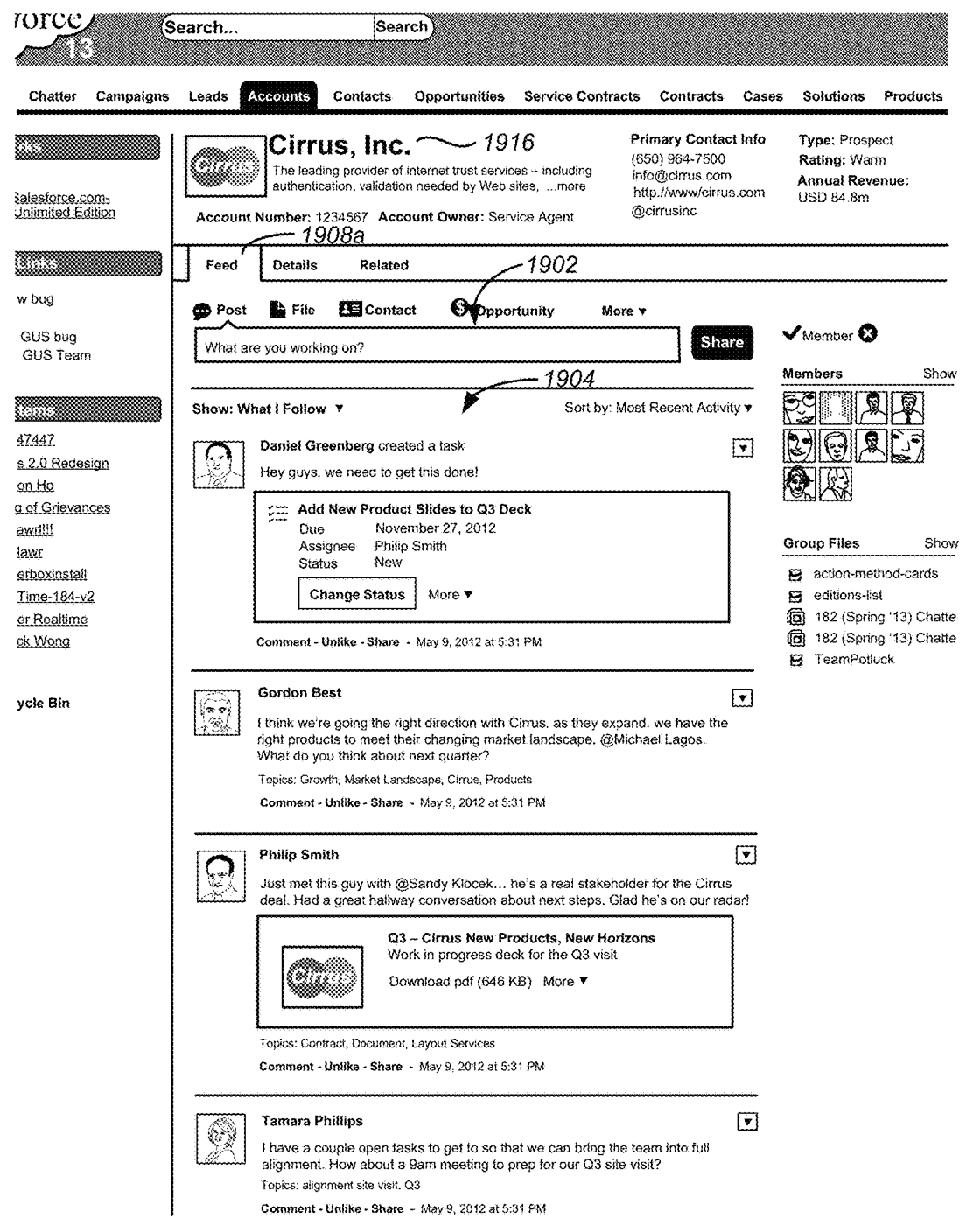
Figure 19B:
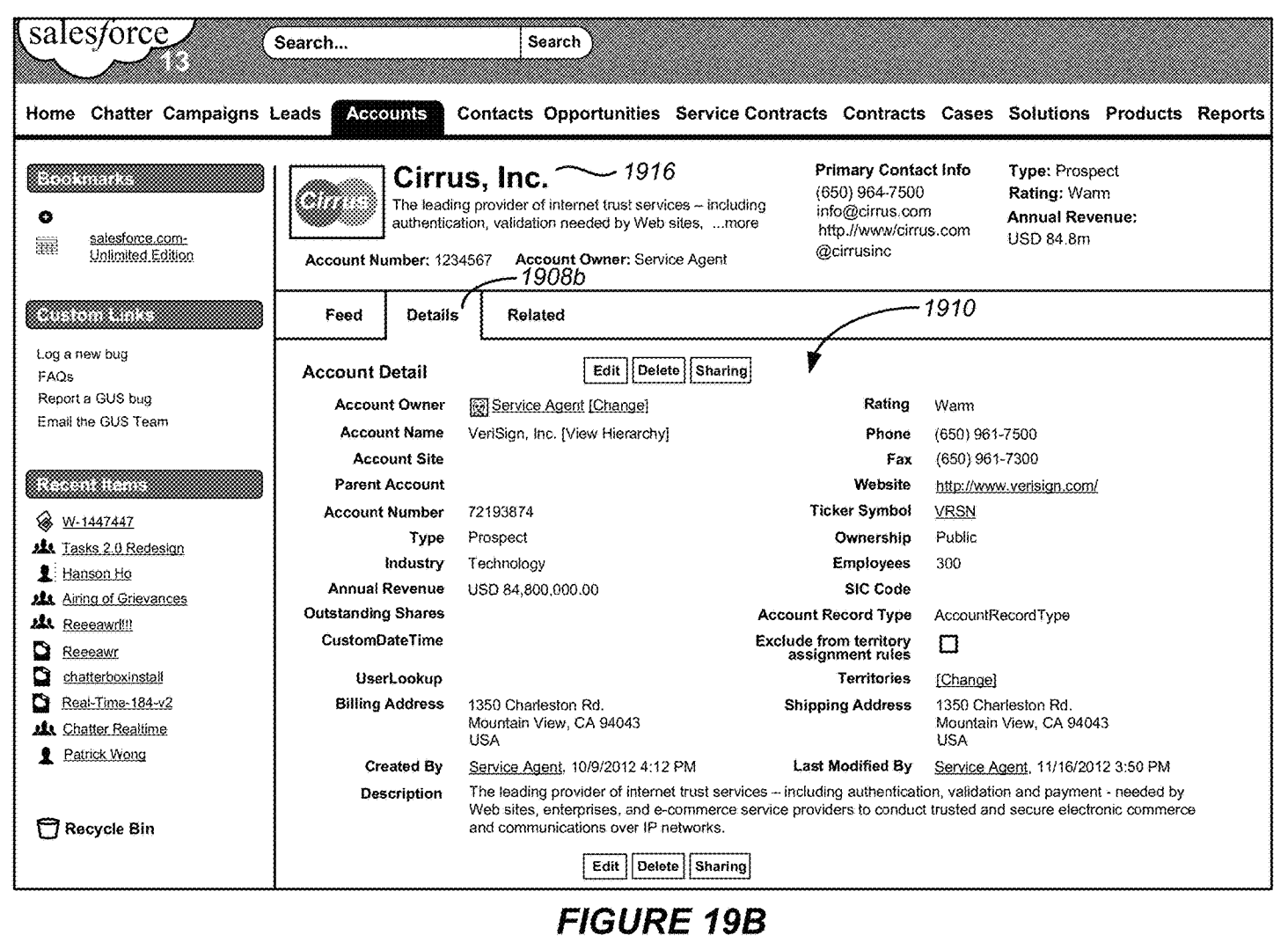
Figure 19C:
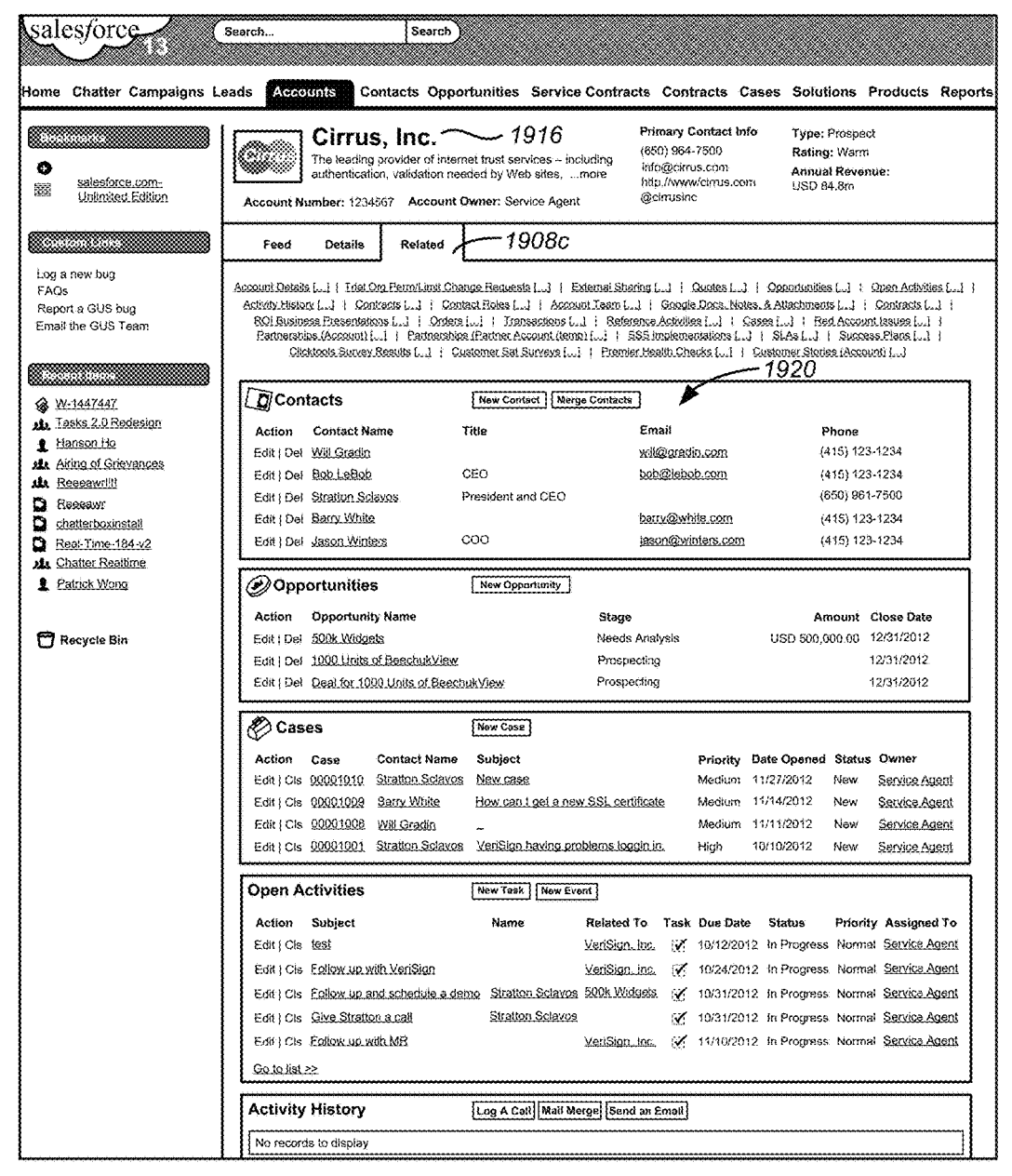

FIGS. 19A-19C show an example of a record with user interfaces displaying different information related to the record. In particular, the user interfaces may display information related to the information feed of the record, the record details, and the record relationship information.

FIG. 19A shows an example of a record with a user interface displaying the information feed 1904 for an account page 1916. The user interface also includes a publisher 1902. The information feed 1904 can be viewed by selection of a feed tab 1908*a*. The information feed 1904 can display a plurality of feed items showing messages, feed tracked updates, etc.

FIG. 19B shows an example of a record with a user interface displaying the record details 1910 for the account page 1916 in FIG. 19A. The record details 1910 can be viewed by selection of the details tab 1908*b*. The record details 1910 can provide information about the account itself and its parent record or records. Such information can also include links to related records, files, and websites. Here, the record details 1910 display general information about Cirrus, Inc., such as the account Owner, the Account Name, the Website, the Billing Address, the Shipping Address, etc. Depending on the access permissions of the user, the user may be limited in accessing and/or editing the record details 1910.

FIG. 19C shows an example of a record with a user interface displaying the record relationship information 1920 for the account page 1916 in FIG. 19A. The record relationship information 1920 can be viewed by selection of the related tab 1908*c*. The record relationship information 1920 can provide information listing the records that are related to the account record for Cirrus, Inc. For example, the record relationship information displays the plurality of child records related to the account record for Cirrus, Inc., including the contacts, opportunities, cases, tasks, and events associated with Cirrus, Inc. In some instances, identification of cross-referenced entities for a feed item can be based at least in part on the record relationship information 1920.

Figure 20A:
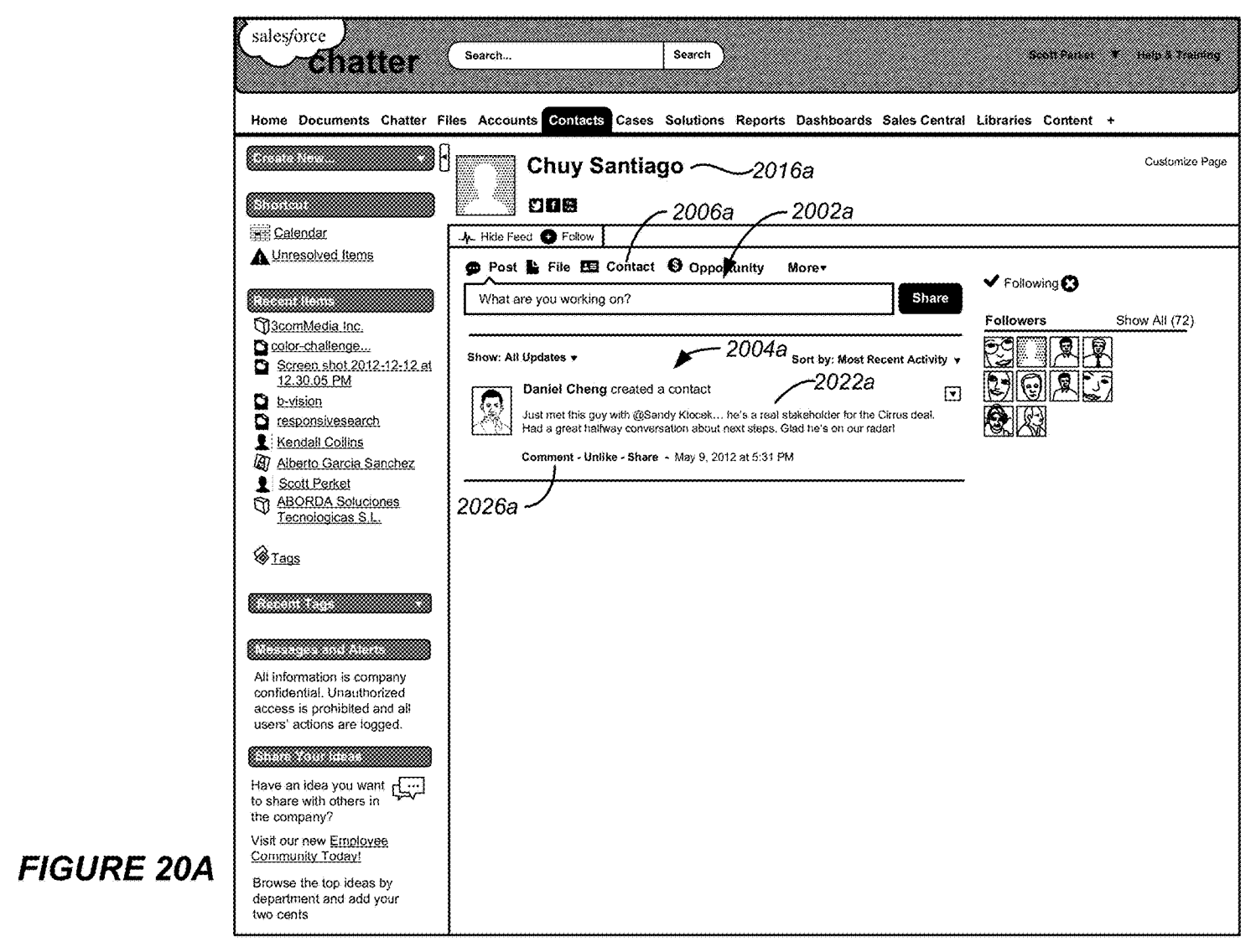
Figure 20B:
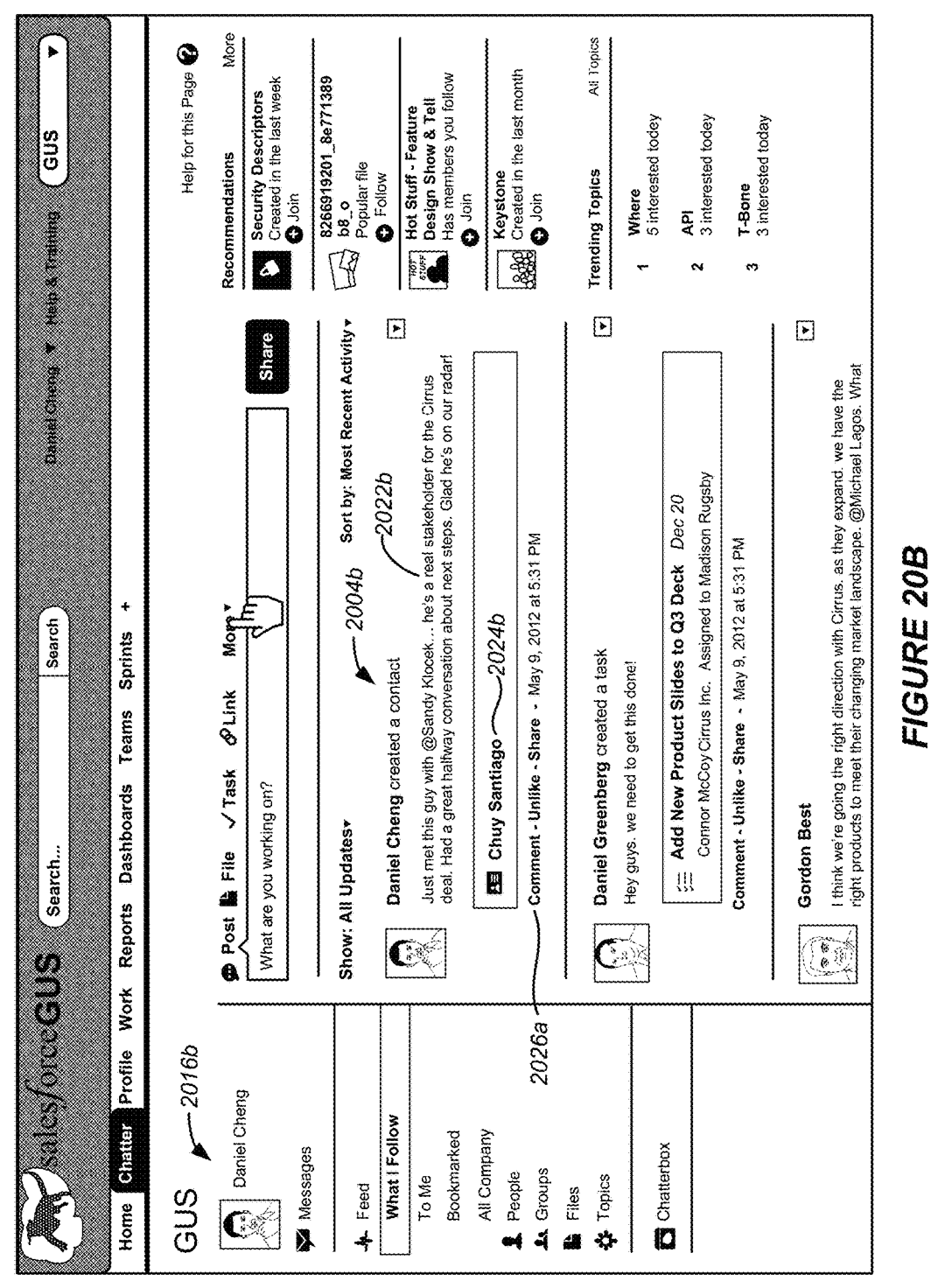
Figure 20C:
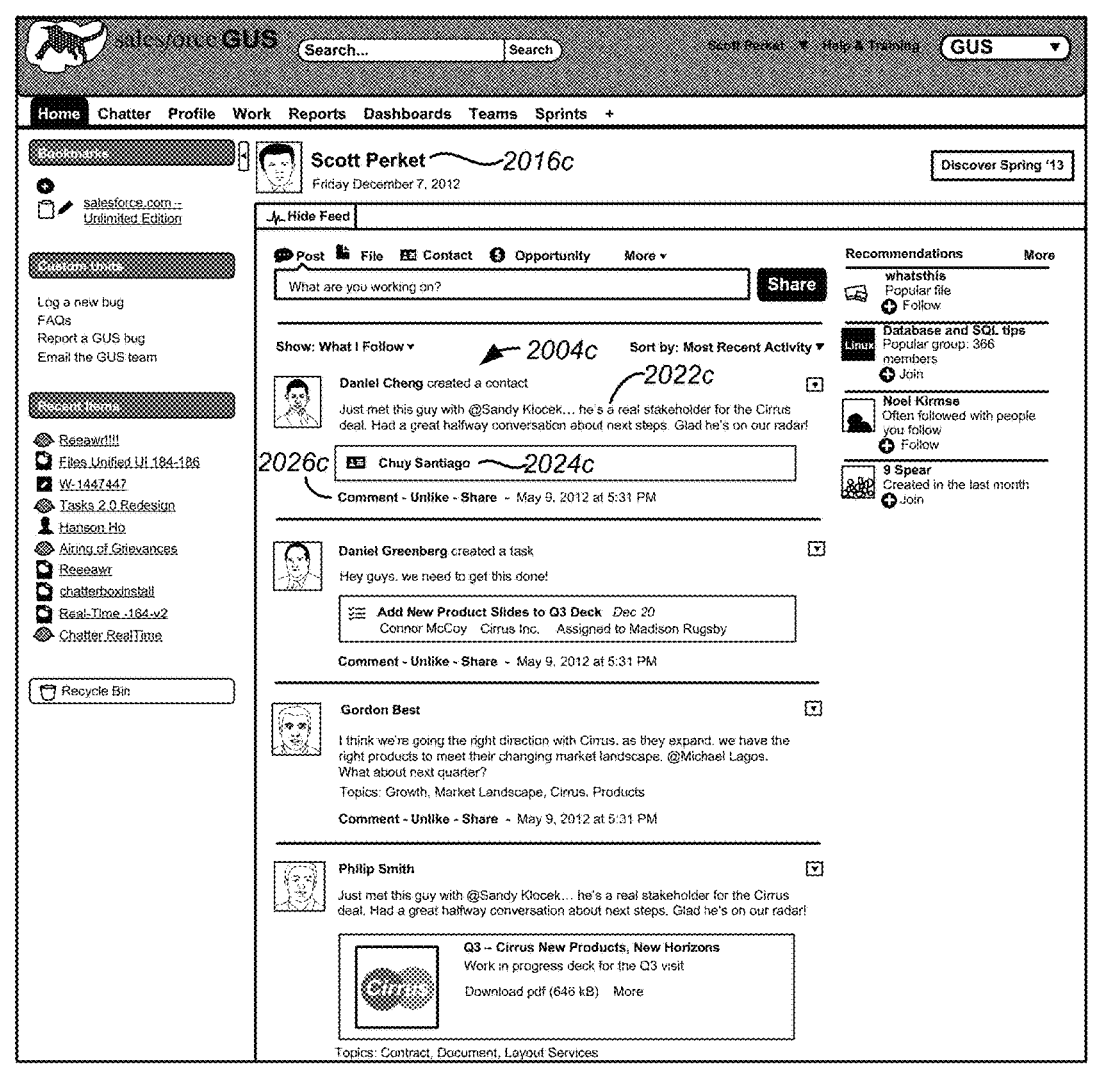

FIGS. 20A-20C show examples of a single feed item cross-referenced across multiple records and user profiles. FIG. 20A shows an example of a contacts record with a record feed 2004*a* including a feed item 2022*a* presenting updated data from a publisher 2002*a*, according to some implementations. An API or a publisher from any user interface may provide the updated data necessary to create the feed item 2022*a*. In this example, the published feed item 2022*a* is presented for inclusion in the record feed 2004*a* in the contact record page 2016*a*. The feed item 2022*a* includes information about the action performed on the contact record and the source of the action. The feed item 2022*a* also includes information from a message post accompanying the creation of the contact. The feed item 2022*a* further includes actions 2026*a* that are configured to perform actions on the feed item 2022*a*, including posting a comment to the feed item 2022*a*, liking or disliking the feed item 2022*a*, and sharing the feed item 2022*a*. Such actions 2026*a* may be configured to affect the same feed item as propagated in other related feeds to create a single conversation thread.

The creation of the feed item 2022*a* may be the result of the creation of a new contact from the sequence of actions illustrated in FIGS. 11-14. Whereas FIG. 14 shows the feed item 1122 as displayed in the information feed 804 for the accounts record, FIG. 19A shows the feed item 2022*a* as displayed in the information feed 2004*a* for the contact record. The feed item 1122 in FIG. 14 may be cross-referenced with the child record so as to display the feed item 2022*a* in FIG. 20A. In some instances, cross-referenced feed items as displayed in different information feeds may render different information. For example, while the feed item 1122 includes a link 1124 to the child record in FIG. 14, the feed item 2022*a* does not include such a link.

Cross-referenced feed items are the same feed items propagated across different feeds. However, the cross-referenced feed items may be rendered differently depending on contextual factors. One such contextual factor can entail the profile of the user viewing the cross-referenced feed item, such as whether the user has a role or definition capable of approving a workflow or whether, in which case an approval button may appear in the cross-referenced feed item. Another contextual factor can include the page layout on which the cross-referenced feed item is displayed, such as whether the page layout is a home page of the user, the parent record page, the child record page, etc. Another contextual factor can include the type of device on which the cross-referenced feed item is rendered, such as whether the device is a smartphone, a tablet, laptop, or a desktop. Thus, while cross-referenced feed items are the same (e.g., same row of information in a table of a database system), the cross-referenced feed items may render different information depending on context. For example, the preamble of the cross-referenced feed item or the auxiliary body of the cross-referenced feed item may present different information in different feeds.

FIG. 20B shows an example of a user profile with a news feed 2004*b* including a feed item 2022*b* cross-referenced from the feed item in FIG. 20A and with a link 2024*b* to the contact record, according to some implementations. In this example, not only is the published feed item 2022*a* in FIG. 20A presented for inclusion in the record feed in the contact record page 2016*a*, but the same feed item is presented as feed item 2022*b* in FIG. 20B for inclusion in the news feed 2004*b* of the user profile page 2016*b*. The user profile page 2016*b* may correspond to a user who created, updated, or otherwise performed an action on the contact record. Here, the user profile page 2016*b* corresponds to Daniel Cheng who created to the contact record. Similar to the feed item 2022*a* in FIG. 20A, the feed item 2022*b* in the news feed 2004*b* includes the action performed on the contact record and the source of the action, information from the message post accompanying the creation of the contact, and actions 2026*b* configured to perform actions on the feed item 2022*b*. In addition, the feed item 2022*b* includes a link 2024*b* that a user may select to efficiently advance from the user profile page 2016*b* to the contact record page 2016*a* in FIG. 20A.

FIG. 20C shows an example of another user profile with a news feed 2004*c* including a feed item 2022*c* cross-referenced from the feed item in FIG. 20A with a link 2024*c* to the contacts record, according to some implementations. Like FIG. 20B, the same feed item from FIG. 20A may be published in a news feed 2004*c* of the user profile page 2016*c*. The user profile page 2016*c* may correspond to a user who follows Daniel Cheng, or who subscribes to the parent record or contact record. Here, the user profile page 2016c corresponds to Scott Perket who subscribes to the parent record. Similar to the feed item 2022a in FIG. 20A, the feed item 2022c in the news feed 2004c includes the action performed on the contact record and the source of the action, information from the message post accompanying the creation of the contact, and actions 2026c configured to perform actions on the feed item 2022c. In addition, the feed item 2022c includes a link 2024c that a user may select to efficiently advance from the user profile page 2016c to the contact record page 2016a in FIG. 20A.

Figure 5:
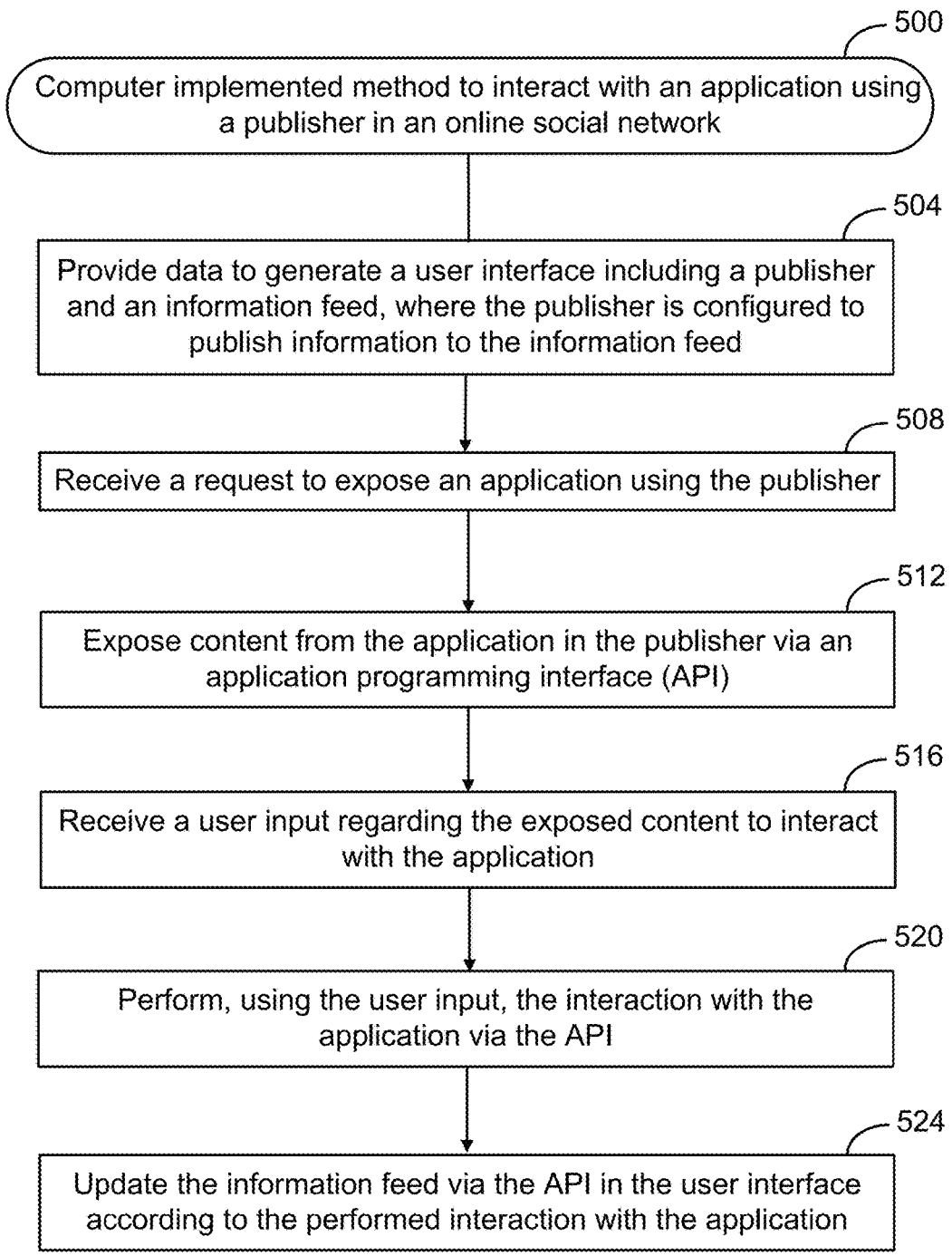
FIG. 5 shows a flowchart of an example of a computer implemented method 500 for interacting with an application using a publisher in an online social network, performed in accordance with some implementations.

FIG. 5 shows a flowchart of an example of a computer-implemented method 500 for interacting with an application using a publisher in an online social network, performed in accordance with some implementations. FIG. 5 may be described with reference to FIGS. 21-25C. At block 504, data to generate a user interface including a publisher and an information feed is provided, where the publisher is configured to publish information to the information feed. In some implementations, the user interface may also include a custom action, which may be configured to interact with a data object or application in accordance with custom action instructions. The custom action instructions may be provided by a first entity via an API. In some implementations, the first entity may be a database service provider providing database services to a plurality of recipients. In some implementations, the first entity may be a user or organization.

Figure 21:
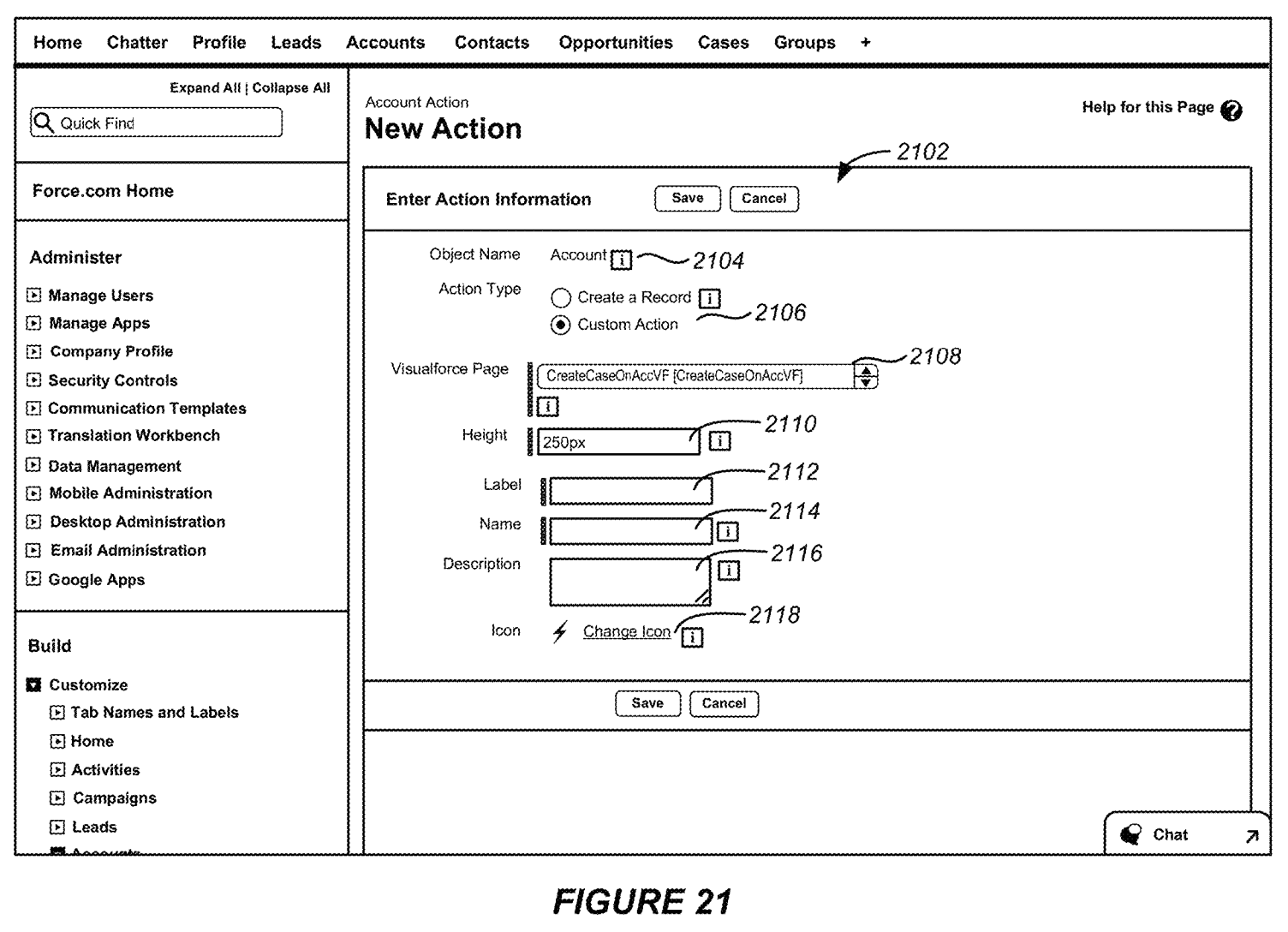

FIG. 21 shows an example of a user interface including a custom action definition area 2102 for creating the custom action with a Visualforce page. A customization tool, such as Visualforce, allows users to build custom user interfaces that can be hosted natively in an on-demand service environment. Rather than declaratively define the user interface, a customization tool allows users to programmatically customize the user interface. For example, a user may customize the user interface components that should be included on a page and how they should appear. The user can edit Visualforce tags, HTML, Javascript, or other Web-enabled code. Furthermore, a user may customize the custom action instructions that are initiated upon selection of the custom action in the user interface. Examples of custom actions that a user may add to the user interface may include, by way of example only, instant messenger, knowledge articles, live chat, twitter, virtual bulletin boards, email, log a call, portal answer, or the like.

In FIG. 21, the user interface includes a custom action definition area 2102, which includes a plurality of custom fields 2104-2118. A user can define the custom action instructions by providing values in each of the custom fields 2104-2118. By selecting Custom Action 2106, a user may identify a Visualforce page 2108 to associate with the Custom Action 2106. The Visualforce page 2108 may be defined previously by an entity to create a case on an Account 2104. The user may further define the Visualforce page 2108 by providing values to its Height 2110, Label 2112, Name 2114, Description 2116, and Icon 2118.

Selection of the Visualforce page 2108 refers to a set of programmed instructions for generating a customized user interface. The instructions may be provided in, for example, Javascript®, Java®, Apex™, or any other programming language. Using a customization tool such as Visualforce can allow users to provide instructions that can determine the overall layout and appearance of the user interface, including the publisher, custom action, and the information feed, as well as determine the operations performed by various user interface components.

Figure 22A:
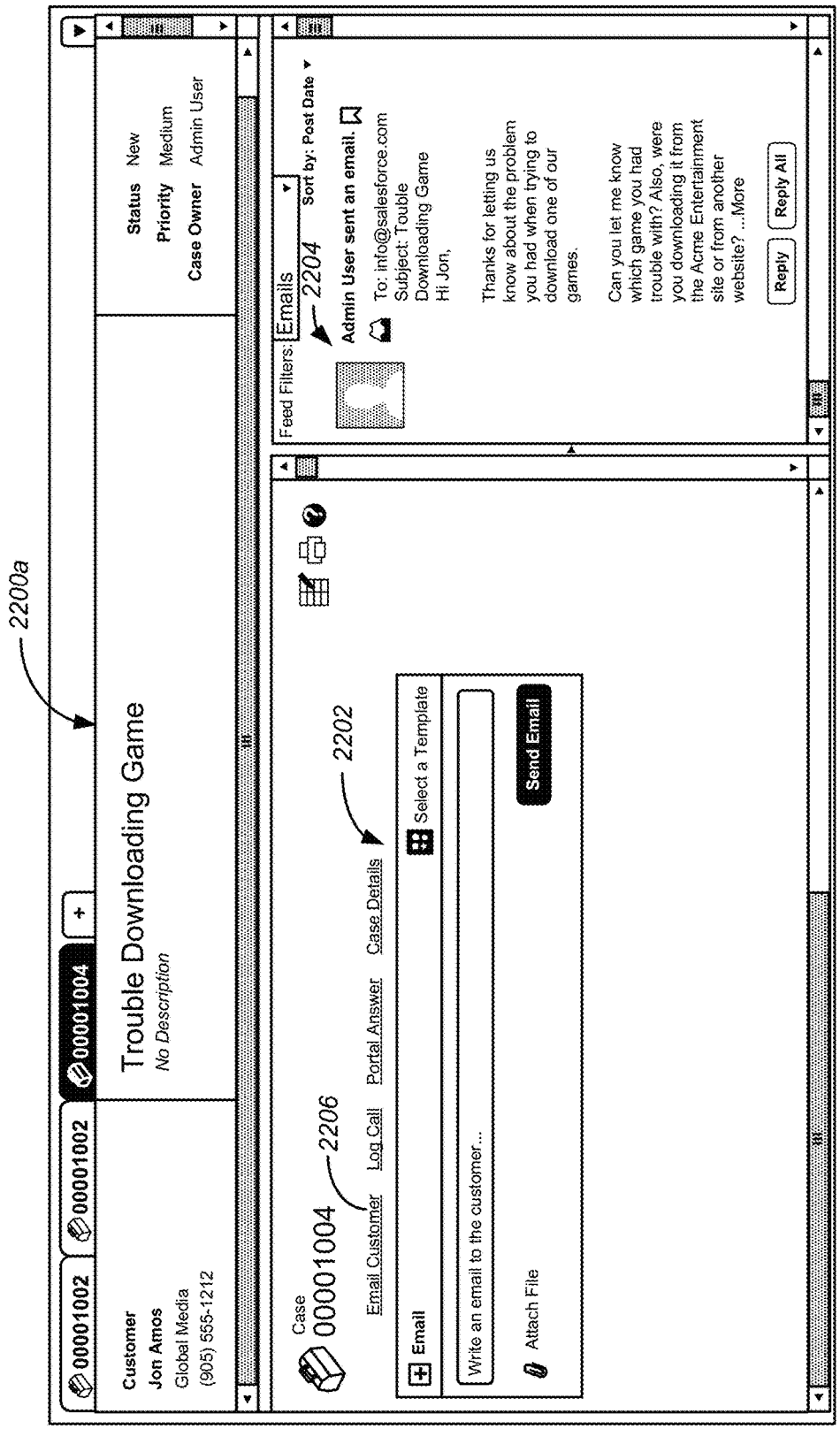
FIG. 22A shows an example of a record with a customized Visualforce page layout.

FIG. 22A shows an example of a record with a customized Visualforce page layout 2200a. Visualforce consists of markup language where different tags can represent different user interface components. An example of instructions for creating such a Visualforce page layout 2200a is shown below:

```
<apex:page standardController="Case">
    <!-- Repositions publisher tabs to a horizontal arrangement on top of
the page -->
        <ul class="demoNav" style="list-style: none; overflow: hidden">
            <li style="float:left"><a id="custom_email_tab"
class="selected"
href="javascript:void(0);"
onclick="getDemoSidebarMenu( ).selectMenuItem('custom_email_tab');"><span
class="menuItem">Email Customer</span></a></li>
            <li style="float:left"><a id="custom_log_call_tab"
href="javascript:void(0);"
onclick="getDemoSidebarMenu( ).selectMenuItem('custom_log_call_tab');"><span
class="menuItem">Log Call</span></a></li>
            <li style="float:left"><a id="custom_portal_tab"
href="javascript:void(0);"
onclick="getDemoSidebarMenu( ).selectMenuItem('custom_portal_tab');"><span
class="menuItem">Portal Answer</span></a></li>
            <li style="float:left"><a id="custom_detail_tab"
href="javascript:void(0);"
onclick="getDemoSidebarMenu( ).selectMenuItem('custom_detail_tab');"><span
class="menuItem">Case Details</span></a></li>
        </ul>
        <!-- Email publisher -->
        <div id="custom_email_pub_vf">
            <apex:emailPublisher entityId="{!case.id}"
                width="80%"
                emailBodyHeight="10em"
                showAdditionalFields="false"
                enableQuickText="true"
                toAddresses="{!case.contact.email}"
                toVisibility="readOnly"
                fromAddresses="support@cirrus.com"
                onSubmitSuccess="refreshFeed( );" />
        </div>
        <!-- Log call publisher -->
```

```
<div id="custom_log_call_vf" style="display:none">
    <apex:logCallPublisher entityId="{!case.id}"
        width="80%"
        logCallBodyHeight="10em"
        reRender="demoFeed"
        onSubmitSuccess="refreshFeed( );" />
</div>
<!-- Portal publisher -->
<div id="custom_portal_vf" style="display:none">
    <support:portalPublisher entityId="{!case.id}"
        width="80%"
        answerBodyHeight="10em"
        reRender="demoFeed"
        answerBody="Dear {!Case.Contact.FirstName},\n\nHere is the solution to             your case.\n\nBest regards,\n\nSupport"
        onSubmitSuccess="refreshFeed( );" />
</div>
<!-- Case detail page -->
<div id="custom_detail_vf" style="display:none">
    <apex:detail inlineEdit="true" relatedList="true" rerender="demoFeed" />
</div>
<!-- Include library for using service desk console API -->
<apex:includeScript value="/support/console/25.0/integration.js"/>
<!-- Javascript for switching publishers -->
<script type="text/javascript">
    function DemoSidebarMenu( ) {
        var menus = {"custom_email_tab" : "custom_email_pub_vf",
            "custom_log_call_tab" : "custom_log_call_vf",
            "custom_portal_tab" : "custom_portal_vf",
            "custom_detail_tab" : "custom_detail_vf"};
        this.selectMenuItem = function(tabId) {
            for (var index in menus) {
                var tabEl = document.getElementById(index);
                var vfEl = document.getElementById(menus[index]);
                if (index == tabId) {
                    tabEl.className = "selected";
                    vfEl.style.display = "block";
                } else {
                    tabEl.className = "";
                    vfEl.style.display = "none";
                }
            }
        };
    }
    var demoSidebarMenu;
    var getDemoSidebarMenu = function( ) {
        if (!demoSidebarMenu) {
            demoSidebarMenu = new DemoSidebarMenu( );
        }
        return demoSidebarMenu;
    };
</script>
<!-- Javascript for firing event to refresh feed in the sidebar -->
<script type="text/javascript">
    function refreshFeed( ) {
sforce.console.fireEvent('Cirrus.samplePublisherVFPage.RefreshFeedEvent', null, null);
    }
</script>
</apex:page>
```

As shown in the example in FIG. 22A, the user interface for the Visualforce page layout 2200a can include a publisher 2202 and an information feed 2204. The user can customize the publisher 2202 to be able to be an email publisher, a call log publisher, and a portal answer publisher. In other words, the publisher 2202 may include custom actions 2206 configured to email a customer, to log a call, and to answer inquiries through a web portal. The layout and dimensions of the publisher 2202 and other frames in the page layout 2200a hosting components such as the information feed 2204 may be defined in the custom action instructions according to the first entity's preferences.

Figure 22B:
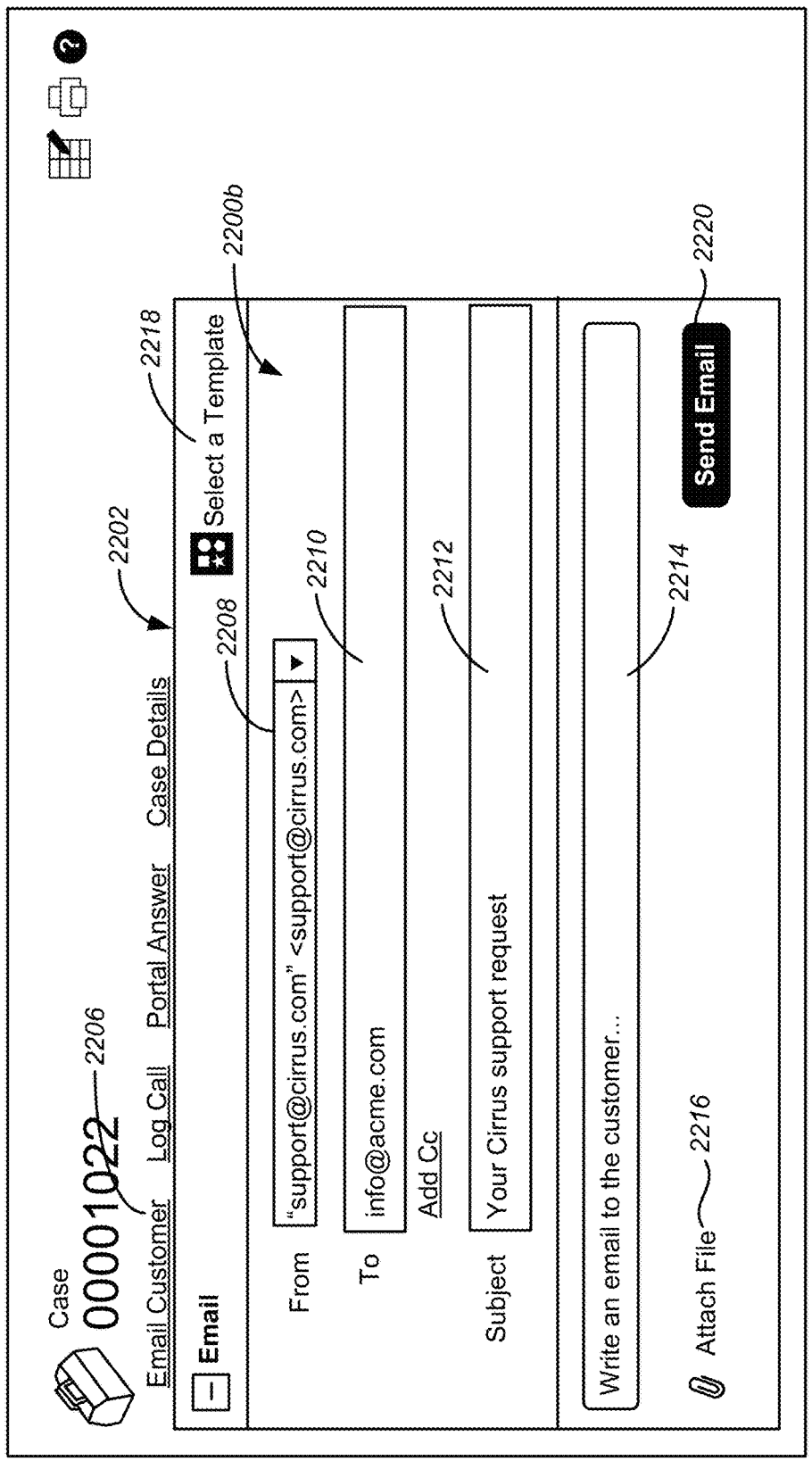
FIG. 22B shows an example of a publisher with a customized Visualforce action layout.

FIG. 22B shows an example of a publisher 2202 with a customized Visualforce action layout 2200b. A user can define the publisher 2202 as an email publisher configured to send email to specified recipients and publish the email messages to an information feed. The user can programmatically define the data fields in the publisher 2202. When a user selects a publisher action 2206 for Email Customer, the publisher 2202 is caused to display data fields including the sender field 2208, the recipient field 2210, the subject field 2212, and the message field 2214. Visibility and default values in each of the data fields may be established programmatically. Thus, a user or organization may customize the publisher 2202 to increase standardization of data submitted via the publisher 2202. The publisher 2202 may also include the ability to attach files via an attachment button 2216, to select a template via a template button 2218, and to send the email via the send button 2220.

In some implementations, the user interface that is displayed may depend on contextual factors, including the access permissions of the entity, the type of record, the type of page, the type of display device, etc. For example, what data fields are displayed, what publisher actions are available, and the layout of the user interface components can depend on the type of entity that is navigating the user interface.

The user interface may be defined by custom action instructions either declaratively utilizing an API, such as one provided by salesforce.com, or programmatically utilizing a customization tool such as Visualforce, which may be provided with its own API and set of pre-defined instructions. Users with less technical skills may develop user interfaces declaratively, while users or organizations with more complex data management needs may prefer a customization tool in customizing user interfaces.

Returning to FIG. 5, at block 508, a request to expose an application is received using the publisher. The request to expose the application may be received in response to a user selecting a button, link, tab, or menu selection in the publisher via the user's smartphone, desktop, laptop, tablet, or other mobile computing device. The application can be exposed within a publisher space, and interactions can be performed on the application through the publisher space via the API. The application can be integrated with the API provided by a database service provider, such as salesforce.com.

In some implementations, the application is hosted natively in the on-demand service environment. In some implementations, the application is hosted on a third-party platform. The third-party platform may include one or more database systems outside of the on-demand service environment. The application can be hosted on a platform service, including but not limited to Site.com™, Heroku™, Force.com®, and AppExchange®.

While the actual code for running the application may be hosted on the third-party platform, the application is configured to communicate with the API provided in the on-demand service environment. This API may enable integration of an application, such as a third-party application, into the on-demand service environment. For example, the API may consist of a set of tools and Javascript APIs that enables integration with the third-party application into the on-demand service environment. The Javascript APIs provide a communication bridge so that the third-party application can communicate with a browser page.

At block 512, content from the application is exposed in the publisher via the API. The content from the application may be exposed in a standard user interface or customized user interface, such as a Visualforce page. In some implementations, exposing the content in the publisher includes retrieving the content from a database system, and presenting the content for display in a publisher space in the publisher. In some instances, the database system can be stored outside of the on-demand service environment.

Content as exposed in the publisher space can originate from any number of data sources. In some implementations, such data sources can include analytics, external data sources, feeds, and direct events, among other data sources. For example, the exposed content can be a video stream provided from a videoconferencing service. In another example, the exposed content can be a map provided from a web mapping service application. The publisher space provides a frame or window by which the content can be viewed in the user interface, and the content from the data source can interface with the API to communicate with the browser page.

Figure 23:
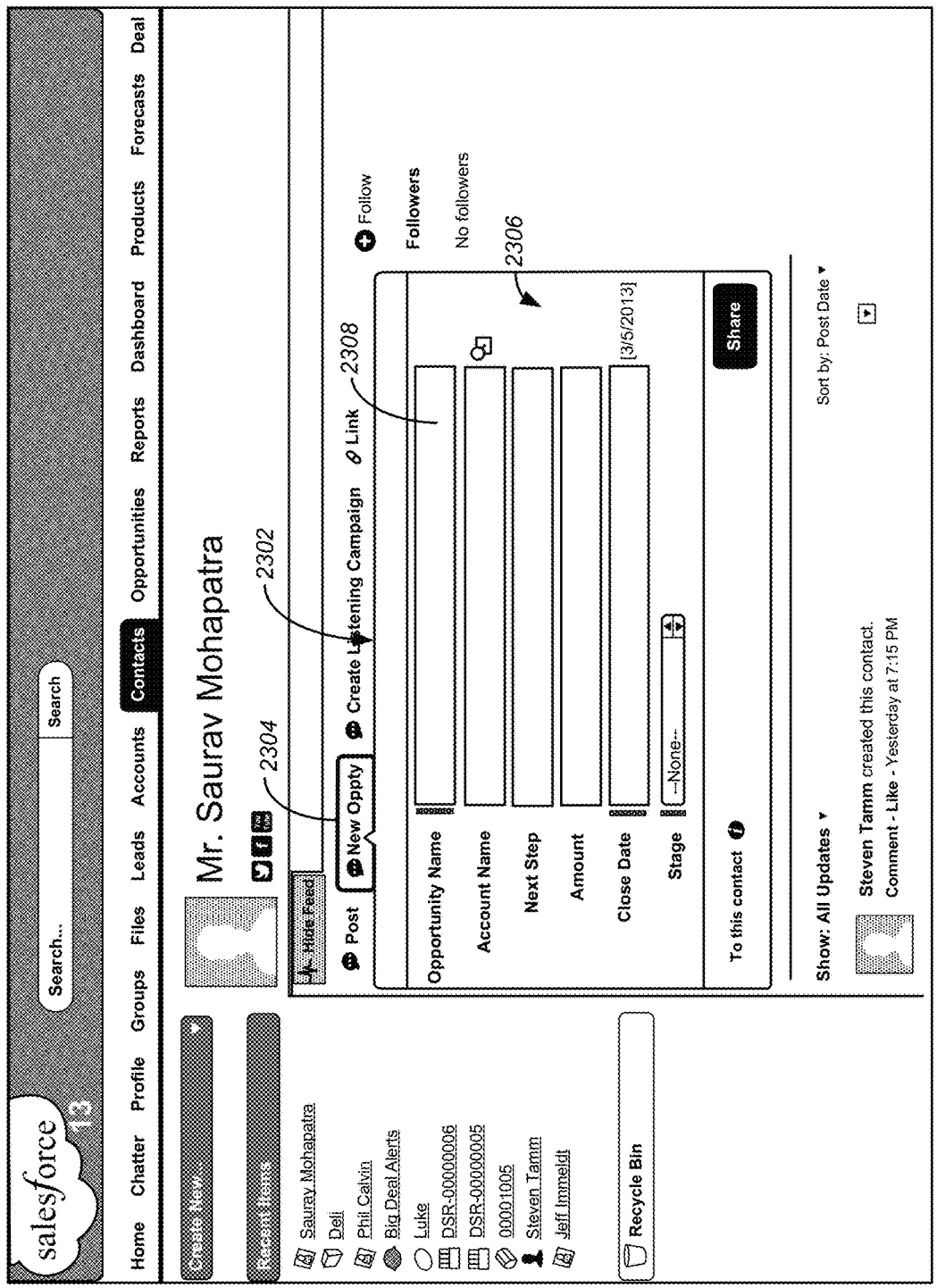
FIG. 23 shows an example of a user interface with a publisher exposing data fields for a custom action hosted natively in an on-demand service environment, according to some implementations.

FIG. 23 shows an example of a user interface with a publisher exposing data fields for a custom action hosted natively in an on-demand service environment, according to some implementations. The publisher 2302 may include a custom action 2304 that is configured to interact with a record. The custom action 2304 may be configured to interact with the record according to custom action instructions provided by a first entity in ways that are described earlier in Section IX. The custom action 2304 can be an API-enabled action that can interface with the API and cause the API to display data fields 2308 associated with the record. The custom action 2304 causes the publisher 2302 to expose content in the publisher space 2306, where the content can consist of data fields 2308 associated with the record. Here, a user can select the custom action 2304 for a New Oppty to cause the publisher 2302 to expose data fields 2308 for creating a new opportunity. The data fields can include Opportunity Name, Account Name, Next Step, Amount, Close Date, and Stage. The API may interface with one or more database systems in the on-demand service environment. In the example in FIG. 23, the API may not communicate with external or third-party database systems.

Figure 24:
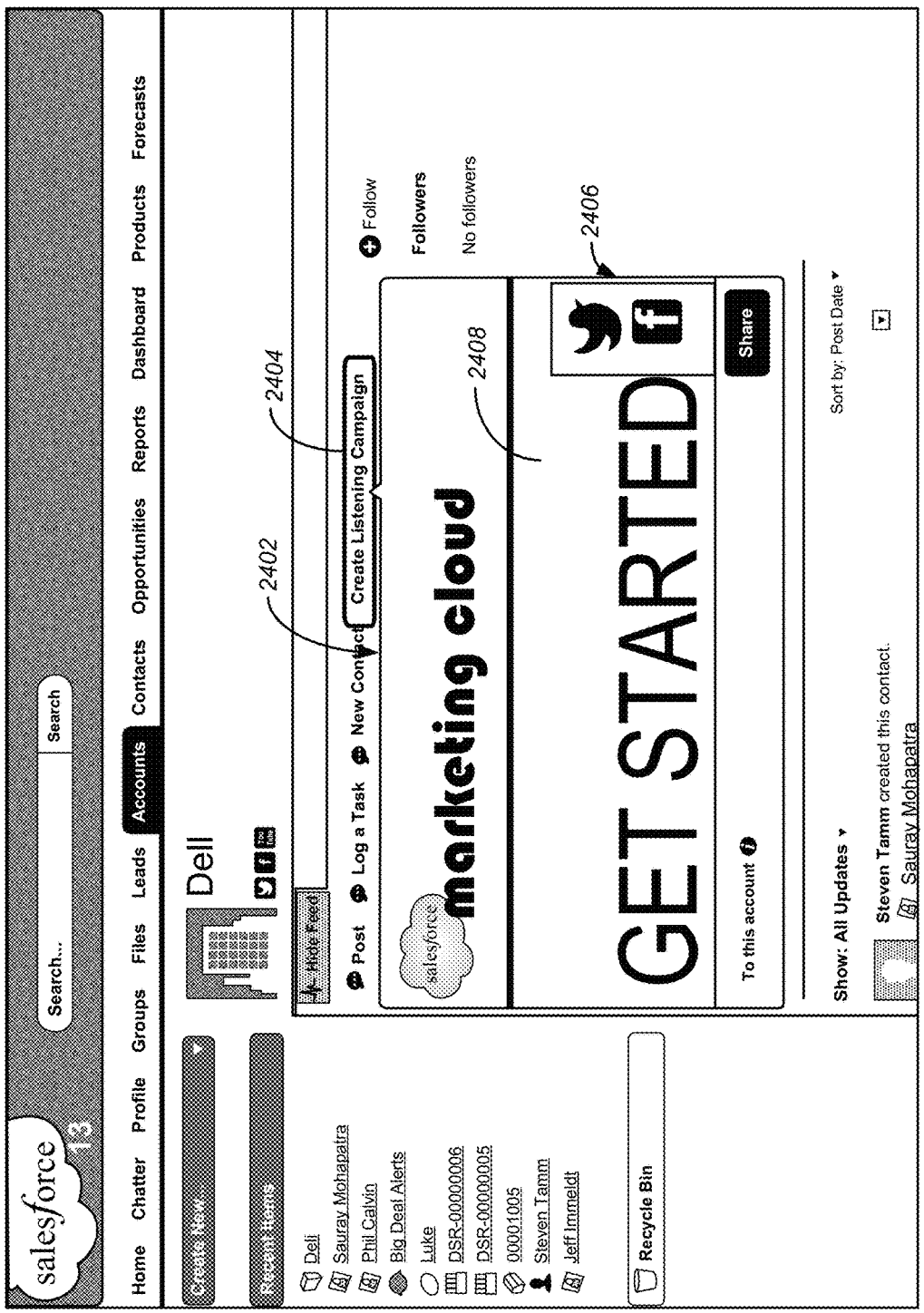
FIG. 24 shows an example of a user interface with a publisher exposing content from a web page hosted outside of an on-demand service environment, according to some implementations.

FIG. 24 shows an example of a user interface with a publisher 2402 exposing content from a web page 2408 hosted outside of an on-demand service environment, according to some implementations. The publisher 2402 may include a custom action 2404 that is configured to expose content hosted externally. Examples of such content can include articles, blogs, chat rooms, web pages, feeds from other online social networks, etc. The custom action 2404 is an API-enabled action that can interface with the API and cause the API to display content from an external data source. As shown in FIG. 24, the custom action 2404 can cause the publisher 2402 to display a web page 2408 in a publisher space 2406, where web page 2408 can include web-based application services. Even though the web page 2408 is hosted outside of the on-demand service environment, a user can interact directly with the web page 2408 through the API. In the example in FIG. 24, when a user selects the custom action 2404 for Create Listening Campaign, the publisher 2402 exposes the web page 2408 that the user can interact with to create a listening campaign.

Figure 25A:
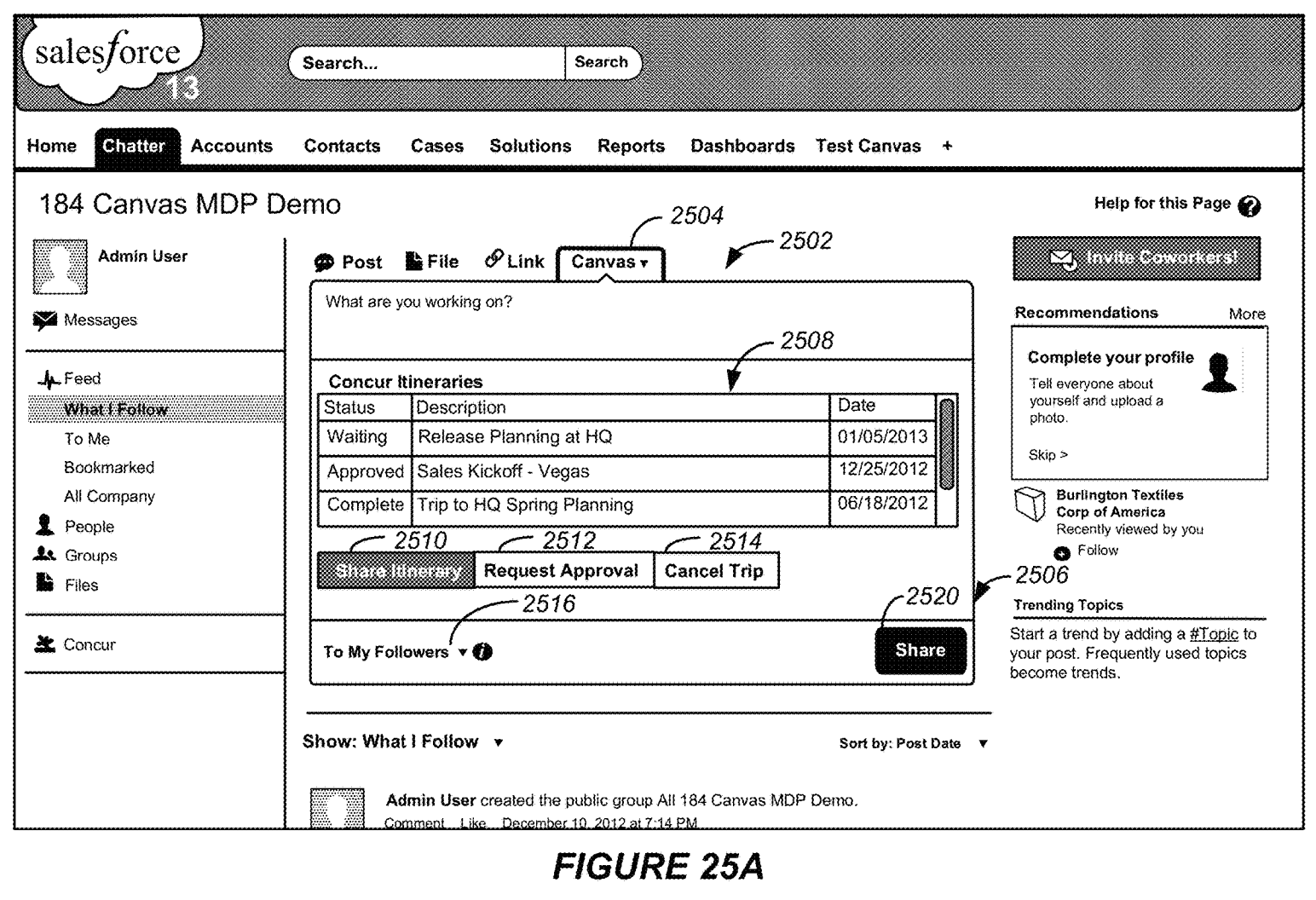

FIG. 25A shows an example of a user interface with a publisher exposing content from an application hosted on a third-party platform, according to some implementations. The publisher 2502 may include a custom action 2504 that is configured to interact with the application hosted on the third-party platform. The custom action 2504 is an API-enabled action that can interface with the API and cause the API to expose content from the application hosted on the third-party platform in a publisher space 2506. In some instances, exposure of the application in the publisher space 2506 may be performed using the custom action 2504 Force.com® Canvas application. The Canvas application serves as an iFrame or a window for displaying the content from the application. The application may be hosted on a third-party platform, such as Heroku™. As illustrated in FIG. 25A, the application may be a travel service that is configured to display a list of itineraries 2508. Other services that can be exposed in the publisher 2502 can include but is not limited to CRM services, customer services, task management services, web services, social marketing services, performance management services, and data repository services, among others.

Returning to FIG. 5, at block 516, a user input is received regarding the exposed content to interact with the application. The user input may be transmitted to one or more computing devices performing the method 500, for instance, as a signal network 14 in FIGS. 1A and 1B. In some instances, the user input can include selection or entry of information for transmission to one or more computing devices.

From a user interface, a user can communicate with an application, such as a third-party application, via the API. In FIG. 25A, the user can select from a list of itineraries 2508 in the publisher space 2506 and perform a number of actions. For example, the user can share an itinerary listed in the publisher space 2506 by selection of the Share Itinerary button 2510. This can post the itinerary as a feed item into one or more feeds. As another example, the user can request approval for the itinerary from another entity by selection of the Request Approval button 2512. Thus, the user can initiate an approval workflow and post the itinerary as a feed item for approval in a specified entity's feed. The specified entity, such as the user's manager, can interact with the feed item by approving or denying the request. In another example, the user can cancel one of the itineraries by selection of the Cancel Trip button 2514. The user can identify the feeds of the entities to which the information will be published by selection of entities in a dropdown menu 2516. Furthermore, the user can publish the information to appropriate feeds by selection of a Share button 2518. Therefore, a user can take content off platform and manage it using the custom action 2504 and the API.

Returning to FIG. 5, at block 520, the interaction with the application is performed using the user input via the API. When the interaction is initiated by the user input, the application directly interfaces with the API to implement updates with the application. Even if the application is hosted on a third-party platform, the application directly interfaces with the API to implement updates with the hosting page. In some implementations, the performed interaction occurs within the browser page of the user interface. For example, the application can be a mortgage calculator exposed in the publisher where the interaction outputs directly into the publisher space. In some implementations, the performed interaction does not occur with the browser page of the user interface. Instead, the performed interaction occurs with the API and the third-party application that avoids opening or refreshing a page in the browser. In other words, the browser page is unaware of the updates made to the application hosted on the third-party platform. In some instances, one or more database systems may be updated according to the performed interaction.

At block 524, the information feed is updated via the API in the user interface according to the performed interaction with the application. The information feed directly interfaces with the API to update information in the information feed. As the API communicates with the application, the API links back information from the application to the browser page. Such information is rendered in the information feed of the user interface via the API. In some implementations, the information feed is updated without refreshing the user interface. In fact, each of the steps performed in the method 500 may occur without refreshing the user interface. For example, updating the information feed can involve updating one or more data fields in the information feed based on the user input by "toggling" changes to the one or more data fields. Therefore, the API can enable interactions between a user and an exposed application, such as an application hosted on a third-party platform, such that updates occur seamlessly between a publisher and an information feed in a user interface.

Figure 25B:
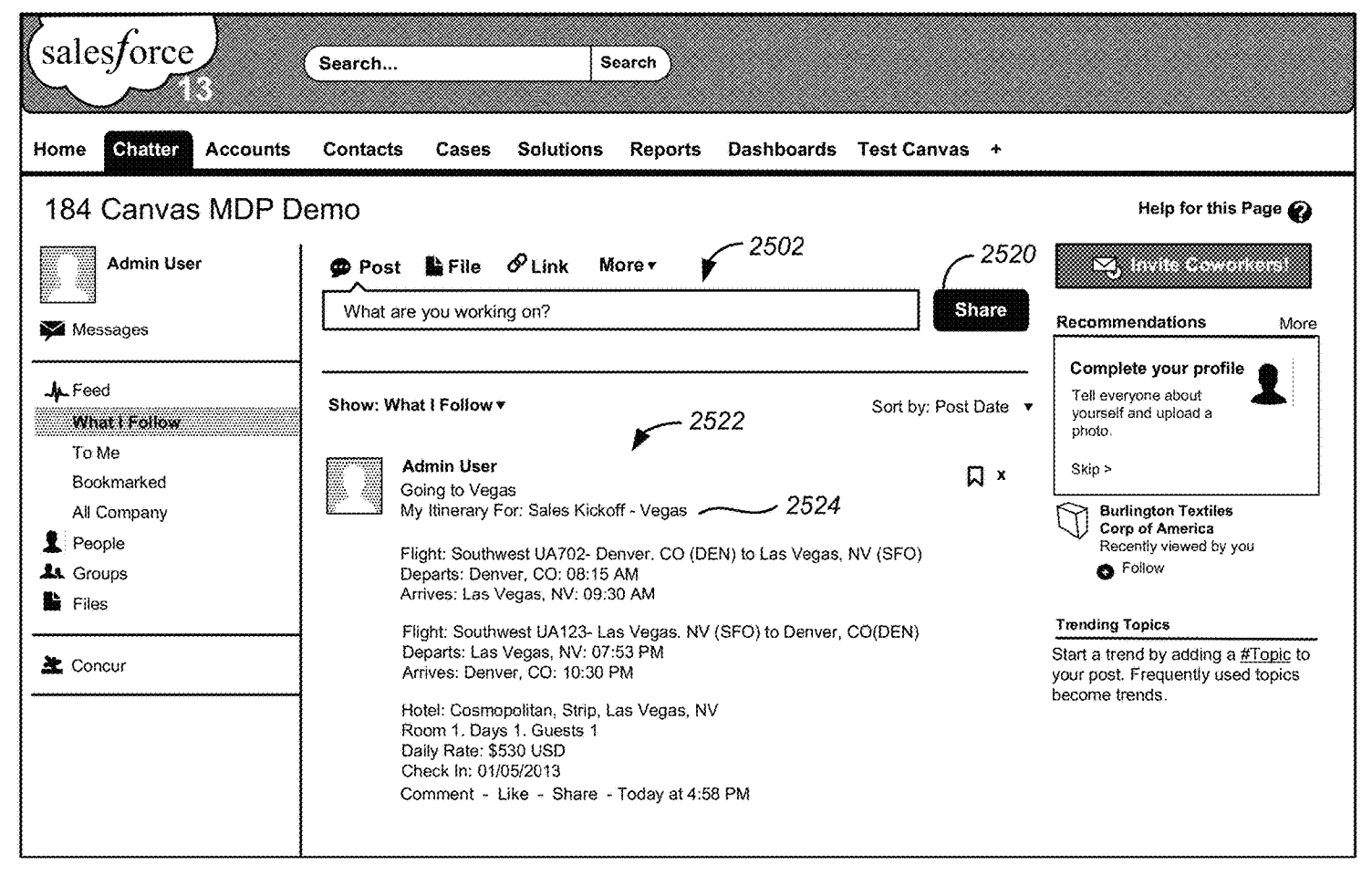

FIG. 25B shows an example of a user interface with a feed item 2524 displaying information based on a user input regarding content from the application hosted on the third-party platform in FIG. 25A, according to some implementations. In response to the user input, the API can communicate with the application and retrieve information from one or more database systems in the third-party platform. The information can be rendered into the feed item 2524 in an information feed 2522 via the API. The application calls the API, which in turn updates the information feed 2522 to present the feed item 2524 for inclusion in the information feed 2522. After selecting the Share Itinerary button 2510 in FIG. 25A, the user selects the Share button 2520 to post the feed item 2524 with the selected itinerary. Information in the feed item 2524 as retrieved from the application can include more data than the exposed content in FIG. 25A.

Figure 25C:
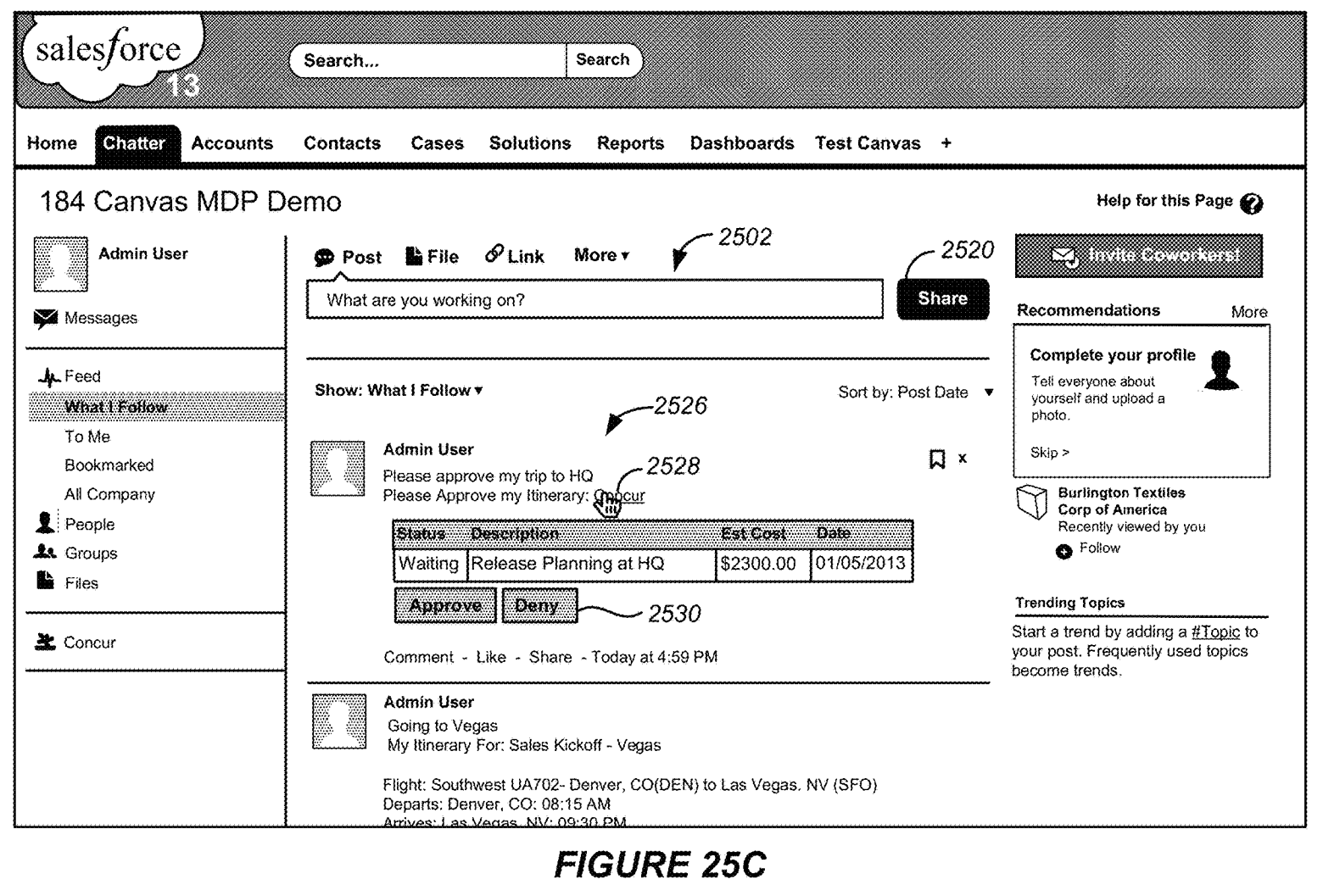

In some implementations, the feed item can include one or more actionable selections providing a reference to the application. The one or more actionable selections may perform further operations on the application from the feed item. FIG. 25C shows an example of a user interface with a feed item 2528 displaying approval controls 2530 based on a user input regarding content from the application hosted on the third-party platform in FIG. 25A, according to some implementations. In response to a user input requesting approval for a selected itinerary in FIG. 25A, information regarding the selected itinerary can be rendered into the feed item 2528 in the information feed 2526 via the API. The information can be retrieved from one or more database systems in the third-party platform. The feed item 2528 can further include approval controls 2530, where an appropriate entity can approve or deny the selected itinerary. In some implementations, the approval controls 2530 may be rendered in the information feeds of entities specified by the user or information feeds of entities based on the user's profile and/or preferences. Selection of one of the approval controls 2530 may further update the information feed 2526 as well as the application hosted on the third-party platform.

While at least some of the sequence of steps for the method 500 may be illustrated in FIGS. 25A-25C, other examples may also be illustrative of the sequence of steps for the method 500. By way of example, a user interface can include a publisher and an information feed where the publisher includes a custom action for initiating a videoconference with a customer. The customer can use a video recording device and have a real-time conversation with the user through the publisher space of the publisher. Moreover, the user can perform an action on the exposed data stream by saving the videoconference from the publisher, and the saved video can be published to the information feed.

In another example, a user interface can include a publisher and an information feed where the publisher includes a custom action for placing an order with an SAP system. One or more items can be exposed from the SAP system in the publisher, and a user can select an item for placing an order. The user can select a button for placing the order, which can then communicate with the SAP system via the API. The API then allows the custom action to communicate with the information feed to publish a feed item showing that an order for the item has been placed.

In yet another example, a pharmaceutical company can develop a customized user interface for sales agents to sell free drug samples to doctors. When a sales agent pulls up an account for a particular doctor in the user interface, the sales agent can view the doctor's account and input new orders into the publisher. The sales agent can communicate with an application, such as a third-party application, to fulfill the order request, and a feed item can be posted in an information feed indicating the placement of the order request.

In yet another example, a gaming company can develop a customized user interface to submit a mass email to customers. If a flood of cases come in at a rapid rate regarding a bug in a video game, the gaming company can utilize a publisher to communicate with a mass email web service such as VerticalResponse Inc. or Constant Contact®, Inc. The gaming company can import or select all the recipients, compose the email, and submit the email through the mass email web service. Upon completion, an information feed can be updated by presenting a feed item indicating that an email was sent out.

A publisher can be an interface that interacts with one or more records with information regarding the interaction being published to one or more information feeds. In some implementations, the publisher can be the interface that handles the creation of one or more records. For example, the publisher can be a composer that handles the creation of objects, such as a poll, a contact, a task, etc. The publisher may be part of a framework for creating various composers, such as a poll composer, a contact composer, a task composer, etc. Such a framework may be referred to as a "publisher framework."

The publisher framework may be a native framework for any one or more operating systems, including but not limited to Android, iOS, and Windows. In some implementations, the publisher framework may be implemented in iOS.

In some implementations, the publisher framework may be configured to automatically discover any composer class. Thus, upon loading the publisher in the operating system, the publisher can automatically discover one or more classes of composers without having to register each of the classes of composers.

Some implementations of the publisher in the publisher framework may be accompanied with one or more protocols and/or base classes. The one or more protocols and/or base classes may ease the implementation of the publisher in a user interface.

In one example, the one or more protocols and/or base classes can provide support for any number references, including @ mentions, tags, metadata tags, hashtags, etc. In some instances, ready-made text view can support any number of such references using a default data source or custom data source.

In another example, the one or more protocols and/or base classes can provide support for the publisher in one or more client devices, including the iPad and iPhone. Each of these client devices can have a form factor that the publisher can be adapted for.

In another example, each publisher can be configured to indicate when they should be rendered visible in a main publisher menu. For example, when a certain record is selected, some publishers can be rendered visible in the menu while others can be rendered invisible.

In another example, one or more protocols and/or base classes can provide messages that can be displayed in an animated manner in the user interface in the publisher framework. Examples include but are not limited to error messages, warning messages, and information.

In another example, one or more protocols and/or base classes can provide flexible ways to customize the display of the publisher, the custom buttons, etc. The customizable displays can include, for example, upper view, accessory view, right-views, etc.

The aforementioned one or more protocols and/or base classes accompanying the implementation of the publisher can permit for ease of creating any type of composer. For example, the composer can be native, web-based, or a third-party composer.

In some implementations, a plugin can be added from scratch by subclassing a few classes and methods to implement the publisher framework in the operating system. The plugin can include a base class for the plugin itself. The plugin can overwrite one or more methods to obtain basic functionality of the publisher. The plugin can include a plugin view controller. The plugin view controller can include another base class, which can provide a plurality of various helper features.

IV. Performing an Action on a Database Record

Figure 33A:
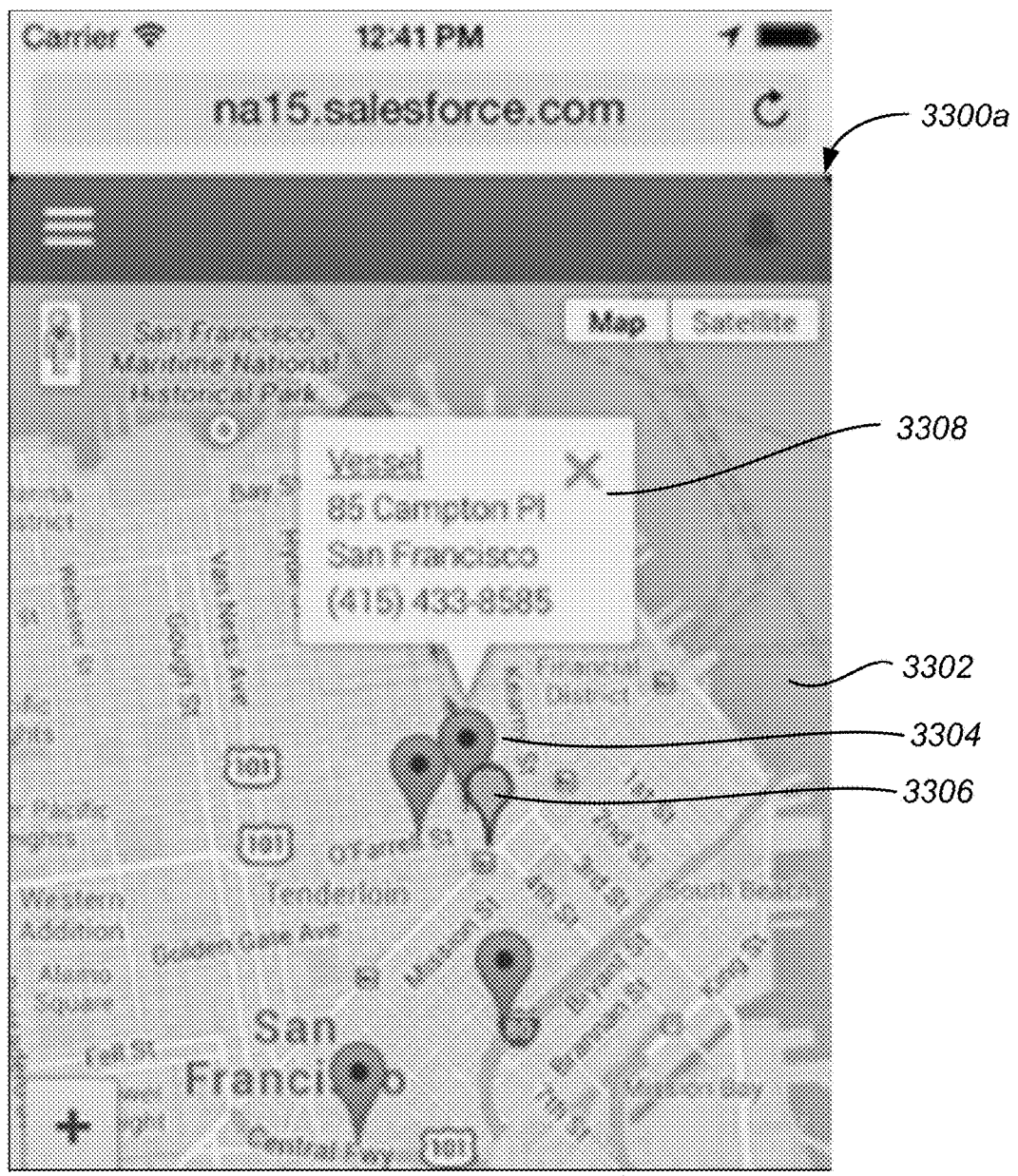
FIG. 33A shows an example of a page integrating a mapping API to provide nearby music venues, according to some implementations.
Figure 33B:
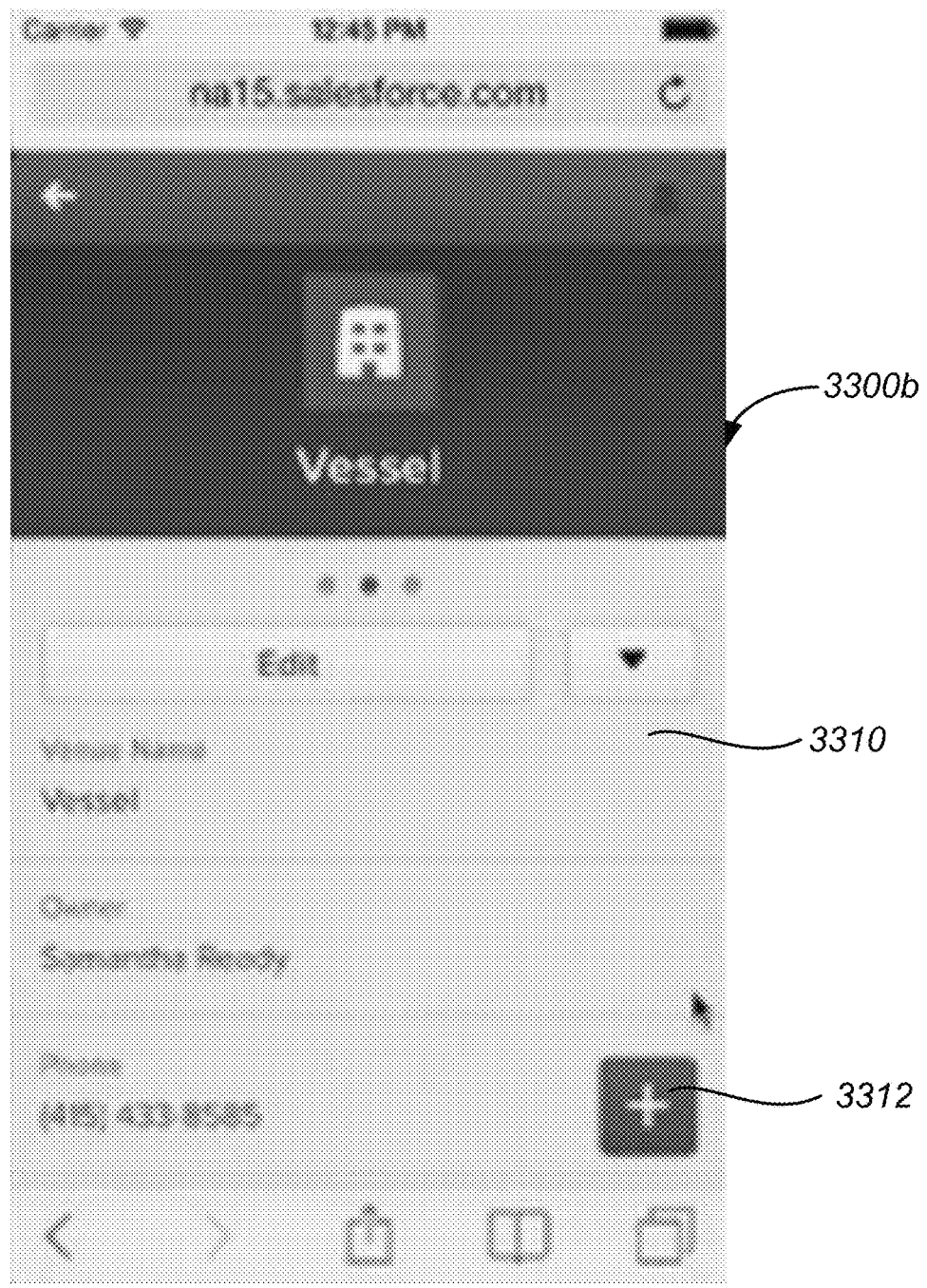
FIG. 33B shows an example of a detailed information page for a database record of a music venue, according to some implementations.
Figure 33C:
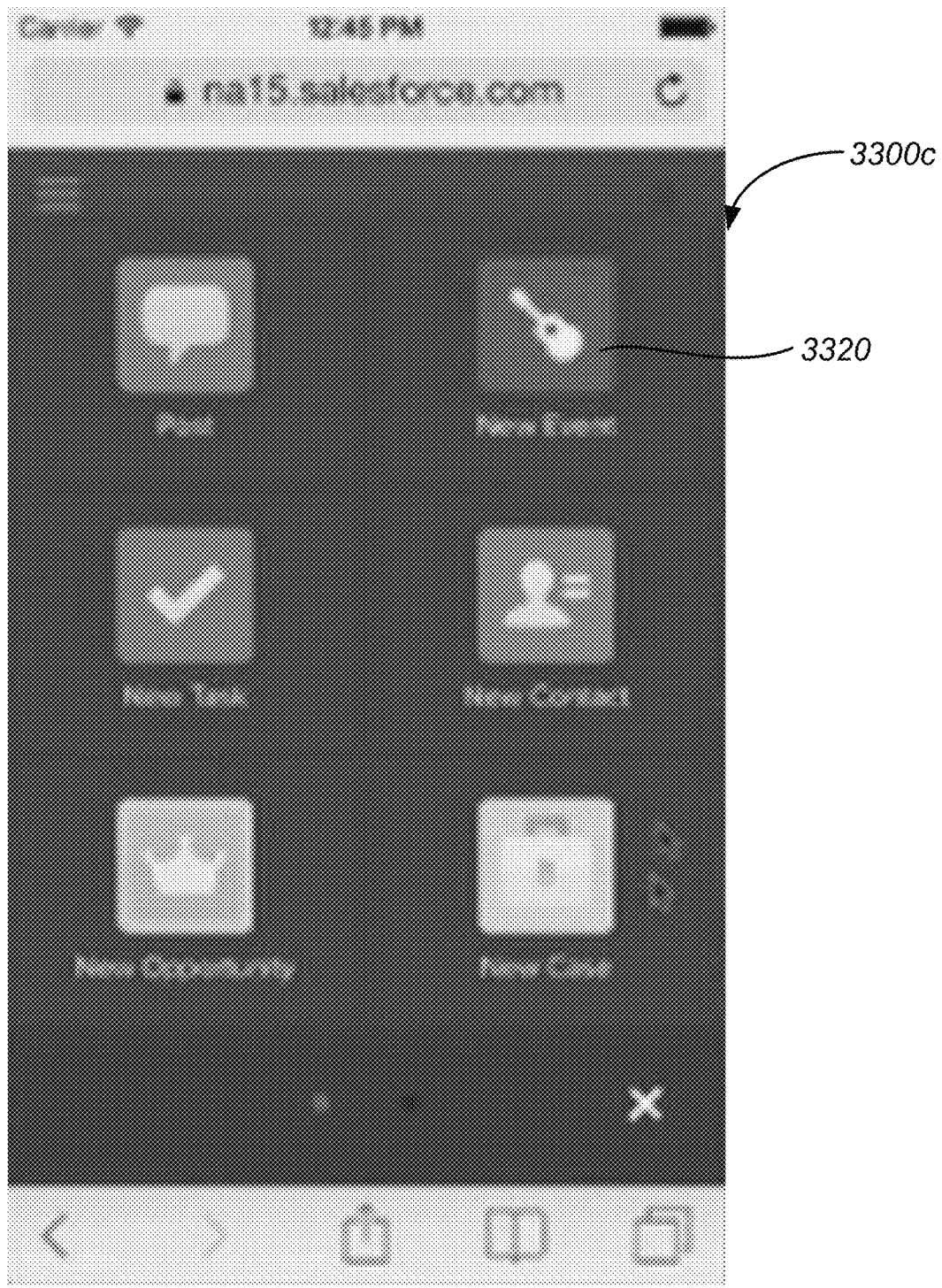
FIG. 33C shows an example of an actions menu including a selectable link for creating a new event as a child record of the music venue, according to some implementations.
Figure 33D:
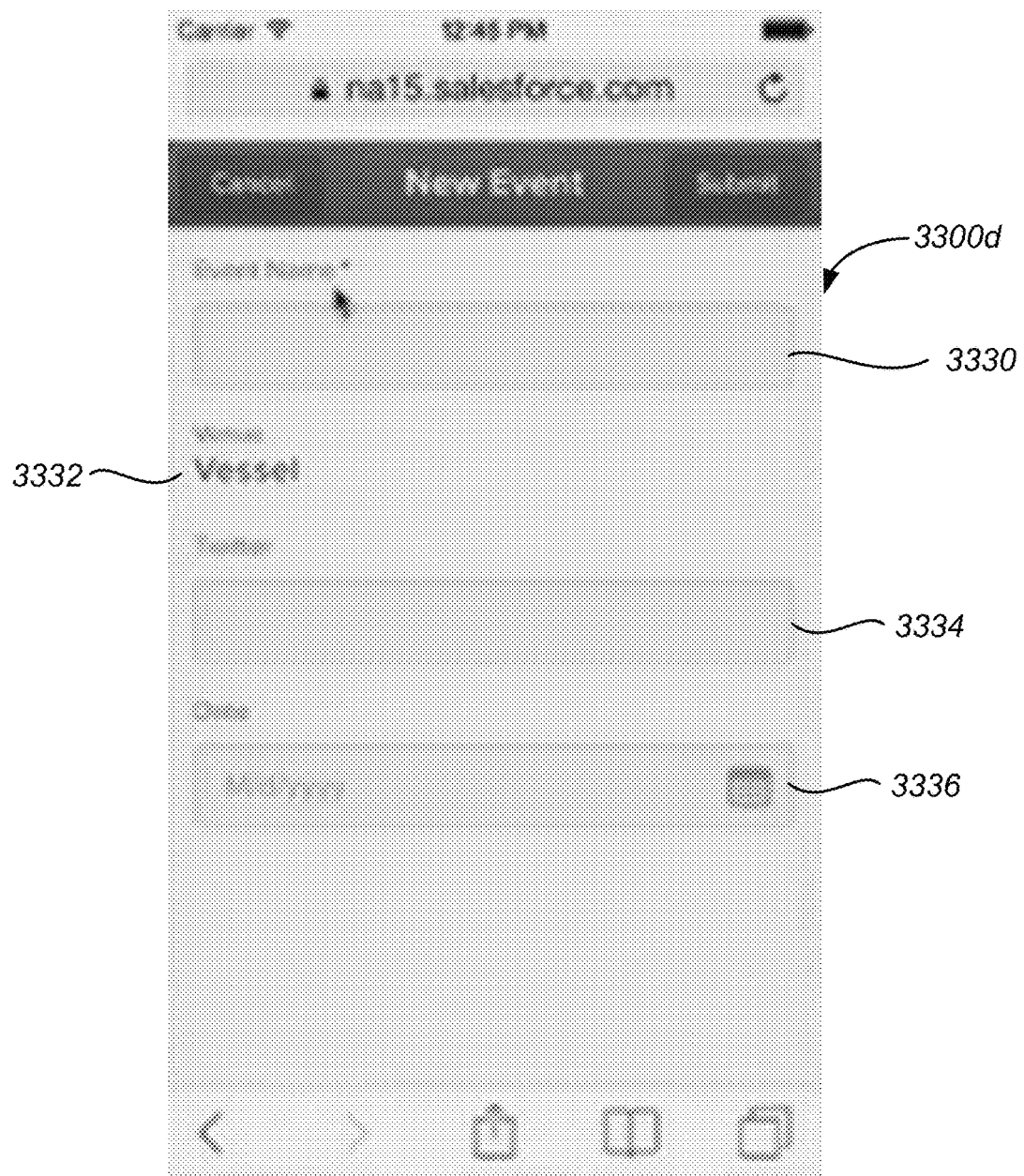
FIG. 33D shows an example of a user interface including data fields for creating a new event, according to some implementations.
Figure 33E:
FIG. 33E shows an example of an actions menu including a selectable link for adding a performer, according to some implementations.
Figure 33F:
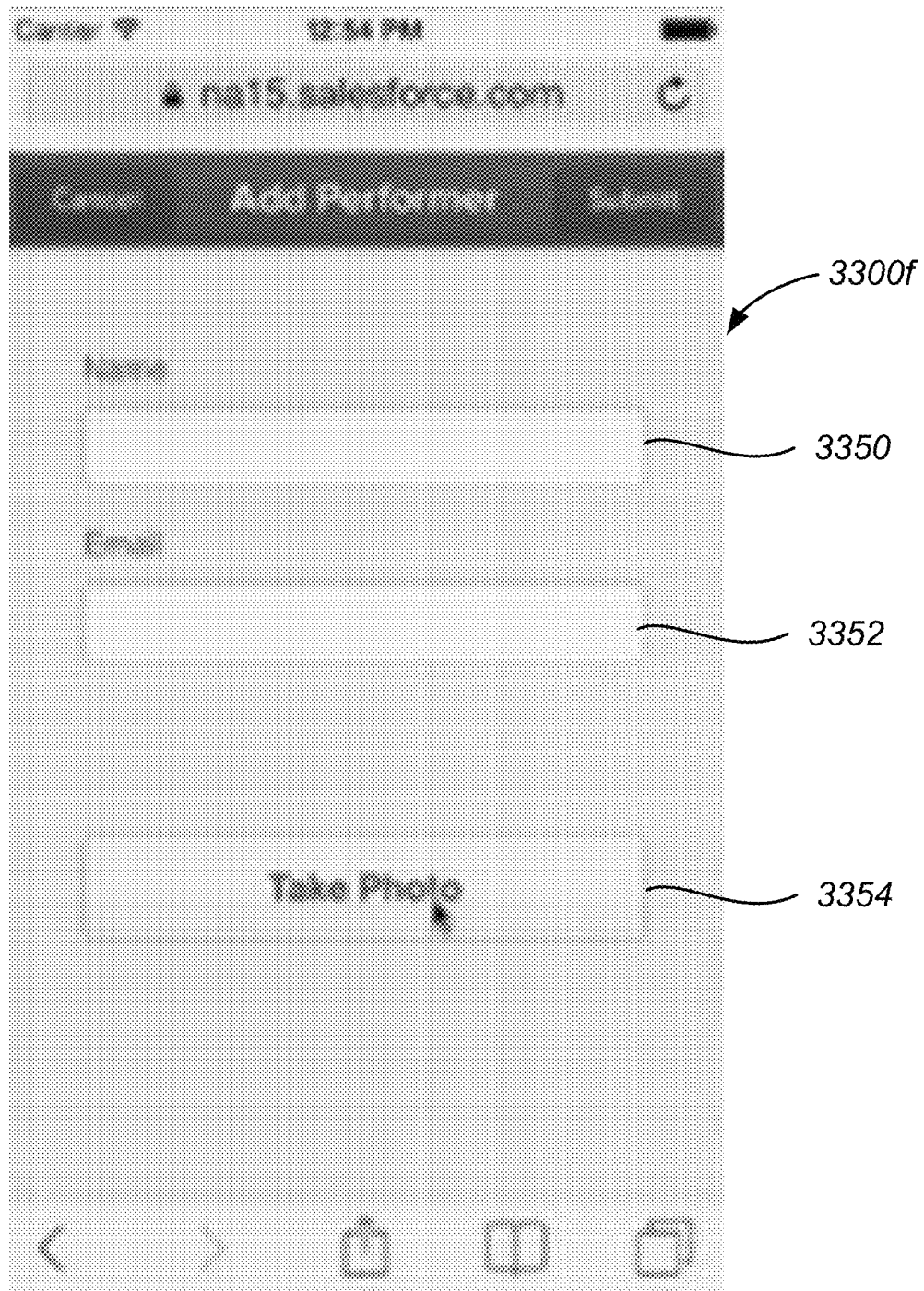
FIG. 33F shows an example of a user interface including data fields for adding a performer, according to some implementations.
Figure 34:
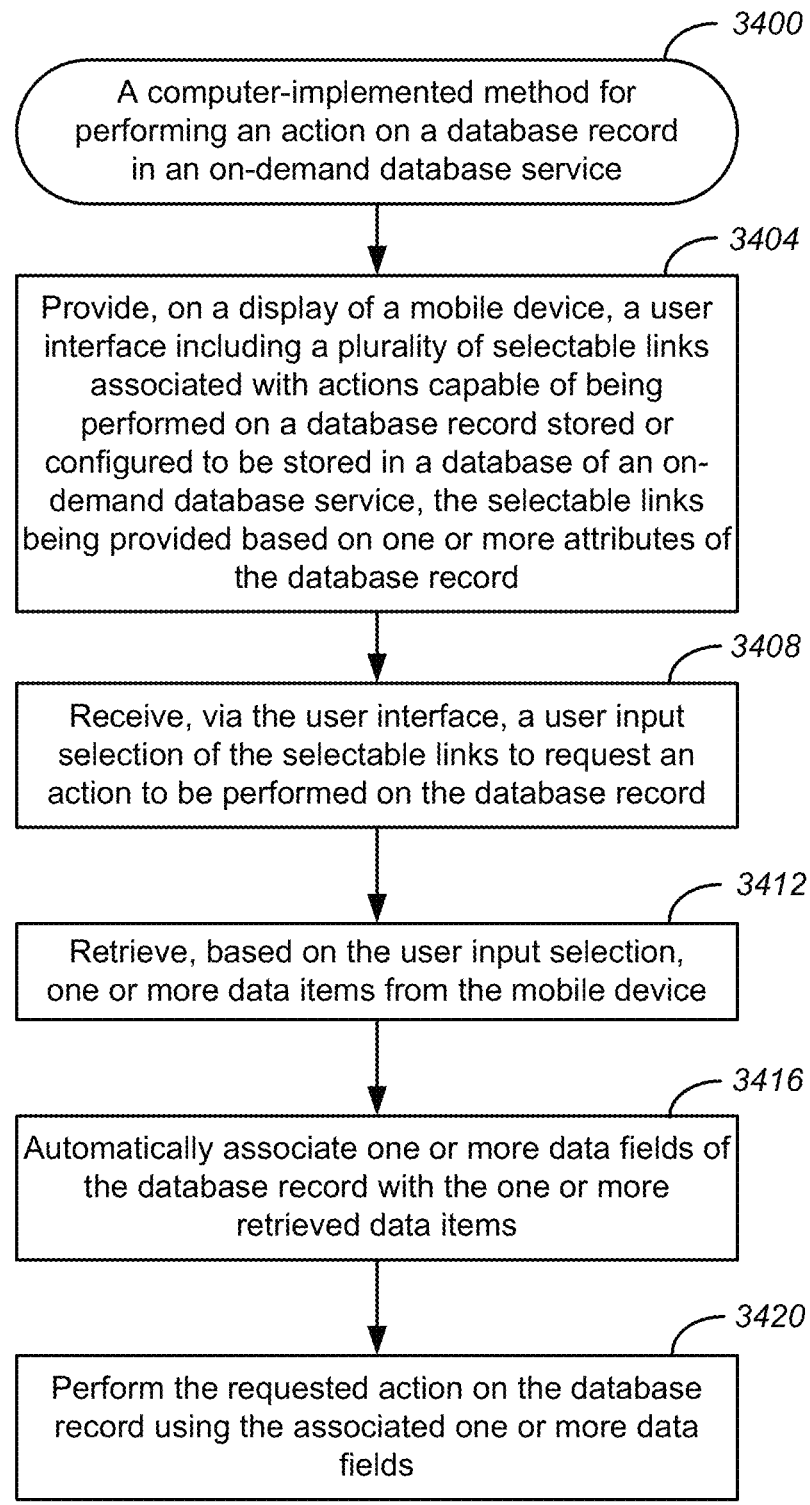
FIG. 34 shows a flowchart of an example of a computer-implemented method 3400 for performing an action on a database record, performed in accordance with some implementations.

FIG. 34 shows a flowchart of an example of a computer-implemented method 3400 for performing an action on a database record, performed in accordance with some implementations. The operations in the method 3400 may be performed in different orders and/or with different, fewer, or additional operations. The method 3400 is described with reference to FIGS. 26-33F.

In some implementations, a mobile device may be configured to perform part or all of the computer-implemented method 3400. The mobile device can include the hardware and software of a user system 12 as described above with reference to FIGS. 1A and 1B. By way of example, the mobile device can be a smartphone, a tablet, a laptop computer, or a wearable display device such as Google Glass.

At block 3404 of FIG. 34, a user interface may be provided on a display of a mobile display device. The user interface includes selectable links associated with actions capable of being performed on a database record stored or configured to be stored in a database of an on-demand database service. These selectable links are described in greater detail below with reference to FIGS. 27, 30B, 31A, 32B, 33C, and 33E.

The on-demand database service may be part of a platform, and each of the actions may perform functions within the platform. An example of a platform with suitable capabilities can include Salesforce1™. The platform can integrate various services and APIs, where each of the actions can have an API and a method call associated with it. Each action can perform a type of transaction on the platform using the API and its associated method call without having to be redefined for each user system (e.g., mobile phone, laptop, tablet, desktop, etc.) in which the action is implemented. The platform can allow each action to be performed on any user system.

While the functions performed by the actions may be identical on any user system, the presentations and user interfaces of the actions may be rendered differently with respect to the user system. In some implementations, a sequence of user interfaces for performing an action on a mobile device may be different than a sequence of user interfaces for performing an action on a desktop computer. For example, selecting an action, entering data into data fields, and submitting the data to perform an action can be rendered in a single user interface for a desktop computer, whereas each of the aforementioned steps may be rendered as a sequence of pages/menus for a mobile device.

Figure 26:
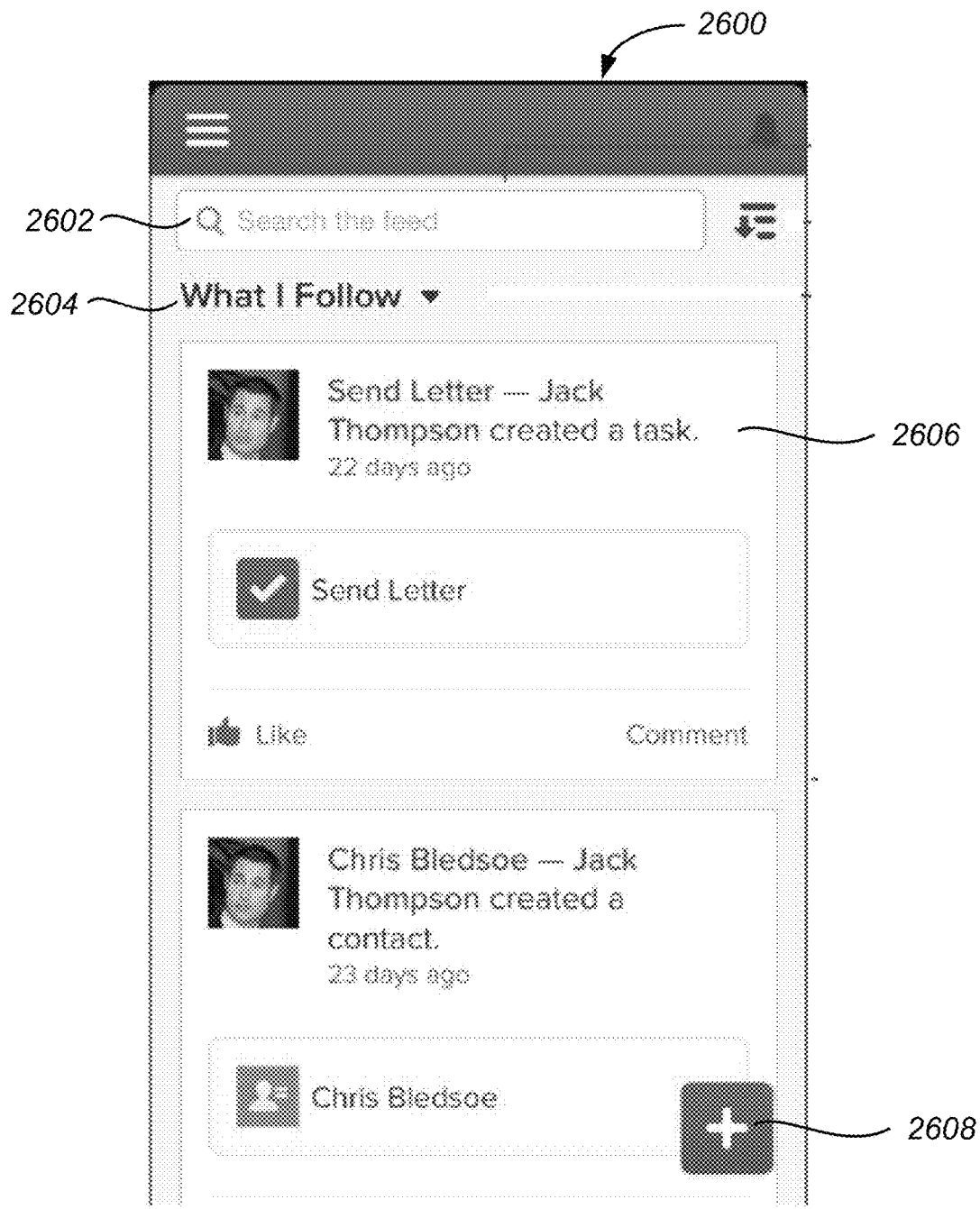
FIG. 26 shows an example of a user interface including a feed associated with an on-demand database service, according to some implementations.

FIG. 26 shows an example of a user interface including a feed associated with an on-demand database service, according to some implementations. A user interface 2600 can be presented in a display of a mobile device. The user interface 2600 can include a feed 2606 displaying various feed items. In some implementations, the feed 2606 can be a news feed associated with a user. The user interface 2600 can include a drop-down menu 2604 to filter what feed items are presented in the feed 2606, and the user interface 2600 can include a search bar 2602 to perform a search across the feed 2606. The user interface 2600 can also include a selectable icon 2608 to access publisher actions. In some implementations, a user may be able to access publisher actions from not only a feed, but also from a record page or elsewhere in the on-demand database service.

Figure 27:
FIG. 27 shows an example of a user interface including a plurality of selectable links for performing actions on a database record, according to some implementations.

FIG. 27 shows an example of a user interface including selectable links for performing actions on a database record, according to some implementations. A user interface 2700 can include selectable links 2702a, 2702b, 2702c, 2702d, 2702e, and 2702f capable of performing actions on a database record. As shown in FIG. 27, the selectable links 2702a, 2702b, 2702c, 2702d, 2702e, and 2702f may be selectable icons or buttons organized in tiles. A user may access the user interface 2700 including the selectable links 2702a, 2702b, 2702c, 2702d, 2702e, and 2702f by selecting the selectable icon 2608 in FIG. 26, where the selectable icon 2608 can be a plus sign. The user may access additional actions by navigating to another page indicated by a page indicator 2704. The user may return to a previous page or interface by selecting a cancel button 2706.

When the user selects any of the selectable links 2702a, 2702b, 2702c, 2702d, 2702e, and 2702f, an action can be initiated. The action can interact with a database record stored or configured to be stored in a database of the on-demand database service. For example, the action may perform one of the following: creating a database record or updating a database record for storing in a database of the on-demand database service. In some implementations, updating the database record can include modifying data associated with the database record, deleting the database record, converting the database record, or advancing a workflow associated with the database record. As shown in FIG. 27, actions can include posting a message, attaching a file, taking a photo, creating a new task, creating a new contact, and submitting a forecast.

What selectable links 2702a, 2702b, 2702c, 2702d, 2702e, and 2702f are presented in the user interface 2700 can depend on a context in which the user is navigating. From a feed, for example, a user may see selectable links for global publisher actions. Global publisher actions can create records or perform other functions independent of any record in the on-demand database service. From a record page, however, a user may see selectable links for object-specific publisher actions. Object-specific publisher actions may update a record, create a record, or otherwise perform a function related to a specific record in the on-demand database service.

Figure 28:
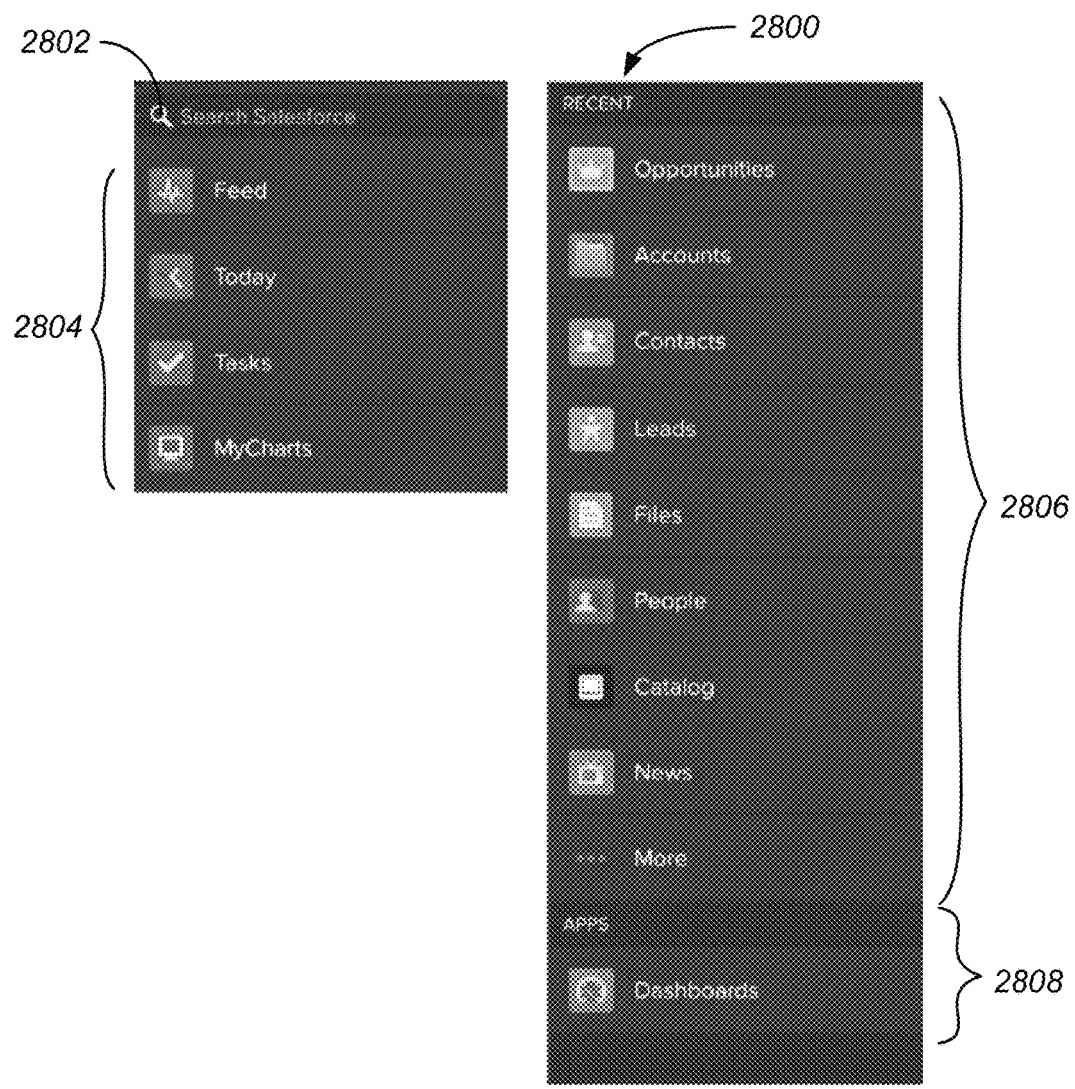
FIG. 28 shows an example of a navigation menu associated with an on-demand database service, according to some implementations.

FIG. 28 shows an example of a navigation menu associated with an on-demand database service, according to some implementations. A user can navigate the on-demand database service using a navigation menu 2800. The user can access various feeds, objects, tasks, notes, and any other item provided on the navigation menu 2800. The navigation menu 2800 can include selectable menu items 2804 customized by the user or administrator and below a search box 2802. The navigation menu 2800 can include selectable smart items 2806 that are recently searched or accessed by the user. The navigation menu 2800 may also include applications 2808 below the selectable smart items 2806.

Figure 29A:
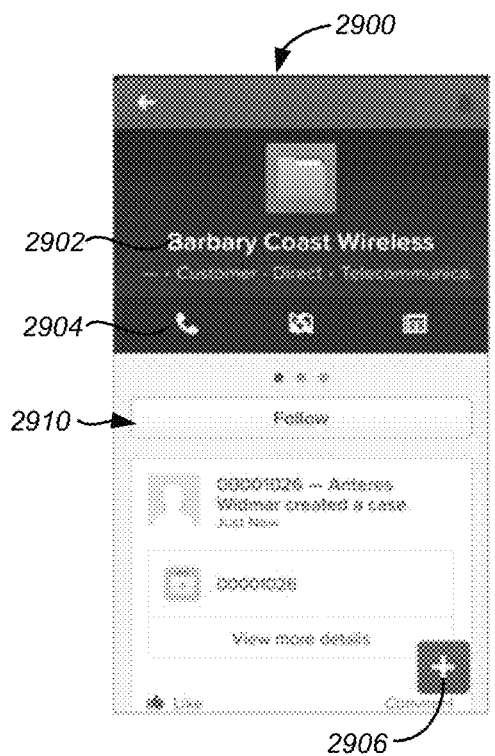
FIGS. 29A-29C show an example of a feed, a detailed information page, and a record relationship information page for a database record, according to some implementations.
Figure 29B:
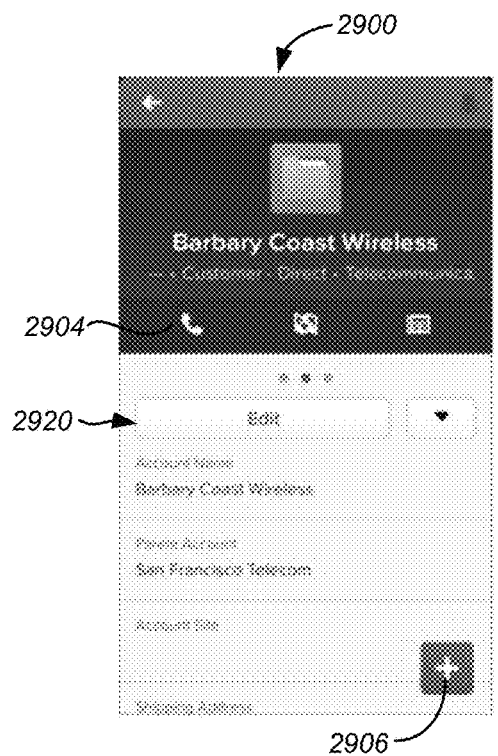
Figure 29C:
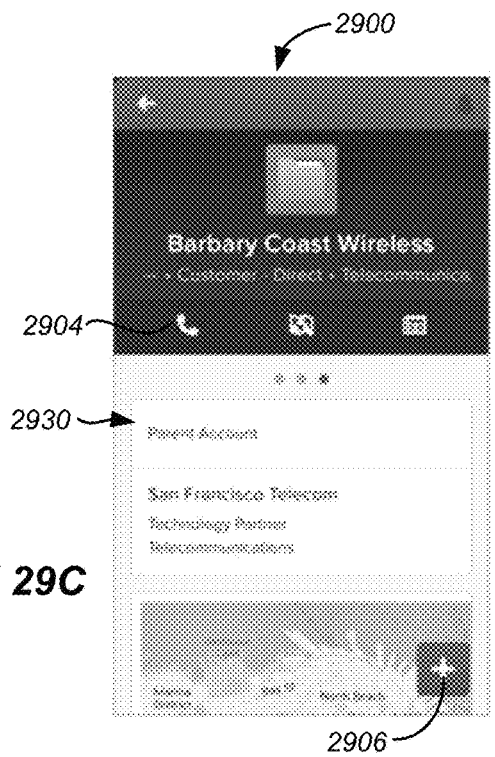

FIGS. 29A-29C show an example of a feed, a detailed information page, and a record relationship information page for a database record, according to some implementations. A user interface 2900 for a database record can be broken up into multiple pages 2910, 2920, and 2930. In FIG. 29A, the user interface 2900 corresponding to a database record for Barbary Coast Wireless can include a record feed 2910. A user can navigate to another page of the database record to view a detailed information page 2920. A user can further navigate to another page of the database record to view a record relationship information page 2930. On each of the pages 2910, 2920, and 2930, the user interface 2900 for the database record can include a highlights section 2902, an actions section 2904, and a selectable icon 2906. The highlights section 2902 can provide information regarding the database record, such as a name of the record, an icon or logo of the record, and other information associated with the record. The actions section 2904 can provide selectable actions for bringing up information related to the database record. The phone symbol may cause a modal to be displayed with a phone number for the database record. A call to the phone number can be made on the database record so that the call is logged, or a call can be made without logging the call. The map symbol may cause a modal to be displayed with the address of the database record. In some implementations, a mapping application on the mobile device can be called to look up a location of the address. The newspaper symbol can cause a modal to be displayed with the news corresponding to the database record. The selectable actions in the actions section 2904 may be predefined according to a record type, so that database records including accounts, contacts, and leads can cause information to be readily displayed for the database record.

The selectable icon 2906 may be a plus sign that a user can select to access additional actions for interacting with the database record. What actions may be accessed from a database record in FIGS. 29A-29C may be different than the actions that may be accessed from the feed 2606 as shown in FIG. 26. Specifically, a user such as an administrator may customize what actions are available from the database record upon selection of the selectable icon 2906. Users can create different types of actions for interacting with the database record, including object-specific actions. For example, an object-specific create action can create records that are automatically associated with the database record. If a user wants to create a contact for Barbary Coast Wireless, then the contact will be automatically associated with Barbary Coast Wireless. The user can define what data fields are included in the object-specific action according to a desired layout and according to any desired validation rules. In some implementations, users can select what type of action to create, including create actions, "log-a-call" actions, and update actions. Create actions allow users to create records, log-a-call actions permit users to record details of phone calls or other interactions, and update actions permit users to make changes to a record.

Returning to FIG. 34, at block 3404, the selectable links being provided to the user interface can be based on one or more attributes of the database record. In some implementations, the database record is a CRM object, the CRM object being one of: a lead, a case, an account, an opportunity, a task, a contact, a campaign, a contract, an event, and a custom object. The one or more attributes of the database record may be ascertained from information associated with the database record. One or more attributes of the database record can include but is not limited to a record identification (ID), a record type, a record relationship, metadata stored in association with the database record, and a context associated with the database record.

In some implementations, a record type can provide an attribute of the database record, such as whether the record is a task, an account, an opportunity, etc. In some implementations, metadata associated with the database record can be used to provide one or more attributes of the database record, such as a name, a phone number, an email, an address, etc. In some implementations, record relationship information can provide one or more attributes of the database record, such as parent records, child records, and/or other related records of the database record. In some implementations, one or more attributes of the database record may be ascertained from a context associated with the database record, such as the patterns of sharing and the sharing arrangements to which the database record belongs in the on-demand database service. For example, the database record can be shared privately within a particular group or community. Alternatively, the database record can be made available for consumption by a broad audience of users. In some instances, the database record can be shared through a feed or webpage of the on-demand database service. Hence, how the database record is shared in the on-demand database service among users can provide one or more attributes of the database record.

In some implementations, the method 3400 can further include identifying the one or more attributes of the database record, the one or more attributes including one or more of: a record ID, a record type, a record relationship, and metadata stored in association with the database record. The method 3400 can further include determining that at least one of the selectable links are capable of associating data fields of the database record with data items using the one or more identified attributes. The metadata can describe the data fields associated with the database record, and aspects of the action being performed can be compared to the data fields associated with the database record. When the actions can associate the data fields with data, the selectable link associated with the action can be provided to the user interface. For example, if an aspect of the action includes using a phone number, and a database record being accessed has a phone number as a data field, then a selectable link associated with the action can be provided to the user interface. If an aspect of the action includes assigning an agent to a task, and a database record being accessed is a task, then a selectable link associated with the action can be provided to the user interface. Therefore, different selectable links associated with different actions can be provided to the user interface depending on the database record being accessed in the on-demand database service.

As the user navigates to feeds or other pages in the on-demand database service that are not otherwise associated with a record, the user can choose from global actions. Such global actions may be predefined by the user or an administrator, for example. The global actions may perform an action that is not specific to a record stored in a database in the on-demand database service. If the user navigates to a record or other page associated with a record in the on-demand database service, the user can choose from object-specific actions. Such object-specific actions may be predefined by the user or by an administrator, for example. However, the object-specific actions may be determined as described in a method 3500 in FIG. 35, where aspects of the object-specific actions correspond to one or more attributes of the record.

The determination of what selectable links are provided to the user interface can be based on a context-awareness that permits a user to select from appropriate actions in the on-demand database service. A "context" can refer to a screen that the user is currently viewing on the display. This can include, for example, a feed, a user's profile, a feed comment, a detailed information page, etc. A server API can be invoked with a set of parameters that describe the context. Based on the parameters provided by the server API, the server API can provide a list of actions filtered based on that context. Any actions that are not applicable in that context are not provided to the user interface.

By way of an example, if a user's context is a detailed information page for a contact record, then the server API can filter the actions to include logging a call and sending an email for that contact record. The server API can filter actions that are not applicable for the user's context, such as posting a comment on the feed, converting lead to an opportunity, etc. If the database record is an account, actions can include creating an order and transacting a service for that account. If the database record includes a document that requires a signature, an action can include a document signing application. For example, a database record can include attachments, such as PDF attachments. When an actions menu is loaded, a determination can be made that one or more documents require a signature. A document signing application, such as DocuSign, can be provided in the actions menu. The document signing application allows the user to choose one of the PDF files and provide a signature in one of its fields. The signed PDF file can be stored on the database record. Therefore, a user can choose from publisher actions that are useful and relevant to the context in which the user is navigating.

Figure 30A:
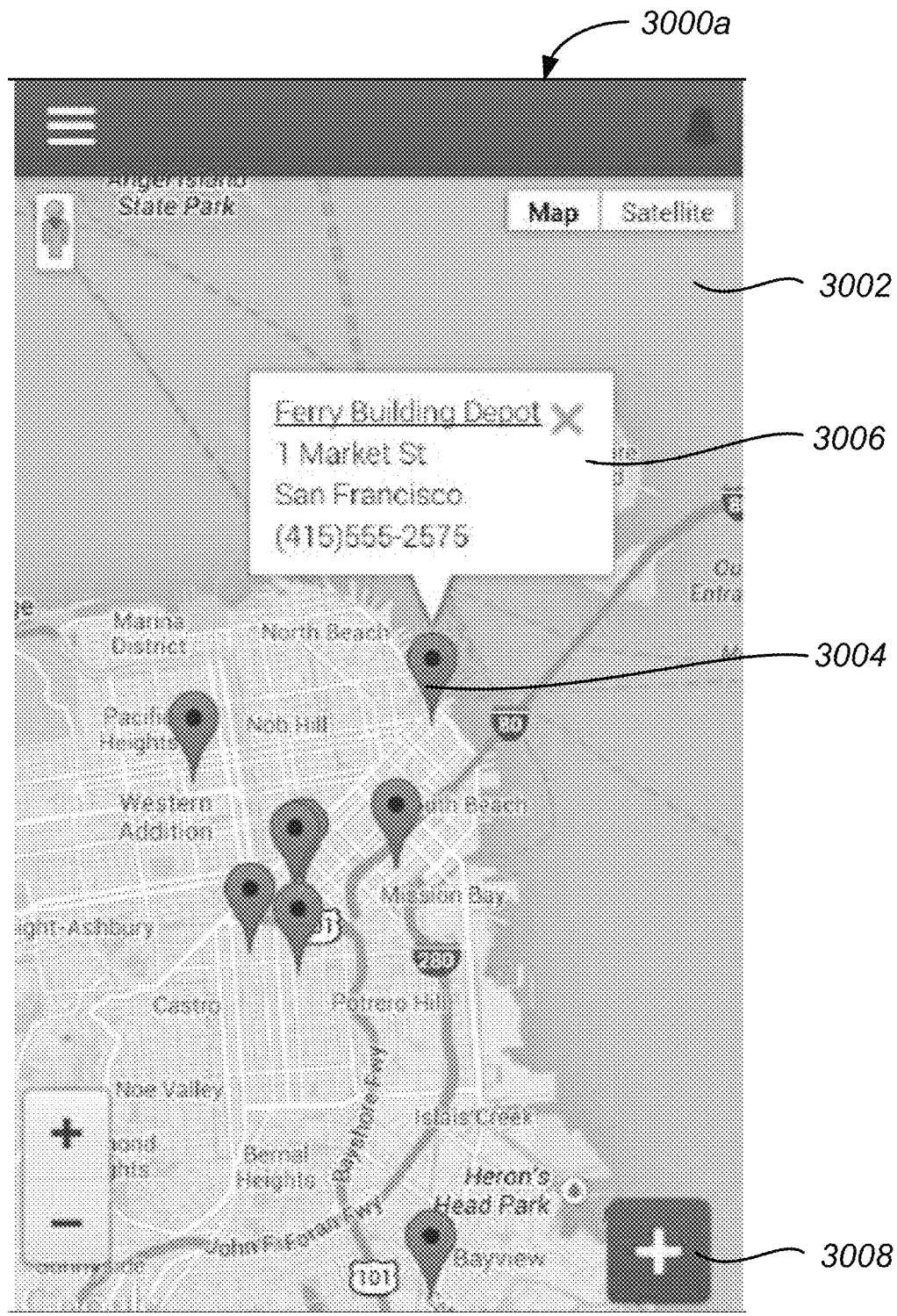
FIG. 30A shows an example of a page integrating a mapping API to provide nearby warehouse locations, according to some implementations.
Figure 30B:
FIG. 30B shows an example of an actions menu including a selectable link for creating a quick order, according to some implementations.
Figure 30C:
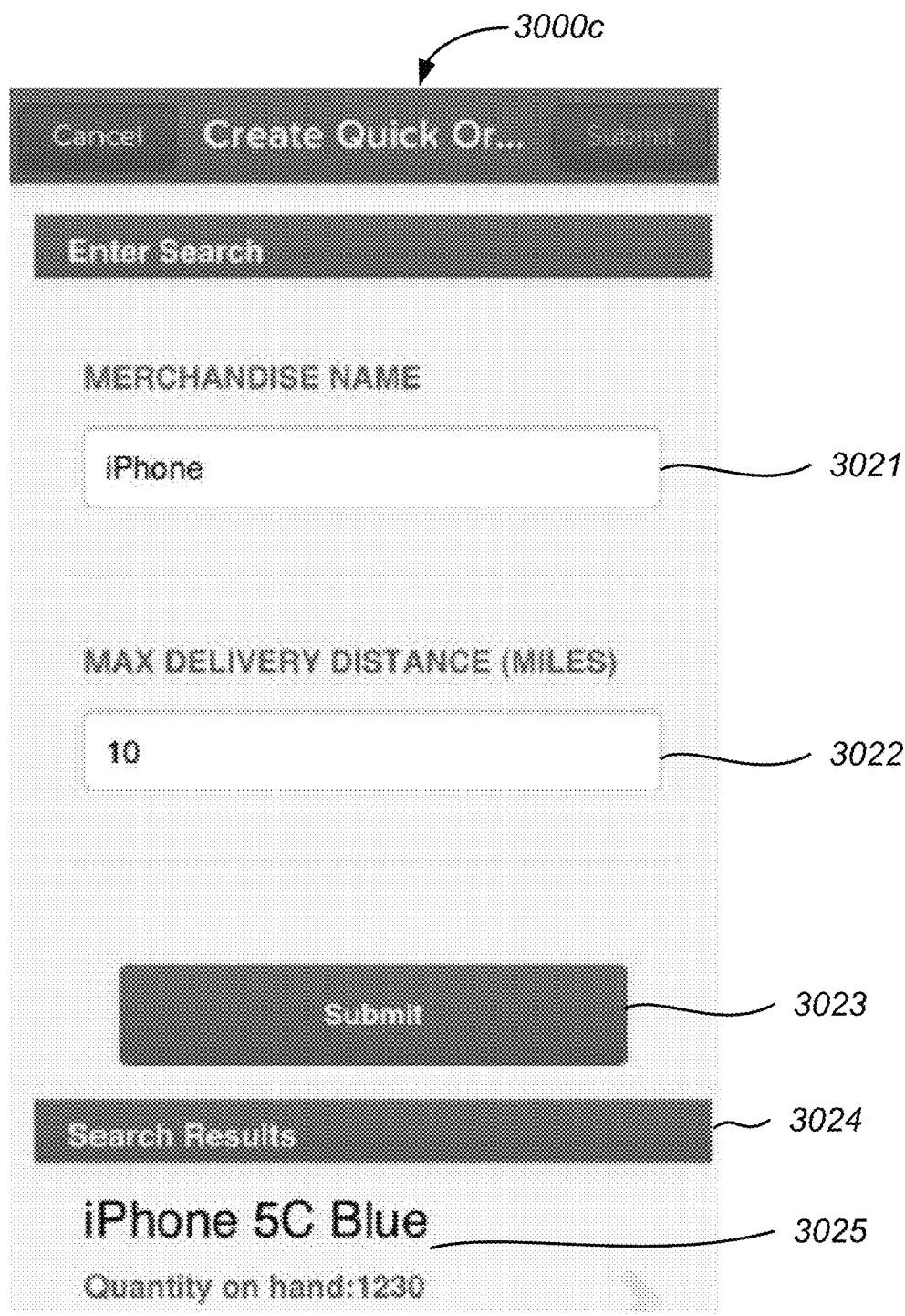
FIG. 30C shows an example of a user interface including data fields for creating a quick order, according to some implementations.

At block 3408 of FIG. 34, a user input selecting one or more of the selectable links is received via the user interface to request an action to be performed on the database record. The selectable link can be one of a button, icon, image, or other selectable item on the user interface. On a mobile device, for example, a user can select one of the selectable links by tapping or pressing on a display to request the action to be performed. The user input selection can cause the action to be initiated via the API and method call associated with the action. In some implementations, the user input selection can launch an action for interacting with the database record, such as posting a message, logging a call, creating a task, etc. In some implementations, the user input selection can launch an application for interacting with the database record, such as launching a third-party application on the mobile device such as Evernote, Dropbox, etc. A custom action can be made using a customization tool such as Visualforce in some instances. For example, a Visualforce page can be created that is accessible by selection of a custom action. A user can create a custom action displaying certain data fields, and information entered into the data fields can be integrated with an application on a Visualforce page. An example is illustrated in FIGS. 30A-30C, where a custom action for creating a quick order includes entering information for a maximum delivery distance, and then locating warehouses in a mapping application that are within the maximum delivery distance.

FIGS. 32A-32C show an example of a series of steps for linking Evernote content to a database record, according to some implementations. A user can navigate to a business contact record 3200 for Evan Philbin in FIG. 32A. The user interface can include a selectable icon 3202 to cause the user interface to display selectable links associated with actions that can be performed on the business contact record 3200. In FIG. 32B, selectable links 3212 can be provided in an actions menu 3210. One of the selectable links 3212 can include an Evernote business application to permit the user to link Evernote content to the business contact record 3200. In some implementations, the Evernote business application can be provided in the actions menu 3210 based on one or more attributes of the business contact record 3200. For example, since the database record is a business contact record 3200, the Evernote business application can be provided in the actions menu 3210. When the user selects the Evernote business application, an Evernote business application is launched. The Evernote business application 3220 can be provided in the user interface in FIG. 32C, where the application 3220 provides Evernote content 3222 linked to Evan Philbin.

Returning to FIG. 34, at block 3412, one or more data items may be retrieved from the mobile device based on the user input selection. The user input selecting a selectable link may cause the action to gain access to data items from the mobile device through the platforms's API and the accompanying action's method call. The one or more data items may be retrieved by accessing one of a hardware component, a database, and a software application of the mobile device. The platform's API may permit the action to communicate with any of the components of the mobile device to retrieve data or data items from the mobile device.

In some implementations, retrieving the one or more data items from the mobile device includes accessing one or more hardware components of the mobile device, the one or more hardware components including a storage medium, a global positioning (GPS) sensor, a proximity sensor, a camera, a gyroscope, or an accelerometer. The hardware components of the mobile device can store data that can be accessed using a platform's API and a method call associated with a selected action. For example, a geolocation of the user can be accessed from the GPS sensor of the mobile device.

In some implementations, retrieving the one or more data items from the mobile device includes accessing one or more databases including an address book. Selection of an action can facilitate access to contacts in an address book via a method call associated with the selected action. For example, an action can be configured to set up a conference call. When a user selects the conference call action, the method call associated with the conference call action can retrieve all the contacts stored in the user's contact database on the mobile device. From there, the user can add various contacts from the contact database to the conference call. Thus, contacts from the mobile device's contact database can be integrated with performance of an action on the on-demand database service.

In some implementations, retrieving the one or more data items from the mobile device includes communicating with a software application installed on the mobile device, the application capable of accessing a database external to the on-demand database service, and identifying the one or more data items from metadata stored in association with the external database. When an action is selected, the action can communicate with applications installed on the mobile device via the platform's API and the method call associated with the selected action. In other words, applications can be communicating with each other using the platform's API and the method call associated with the selected action. The application can access a database external to the database of the on-demand database service. A database is "external" in that it is hosted on a network domain separate from the network domain of the on-demand database service. In some implementations, the database of the on-demand database service can be hosted by a first database service provider, and the external database accessed by the software application can be hosted by a second database service provider different than the first database service provider. In one example, the software application can include an online social network, such as Facebook, LinkedIn, and the like. In another example, the software application can include a content management service, such as Dropbox, Google Drive, Sharepoint, Box.net, Skydrive, etc. In another example, the software application can be an online repository service like Evernote. In another example, the software application can include an online business application, such as a task management service like Do.com™, or a performance management service like Work.com™. Various other software applications may be accessed via the platform's API on the mobile device to retrieve the one or more data items. The data items may be identified using the metadata stored in association with the external database, where the metadata describes the data fields that make up the data items.

By way of an example, a large company called Company X repairs devices such as mobile phones, tablets, and gaming consoles. Company X may maintain a central warehouse where repair parts and accessories are stored. Typically, customers of Company X may drop off devices at storefront locations for repair. Storefront locations can order parts from the central warehouse to keep some inventory on hand. However, if mobile technicians want to perform repairs on-site, the mobile technician may desire to locate certain repair parts while out on the field. FIGS. 30A-30C show user interfaces representing a sequence of steps a user can go through to order a needed part.

The mobile technician may select an action configured to pull up warehouses within a 20-mile radius. The action can be selected from an actions menu, navigation menu, feed, or other page or menu in the on-demand database service. FIG. 30A shows an example of a page integrating a mapping API to provide nearby warehouse locations, according to some implementations. For example, a page 3000a can call a Google Maps API. The page 3000a can include a map 3002 including warehouse locations 3004 within a 20-mile radius of the user's geolocation. In some implementations, the warehouse locations 3004 can include warehouses with the needed part. For each warehouse location 3004, a pop-up 3006 can be displayed that is configured to show a warehouse name, address, and phone number.

In some implementations, the mobile technician may bring up an actions menu from the page 3000a. The mobile technician may select a selectable icon 3008 on the page 3000a to cause the actions menu to be displayed. In some implementations, the mobile technician may select a warehouse location 3004 in FIG. 30A to bring up a record associated with the warehouse location, and then select the selectable icon to cause the actions menu to be displayed. FIG. 30B shows an example of an actions menu including a selectable link for creating a quick order, according to some implementations. The actions menu 3000b can include a selectable link 3010 for creating a quick order for ordering the needed part from a warehouse. The mobile technician can select the selectable link 3010, return to a previous page by selecting a cancel button 3012, or browse to another page indicated by a page indicator 3014.

Upon selecting the selectable link 3010 for ordering a part, the mobile technician can proceed to enter data into data fields to place the order. FIG. 30C shows an example of a user interface including data fields for creating a quick order, according to some implementations. In the user interface 3000c, the mobile technician can enter a name of the item 3021 under Merchandise Name, such as an iPhone. The mobile technician can also enter a maximum delivery distance 3022 to limit the distance for retrieving the item, such as a distance within 10 miles. The mobile technician can select the Submit button 3023 to generate search results 3024 at the bottom of the user interface 3000c. Under the search results 3024, a search results item 3025 can be presented including the name of the item and the quantity available.

In performing the action associated with creating a quick order, a platform's API and a method call associated with the action may permit retrieval of GPS coordinates of the mobile device. The GPS coordinates may be accessed from the GPS sensor of the mobile device so that a delivery distance within 10 miles may be calculated with respect to the mobile technician's position.

Returning to FIG. 34, at block 3416, one or more data fields of the database record may be automatically associated with the one or more retrieved data items. Rather than manually entering data into various data fields of the database record for the action, the retrieved data items can automatically provide information for the various data fields. Mobile devices have smaller screens, and reducing the number of data fields for manual entry can improve workflow for performing an action on the database record. On mobile devices, users typically perform focused tasks and switching interfaces can be burdensome. Moreover, manually looking up and entering information can be cumbersome and time-consuming. Automatically associating data fields of the database record with data items retrieved from the mobile device can improve user experience with respect to performing an action on a mobile device.

The data items retrieved from the mobile device can have values that can be associated with data fields in a database table. For example, a geolocation can be associated with a data field for a user's position. A contact in an address book can be associated with a data field for a recipient of an email. An invoice from a third-party application can be associated with a data field for a charge to an account. In some implementations, the values can be automatically populated in the data fields so that the values are pre-assigned. The data items are automatically retrieved and populated without requiring user input. In some implementations, the data items are automatically populated but not displayed in the user interface so as to minimize the amount of information displayed in the user interface. Association of data items with the data fields in a user device can be caused by one or more server devices described in further detail with respect to FIG. 35.

In some implementations, the method 3400 further includes generating one or more values from the retrieved one or more data items after associating the one or more data fields with the one or more retrieved data items, and displaying the one or more values in the user interface before performing the requested action. The retrieved data items can serve as intermediate values before generating final values to be presented in the user interface. For example, values like GPS coordinates, price, dates, distance, etc., can serve as intermediate values that are calculated with other values before determining a final value to be used in the requested action.

At block 3420, the requested action can be performed on the database record using the associated one or more data fields. Performance of the action can create a database record or update a database record for storing in the database with the retrieved one or more data items in the one or more associated data fields. In some implementations, an action can be performed on the database record by creating a child record, where the child record includes the associated data fields. In some implementations, a feed item can be published in a feed associated with the database record, where the feed item indicates performance of the action on the database record.

Figure 31A:
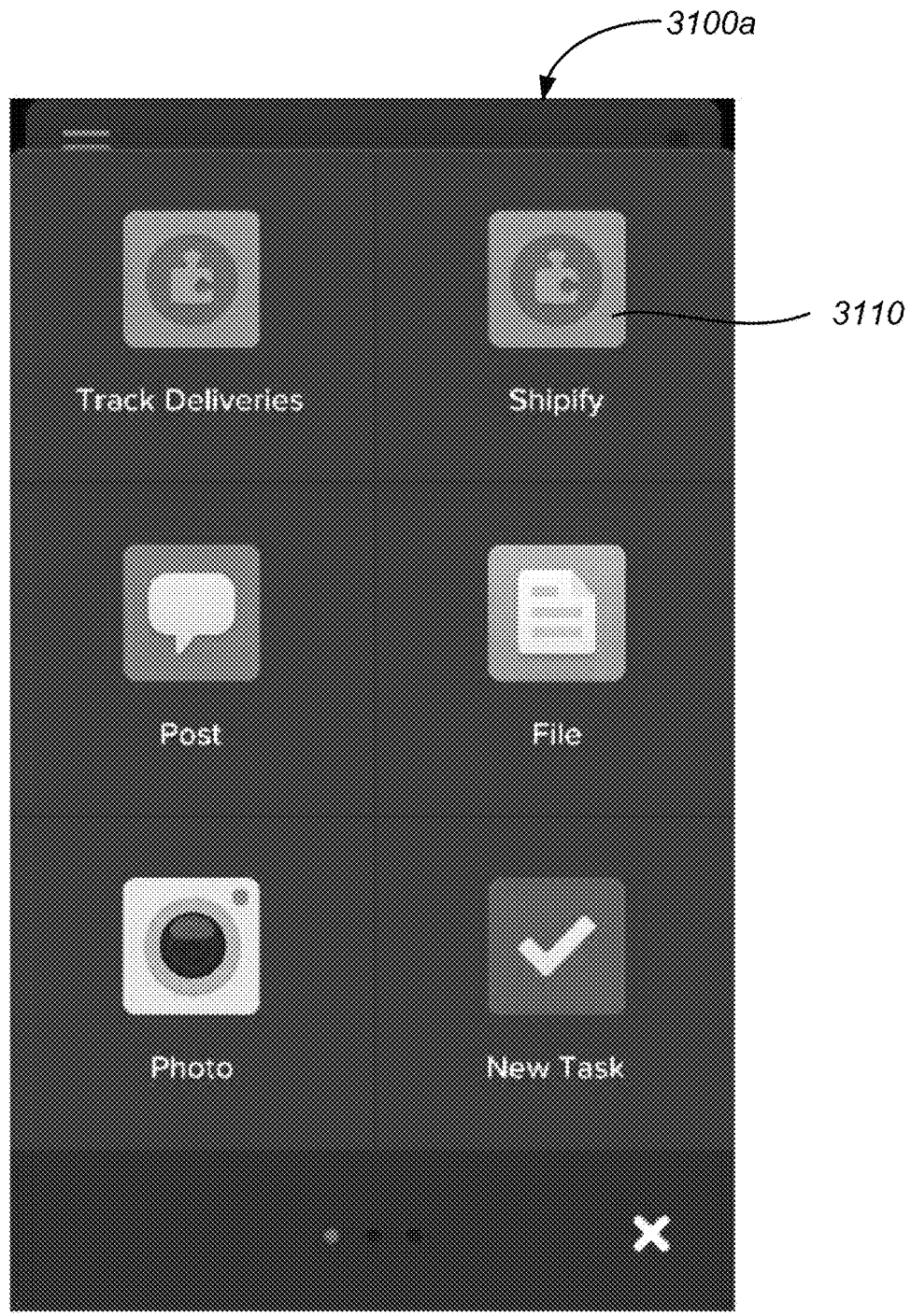
FIG. 31A shows an example of an actions menu including a selectable link for shipping an order, according to some implementations.
Figure 31B:
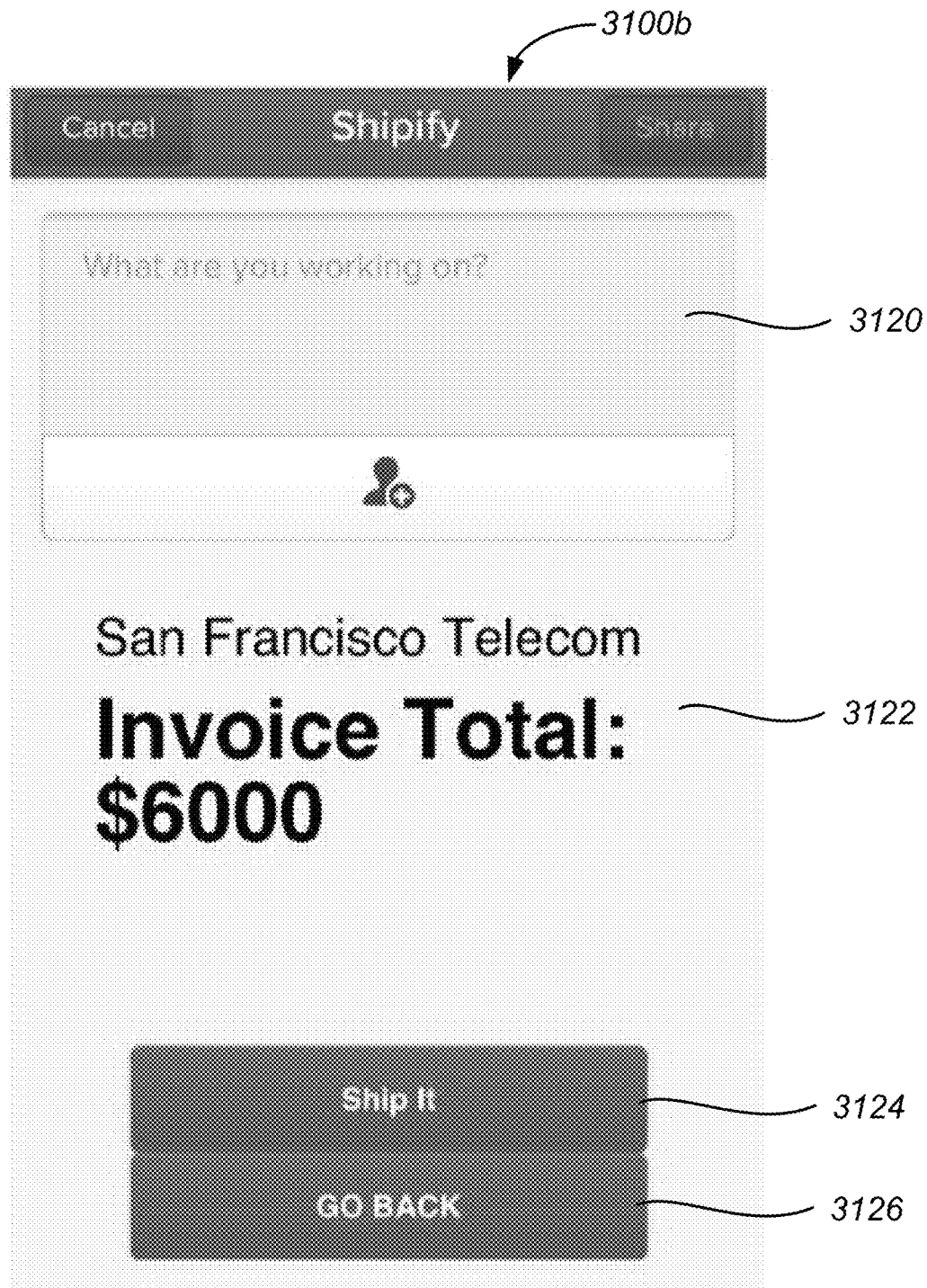
FIG. 31B shows an example of a user interface including data fields for shipping an order, according to some implementations.
Figure 31C:
FIG. 31C shows an example of a user interface including a feed with a feed item for an invoice associated with the shipped order, according to some implementations.

Third-party applications can be integrated with actions in the on-demand database service. Such actions can be custom actions made available in an actions menu. FIGS. 31A-31C illustrate a sequence of steps for shipping an order using a third-party application. Selecting the action can pull up open customer orders, and a user can select any of the open customer orders to process. The processed order can change the status of the customer order and create a feed item in the customer's account.

FIG. 31A shows an example of an actions menu including a selectable link for shipping an order, according to some implementations. The actions menu 3100a can include selectable links associated with actions, including a selectable link 3110 called Shipify for shipping an order. The Shipify application can run on a third-party platform service and can be integrated with an action in the on-demand database service. The selectable link 3110 may be provided as global action or as an object-specific action. If the action for shipping an order were a global action, then the action may create a shipped order record from any context in the on-demand database service. If the action for shipping an order were an object-specific action, then the action may update a database record or create a new record related to database record. This action can be performed from an object-specific context, such as from an account.

After a user selects the selectable link 3110 for shipping an order, a list of open invoices along with their customer accounts and warehouse information appears. The open invoices on a third-party application can be exposed using a set of tools and APIs, such as Force.com Canvas, to integrate the third-party application with the on-demand database service. The open invoices can provide data for one or more data fields of the database record. The user can select one of the open invoices.

FIG. 31B shows an example of a user interface including data fields for shipping an order, according to some implementations. The user interface 3100b shows the total amount of the invoice 3122 and a Ship It button 3124. The user interface 3100b also shows a message box 3120 to accompany the action and a Go Back button 3126 to return to the previous page. When the user selects the Ship It button 3124, the Shipify application sets the invoice status to "closed" and creates a feed item in the database record (e.g., customer account) that shows the invoice has shipped. In some implementations, the action can process the user's GPS coordinates from a user's mobile device to determine the origin of the shipment. That way, the feed item can show from where the shipment was made upon closing the invoice. The origin may or may not be provided in the user interface 3100b, but may be automatically associated with one or more data fields for the action.

FIG. 31C shows an example of a user interface including a feed with a feed item for an invoice associated with the shipped order, according to some implementations. Upon shipping the order, the invoice is closed and a feed item is created in an account feed. The user interface 3100c shows a feed item 3134 for an account feed 3132 associated with a database record 3130 for San Francisco Telecom. The feed item 3134 shows that the invoice has shipped along with a related order number and a link to the invoice. Performance of the action for shipping an order can update an invoice record by changing its status and also update an account feed with the update. In some implementations, a delivery object can be created such as a package receipt to be stored in a database in the on-demand database service.

FIG. 33A shows an example of a page integrating a mapping API to provide nearby music venues, according to some implementations. The page 3300*a* can be created using a customization tool, such as Visualforce. For example, the page 3300*a* can call a Google Maps API. The page 3300*a* can include a map 3302 showing music venues 3304 within a certain distance of a user. The page 3300*a* can also include a geolocation 3306 of the user by calling for coordinates of the user's position from the user's mobile device. Moreover, when one of the music venues 3304 is selected, the map 3302 can generate a pop-up 3308 to include information regarding the selected music venue 3304.

Information provided in the pop-up 3308 can include a link to a database record associated with the music venue 3304. FIG. 33B shows an example of a detailed information page for a database record of a music venue, according to some implementations. The detailed information page 3300*b* can include data items in various data fields 3310 associated with the music venue. The data fields 3310 can include the music venue's name, owner, and phone number. The detailed information page 3300 may also include a selectable icon 3312 for launching an actions menu in the user interface of the user's mobile device.

An actions menu can be provided in the user interface of the user's mobile device. FIG. 33C shows an example of an actions menu including a selectable link for creating a new event as a child record of the music venue, according to some implementations. The actions menu 3300*c* can include selectable links 3320 associated with actions that are capable of performing an action on the database record. For example, one of the selectable links 3320 can be associated with an action for creating a new event as a child record of the music venue. In some implementations, the option to create a new event in the actions menu 3300*c* can be based on one or more attributes of the music venue database record. For example, the music venue database record can include data fields indicative of a calendar of events.

FIG. 33D shows an example of a user interface including data fields for creating a new event, according to some implementations. The user interface 3300*d* can include a data field for an Event Name 3330, a data field for a Venue 3332, a data field for Twitter 3334, and a data field for Date 3334. Some of the data fields may be automatically populated, where the data can be retrieved from accessing the mobile device or from the database record itself. When at least the required data fields are completed, the new event can be submitted so that a child record of the music venue is created. In addition, a feed item indicating creation of the new event can be provided in at least the parent feed (e.g., the record feed associated with the music venue).

In addition or in the alternative, an actions menu can include an action for adding a performer. FIG. 33E shows an example of an actions menu including a selectable link for adding a performer, according to some implementations. The actions menu 3300*e* can include selectable links 3340, including a selectable link 3340 for creating a record for a performer. In some implementations, the record for the performer can be a child record of the event database record, so that the record for the performer can be a grandchild record of the music venue database record.

FIG. 33F shows an example of a user interface including data fields for adding a performer, according to some implementations. The user interface 3300*f* includes a data field for a Name 3350 and a data field for an Email 3352. Furthermore, the user interface 3300*f* includes a Take Photo button 3354 to access photos stored in the user's mobile device or to access a camera of the user's mobile device. The action for adding a performer can permit retrieval of photographs from the mobile device.

FIG. 35 shows an example of a system timing diagram of operations performed between a user device and one or more server devices for performing an action on a database record, according to some implementations. The system timing diagram illustrates a method 3500 for performing an action on a database record in an on-demand database service, including actions described earlier herein. The operations in the method 3500 may be performed in different orders and/or with different, fewer, or additional operations. The operations in the method 3500 are described with reference to FIGS. 1A-1B and 2A-2B.

In FIG. 35, at block 3504, a user device sends a request to access a database record stored or configured to be stored in a database of the on-demand database service. The user device can be, for example, a mobile display device. The request can include a signal providing a unique record ID for identifying the database record in the on-demand database service. The user device can communicate with one or more server devices in a cloud environment. As shown in FIG. 1A, for example, the user system 12 can send the request via network 14 to the network interface 20 of a database system 16.

In FIG. 35, one or more server devices can process the request from the user device. At block 3508, in response to receiving the request from the user device, selectable actions capable of performing an action on the database record are identified, the database record having one or more attributes. Upon identifying the database record based on the record ID, selectable actions can be identified at the one or more server devices in the on-demand database service. The one or more server devices can include server devices in pod 244 or in communication with pod 244 of FIG. 2B. Such server devices can include but is not limited to content batch servers 264, content search servers 268, query servers 282, file force servers 286, ACS servers 280, batch servers 284, app servers 288, database instances 290, indexers 294, and load balancers 228.

What selectable actions are provided to a user interface of the user device can depend on the one or more attributes of the database record. At block 3512, one or more selectable actions that satisfy the one or more attributes of the database record are determined. In some implementations, the one or more server devices in the on-demand database service can identify the one or more attributes of the database record, such as a record ID, a record type, a record relationship, metadata stored in association with the database record, and a context associated with the database record. Satisfaction of the attributes can occur if the selectable actions are capable of performing an action on the database record using the one or more attributes. The server devices can send data to the user device to provide a user interface in the user device including the selectable actions that satisfy the attributes of the database record. For example, the server devices can send the data via network 14 to the user device 12 as shown in FIG. 1A.

At block 3516, a user can select any of the one or more selectable actions in the user interface of the user device. A request can be sent to the one or more server devices to perform an action associated with the selected action on the database record. Such a request can be sent via network 14 to the network interface 20 of the database system 16 in FIG. 1A.

At block 3520, the one or more server devices receive, based on the user input selecting one of the selectable actions, the request to perform the action on the database record. The request can include instructions with a method call for performing the action included in the platform's API. Each selectable action in the user interface can cause the one or more server devices to invoke a unique method call, and each selectable action can have a unique API for performing the action. The API associated with the selected action can provide a user interface in the user device including data fields of the database record. Data in the data fields can be entered to describe the database record.

Data fields of a database record can be stored in a database and represented by columns in a database table. Some data items from the user device can be retrieved to associate with the data fields of the database record. Some of the data fields of the database record can be exposed in the user interface, where the data fields can correspond to one or more data items retrievable from the user device. The API from the one or more server devices can cause one or more data fields of the database record to be associated with the one or more data items retrieved from the user device.

At block 3524, one or more data items are retrieved from the mobile device. The data items may be retrieved from a hardware component, a database, or a software application installed on the mobile device, as described earlier herein.

At block 3528, the retrieved one or more data items are caused to be associated with one or more data fields of the database record based on the request. In some implementations, the determination that one or more selectable actions satisfy the one or more attributes can include an identification of the one or more data items to be retrieved from the user device and a determination that the one or more data fields of the database record are capable of being associated with the one or more data items.

At block 3532, a user can cause the requested action to be performed from the user interface of the user device. The user device can send a signal requesting performance of the selected action using the associated one or more data fields via the network 14 to the network interface 20 of the database system 16 in FIG. 1A.

At block 3536, the requested action is performed on the database record using the associated one or more data fields. The one or more server devices can receive the signal from the user device to perform the requested action. The database that stores or is configured to store the database record can be updated based on the associated one or more data fields. Examples of actions that can be performed on the database record can include creating the database record, updating the database record, deleting the database record, converting the database record, or advancing a workflow associated with the database record. In some implementations, the one or more server devices can provide a feed item in a feed associated with the database record, the feed item indicating performance of the action on the database record.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A phone-enabled mobile device comprising:
a display,
one or more storage media, and
one or more processors operable to execute one or more instructions stored on the one or more storage media, the instructions configurable to cause:
processing a phone call from an entity, the phone call received at the phone-enabled mobile device;
responsive to processing the phone call, displaying, in a user interface on the display of the phone-enabled mobile device, a publisher configurable to share feed items to a feed of a social networking system, the feed being associated with the entity, the publisher comprising:
an input area capable of receiving text,
a first selection operable to cause the text to be shared in the feed as a feed item, and
second selection associated with actions capable of being performed on a database record associated with the entity, the database record being stored or configured to be stored in a database system;

processing user input received via the user interface, the user input comprising selection of the second selection to request a first action to be performed on the database record;

retrieving, based on the user input, one or more data items from the phone-enabled mobile device;

automatically associating data of the database record with the one or more retrieved data items; and performing the requested first action on the database record using the associated data.

2. The phone-enabled mobile device of claim 1, wherein retrieving the one or more data items from the phone-enabled mobile device comprises:

accessing one or more hardware components of the phone-enabled mobile device, the hardware components comprising one or more of: a storage medium, a global positioning system (GPS) sensor, a proximity sensor, a camera, a gyroscope, or an accelerometer.

3. The phone-enabled mobile device of claim 1, wherein retrieving the one or more data items from the phone-enabled mobile device comprises:

accessing one or more databases comprising an address book.

4. The phone-enabled mobile device of claim 1, wherein retrieving the one or more data items from the phone-enabled mobile device comprises:

communicating with an application installed on the phone-enabled mobile device, the application capable of accessing a database external to the on-demand database service, and identifying the one or more data items from metadata stored in association with the external database.

5. The phone-enabled mobile device of claim 1, the one or more instructions configured to further cause:

identifying the one or more attributes of the database record, the one or more attributes including one or more of: a record identification (ID), a record type, a record relationship, and metadata stored in association with the database record, and determining that the second selection is capable of associating data of the database record with data items using the one or more identified attributes.

6. The phone-enabled mobile device of claim 1, wherein the database record is a customer relationship management (CRM) object, the CRM object being one of: a lead, a case, an account, an opportunity, a task, a contact, a campaign, a contract, an event, and a custom object.

7. The phone-enabled mobile device of claim 1, wherein causing the requested action to be performed on the database record includes one of: creating the database record or updating the database record for storing in the database with the retrieved one or more data items in the associated data of the database record.

8. The phone-enabled mobile device of claim 1, the one or more instructions configured to further cause:

generating one or more values from the retrieved one or more data items after associating the data of the database record with the one or more retrieved data items, and displaying the one or more values in the user interface before performing the requested action.

9. The phone-enabled mobile device of claim 1, the one or more instructions configured to further cause:

causing a feed item to be published in a feed associated with the database record, the feed item indicating performance of the action on the database record.

10. A database system for performing an action on a database record using a phone-enabled mobile device, the database system comprising:

one or more processors operable to execute one or more instructions configured to cause:

processing a phone call from an entity, the phone call received at the phone-enabled mobile device;

responsive to processing the phone call, displaying, in a user interface on the display of the phone-enabled mobile device, a publisher configurable to share feed items to a feed of a social networking system, the feed being associated with the entity, the publisher comprising:

an input area capable of receiving text, a first selection operable to cause the text to be shared in the feed as a feed item, and a second selection associated with actions capable of being performed on a database record associated with the entity, the database record being stored or configured to be stored in a database system;

processing user input received via the user interface, the user input comprising selection of the second selection to request a first action to be performed on the database record;

retrieving, based on the user input, one or more data items from the phone-enabled mobile device;

automatically associating data of the database record with the one or more retrieved data items; and performing the requested first action on the database record using the associated data.

11. The database system of claim 10, the one or more instructions configured to further cause:

providing a feed item in a feed associated with the database record, the feed item indicating performance of the action on the database record.

12. The database system of claim 10, the one or more instructions configured to further cause:

accessing a database external to an on-demand database service from an application installed on the phone-enabled mobile device, and identifying the one or more data items from metadata stored in association with the external database.

13. The database system of claim 10, wherein the one or more attributes comprises: a record identification (ID), a record type, a record relationship, or metadata stored in association with the database record.

14. The database system of claim 10, wherein the request to perform an action on the database record includes one of: creating the database record or updating the database record for storing in the database with the one or more data items in the associated data of the database record.

15. A computer-implemented method comprising:

processing a phone call from an entity, the phone call received at a phone-enabled mobile device;

responsive to processing the phone call, displaying, in a user interface on the display of the phone-enabled mobile device, a publisher configurable to share feed items to a feed of a social networking system, the feed being associated with the entity, the publisher comprising:

an input area capable of receiving text, a first selection operable to cause the text to be shared in the feed as a feed item, and second selection associated with actions capable of being performed on a database record associated with the entity, the database record being stored or configured to be stored in a database system;

processing user input received via the user interface, the user input comprising selection of the second selection to request a first action to be performed on the database record;

retrieving, based on the user input, one or more data items from the phone-enabled mobile device;

automatically associating data of the database record with the one or more retrieved data items; and performing the requested first action on the database record using the associated data.

16. The method of claim 15, wherein retrieving the one or more data items from the phone-enabled mobile device comprises:

accessing one or more hardware components of the phone-enabled mobile device, the hardware components comprising one or more of: a storage medium, a global positioning system (GPS) sensor, a proximity sensor, a camera, a gyroscope, or an accelerometer.

17. The method of claim 15, further comprising:

identifying the one or more attributes of the database record, the one or more attributes including one or more of: a record identification (ID), a record type, a record relationship, and metadata stored in association with the database record, and determining that the second selection is capable of associating data of the database record with data items using the one or more identified attributes.

18. A computer program product comprising computer-readable program code to be executed by one or more processors when retrieved from a non-transitory computer-readable medium, the program code including instructions to cause:

processing a phone call from an entity, the phone call received at a phone-enabled mobile device;

responsive to processing the phone call, displaying, in a user interface on the display of the phone-enabled mobile device, a publisher configurable to share feed items to a feed of a social networking system, the feed being associated with the entity, the publisher comprising:

an input area capable of receiving text, a first selection operable to cause the text to be shared in the feed as a feed item, and second selection associated with actions capable of being performed on a database record associated with the entity, the database record being stored or configured to be stored in a database system;

processing user input received via the user interface, the user input comprising selection of the second selection to request a first action to be performed on the database record;

retrieving, based on the user input, one or more data items from the phone-enabled mobile device;

automatically associating data of the database record with the one or more retrieved data items; and performing the requested first action on the database record using the associated data.

19. The computer program product of claim 18, wherein retrieving the one or more data items from the phone-enabled mobile device comprises:

accessing one or more hardware components of the phone-enabled mobile device, the hardware components comprising one or more of: a storage medium, a global positioning system (GPS) sensor, a proximity sensor, a camera, a gyroscope, or an accelerometer.

20. The computer program product of claim 18, the program code further including instructions to cause:

identifying the one or more attributes of the database record, the one or more attributes including one or more of: a record identification (ID), a record type, a record relationship, and metadata stored in association with the database record, and determining that the second selection is capable of associating data of the database record with data items using the one or more identified attributes.

\* \* \* \* \*